(12) United States Patent
Okazaki et al.

(10) Patent No.: US 9,863,354 B2
(45) Date of Patent: Jan. 9, 2018

(54) EXHAUST PURIFICATION SYSTEM OF INTERNAL COMBUSTION ENGINE

(71) Applicant: TOYOTA JIDOSHA KABUSHIKI KAISHA, Toyota-shi, Aichi-ken (JP)

(72) Inventors: Shuntaro Okazaki, Shizuoka-ken (JP); Kenji Suzuki, Gotemba (JP); Hiroshi Miyamoto, Susono (JP); Yuji Miyoshi, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 99 days.

(21) Appl. No.: 15/083,378

(22) Filed: Mar. 29, 2016

(65) Prior Publication Data

US 2016/0290268 A1 Oct. 6, 2016

(30) Foreign Application Priority Data

Mar. 31, 2015 (JP) ................................. 2015-074273

(51) Int. Cl.
*F01N 11/00* (2006.01)
*F02D 41/14* (2006.01)
(Continued)

(52) U.S. Cl.
CPC ..... *F02D 41/1495* (2013.01); *F02D 41/0295* (2013.01); *F02D 41/1441* (2013.01);
(Continued)

(58) Field of Classification Search
CPC .... F01N 3/101; F01N 11/007; F01N 2550/00; F01N 2560/025; F01N 2610/03;
(Continued)

(56) References Cited

U.S. PATENT DOCUMENTS 5,956,943 A 9/1999 Carnevale et al.
6,453,663 B1 * 9/2002 Orzel .................... F01N 3/0842
123/690

(Continued)

FOREIGN PATENT DOCUMENTS

EP 3 054 135 A1 8/2016
JP 2004-204716 A 7/2004
(Continued)

*Primary Examiner* — Jorge Leon, Jr.
(74) *Attorney, Agent, or Firm* — Andrews Kurth Kenyon LLP

(57) ABSTRACT

An exhaust purification system comprises an exhaust purification catalyst, a downstream side air-fuel ratio sensor and a control device. The control device makes the air-fuel ratio of the exhaust gas change to an air-fuel ratio at a rich side from the prior air-fuel ratio as air-fuel ratio rich increasing control when the air-fuel ratio of the exhaust gas is made a rich air-fuel ratio and the output air-fuel ratio of the downstream side air-fuel ratio sensor is maintained at a lean judged air-fuel ratio or more, and judges that the downstream side air-fuel ratio sensor suffers from an abnormality, when, due to the air-fuel ratio rich increasing control, the air-fuel ratio of the exhaust gas is made to change to the rich side air-fuel ratio and the output air-fuel ratio of the downstream side air-fuel ratio sensor changes to the lean side.

19 Claims, 26 Drawing Sheets

(51) Int. Cl.
*F02D 41/02* (2006.01)
*F02D 41/22* (2006.01)
*F01N 3/10* (2006.01)
*F01N 13/00* (2010.01)

(52) U.S. Cl.
CPC ..... *F02D 41/1454* (2013.01); *F02D 41/1475* (2013.01); *F02D 41/222* (2013.01); *F01N 3/101* (2013.01); *F01N 11/007* (2013.01); *F01N 13/0093* (2014.06); *F01N 2550/00* (2013.01); *F01N 2560/025* (2013.01); *F01N 2610/03* (2013.01); *F01N 2900/0408* (2013.01); *F01N 2900/0416* (2013.01); *F01N 2900/0418* (2013.01); *F01N 2900/1402* (2013.01); *F01N 2900/1624* (2013.01); *F02D 41/1408* (2013.01); *F02D 41/1456* (2013.01); *F02D 2200/0814* (2013.01); *F02D 2200/0816* (2013.01); *Y02T 10/47* (2013.01)

(58) Field of Classification Search
CPC ..... F01N 2900/0408; F01N 2900/0416; F01N 2900/0418; F01N 2900/1402; F01N 2900/1624; F02D 41/1408; F02D 41/1456; F02D 41/1475; Y02T 10/47
USPC .................. 60/276, 277, 285, 286, 299, 303
See application file for complete search history.

(56) References Cited

U.S. PATENT DOCUMENTS

| | | |
|---|---|---|
| 6,835,357 B2 | 12/2004 | Hashimoto et al. |
| 8,683,856 B2 | 4/2014 | Kitaura |
| 2001/0028868 A1* | 10/2001 | Hashimoto ........... F01N 11/007 422/177 |
| 2006/0277971 A1 | 12/2006 | Tashiro et al. |
| 2008/0189008 A1 | 8/2008 | Iwazaki |
| 2016/0061084 A1 | 3/2016 | Okazaki et al. |
| 2016/0245723 A1 | 8/2016 | Miyamoto et al. |

FOREIGN PATENT DOCUMENTS

| | | |
|---|---|---|
| JP | 2006-343281 A | 12/2006 |
| WO | 2014/118892 A1 | 8/2014 |

\* cited by examiner

FIG. 1
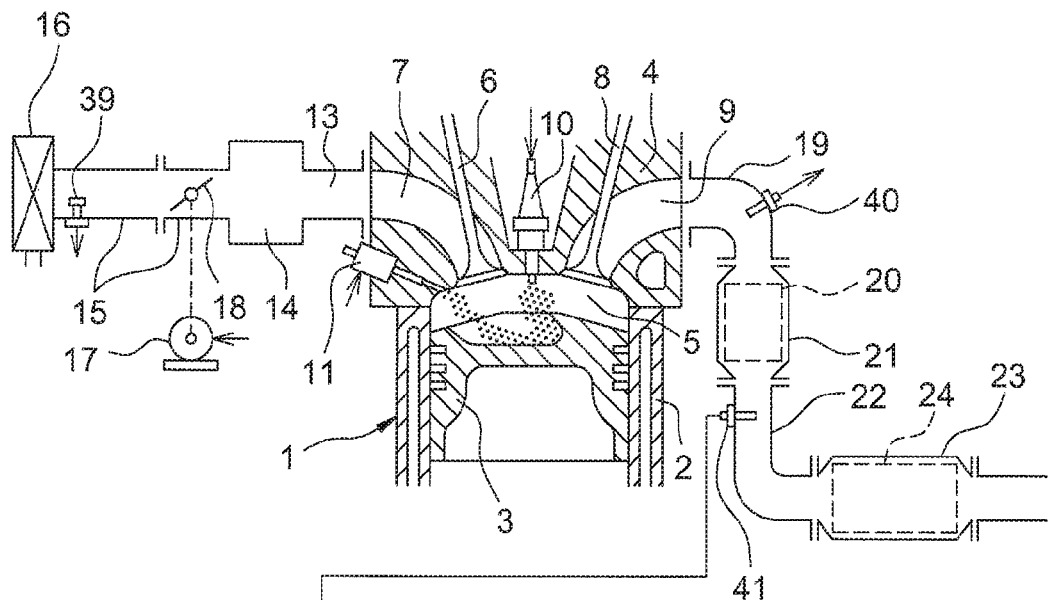
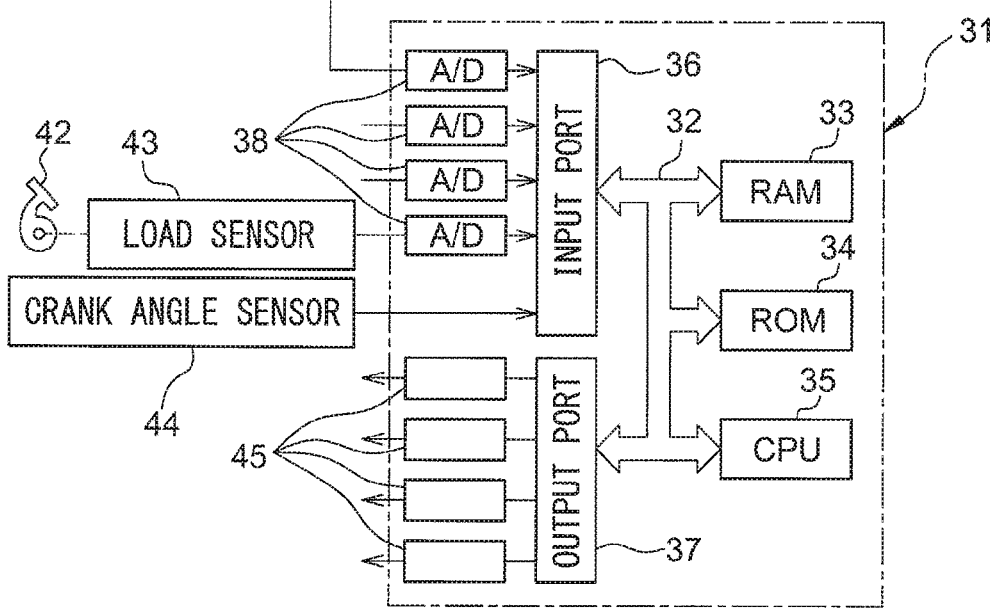

EXHAUST PURIFICATION SYSTEM OF INTERNAL COMBUSTION ENGINE

CROSS-REFERENCE TO RELATED APPLICATION

The present application claims priority to Japanese Patent Application No. 2015-074273 filed on Mar. 31, 2015, which is incorporated herein by reference in its entirety.

TECHNICAL FIELD

Embodiments of the present invention relate to an exhaust purification system of an internal combustion engine.

BACKGROUND ART

Known in the art is an exhaust purification system providing air-fuel ratio sensors at an upstream side in a direction of flow of exhaust and at a downstream side in a direction of flow of exhaust from an exhaust purification catalyst provided in an exhaust passage of an internal combustion engine. In such an internal combustion engine, the output of the upstream side air-fuel ratio sensor is used as the basis for feedback control so that the air-fuel ratio of the exhaust gas flowing into the exhaust purification catalyst becomes a target air-fuel ratio. In addition, the target air-fuel ratio is alternately set to an air-fuel ratio richer than a stoichiometric air-fuel ratio (below, simply referred to as the "rich air-fuel ratio") and an air-fuel ratio leaner than the stoichiometric air-fuel ratio (below, simply referred to as the "lean air-fuel ratio") (for example, International Patent Publication No. 2014/118892A).

In particular, in the internal combustion engine which is described in International Patent Publication No. 2014/118892A, when an air-fuel ratio corresponding to an output of the downstream side air-fuel ratio sensor (below, also referred to as the "output air-fuel ratio") becomes a rich judged air-fuel ratio richer than the stoichiometric air-fuel ratio or becomes a smaller ratio, the target air-fuel ratio is switched to the lean air-fuel ratio while when an oxygen storage amount of the exhaust purification catalyst becomes a predetermined switching reference storage amount smaller than the maximum storable oxygen amount or becomes a larger amount, the target air-fuel ratio is switched to the rich air-fuel ratio. According to International Patent Publication No. 2014/118892A, due to this, it is considered possible to suppress the outflow of $NO_x$ from the exhaust purification catalyst.

SUMMARY

Technical Problem

In this regard, if an element forming part of an air-fuel ratio sensor cracks, when the air-fuel ratio of the exhaust gas around the air-fuel ratio sensor is the lean air-fuel ratio, the output air-fuel ratio of the air-fuel ratio sensor becomes substantially equal to the actual air-fuel ratio of the exhaust gas. In this regard, when the air-fuel ratio of the exhaust gas around the air-fuel ratio sensor is the rich air-fuel ratio, the output air-fuel ratio of the air-fuel ratio sensor sometimes becomes an air-fuel ratio different from the actual air-fuel ratio of the exhaust gas, in particular a lean air-fuel ratio. Therefore, for example, regarding the downstream side air-fuel ratio sensor, when the air-fuel ratio of the exhaust gas flowing out from the exhaust purification catalyst becomes the rich air-fuel ratio, if the output air-fuel ratio of the downstream side air-fuel ratio sensor becomes the lean air-fuel ratio, it can be judged that the downstream side air-fuel ratio sensor suffers from the abnormality of a cracked element.

On the other hand, the output air-fuel ratio of the upstream side air-fuel ratio sensor sometimes deviates from the average air-fuel ratio of the exhaust gas circulating around the upstream side air-fuel ratio sensor depending on the engine operating state etc. When the extent of deviation in the output air-fuel ratio of the upstream side air-fuel ratio sensor is large, regardless of the air-fuel ratio of the exhaust gas circulating around the upstream side air-fuel ratio sensor being the lean air-fuel ratio, the output air-fuel ratio of the upstream side air-fuel ratio sensor will sometimes become the rich air-fuel ratio.

If in this way the output air-fuel ratio of the upstream side air-fuel ratio sensor deviates, even if the actual air-fuel ratio of the exhaust gas flowing into the exhaust purification catalyst is the lean air-fuel ratio, sometimes the output air-fuel ratio of the upstream side air-fuel ratio sensor will become the rich air-fuel ratio. In this case, if considering the output air-fuel ratio of the upstream side air-fuel ratio sensor, the air-fuel ratio of the exhaust gas flowing out from the exhaust purification catalyst is estimated as being the stoichiometric air-fuel ratio or the rich air-fuel ratio. Therefore, in this case, the output air-fuel ratio of the downstream side air-fuel ratio sensor sometimes becomes the lean air-fuel ratio in the state where the air-fuel ratio of the exhaust gas around the downstream side air-fuel ratio sensor is estimated to be the rich air-fuel ratio. Therefore, if diagnosing the abnormality of a cracked element by the above-mentioned technique, in such a case, the downstream side air-fuel ratio sensor ends up being mistakenly judged to suffer from the abnormality of a cracked element.

Therefore, in consideration of the above issues, an object of embodiments of the present invention is to provide an exhaust purification system of an internal combustion engine which enables an abnormality of a cracked element to be accurately diagnosed when this abnormality occurs at a downstream side air-fuel ratio sensor.

Solution to Problem

In order to solve the above problem, in a first embodiment, there is provided an exhaust purification system of an internal combustion engine, comprising an exhaust purification catalyst provided at an exhaust passage of the internal combustion engine, a downstream side air-fuel ratio sensor provided in the exhaust passage at a downstream side in the direction of flow of exhaust from the exhaust purification catalyst, and a control device controlling the air-fuel ratio of the exhaust gas flowing into the exhaust purification catalyst and diagnosing abnormality of the downstream side air-fuel ratio sensor. The control device makes the air-fuel ratio of the exhaust gas flowing into the exhaust purification catalyst change to an air-fuel ratio at a rich side from the prior air-fuel ratio as air-fuel ratio rich increasing control when the air-fuel ratio of the exhaust gas flowing into the exhaust purification catalyst is made a rich air-fuel ratio richer than the stoichiometric air-fuel ratio and the output air-fuel ratio of the downstream side air-fuel ratio sensor is maintained at a lean judged air-fuel ratio leaner than the stoichiometric air-fuel ratio or more. The control device judges that the downstream side air-fuel ratio sensor suffers from an abnormality, when, due to the air-fuel ratio rich increasing control, the air-fuel ratio of the exhaust gas flowing into the exhaust purification catalyst is made to change to the rich side air-fuel ratio and the output air-fuel ratio of the downstream side air-fuel ratio sensor changes to the lean side.

In order to solve the above problem, in a second embodiment, there is provided an exhaust purification system of an internal combustion engine, comprising an exhaust purification catalyst provided at an exhaust passage of the internal combustion engine, a downstream side air-fuel ratio sensor provided in the exhaust passage at a downstream side in the direction of flow of exhaust from the exhaust purification catalyst, and a control device controlling the air-fuel ratio of the exhaust gas flowing into the exhaust purification catalyst and diagnosing abnormality of the downstream side air-fuel ratio sensor. The control device makes the air-fuel ratio of the exhaust gas flowing into the exhaust purification catalyst change to an air-fuel ratio at a rich side from the prior air-fuel ratio as air-fuel ratio rich increasing control when the air-fuel ratio of the exhaust gas flowing into the exhaust purification catalyst is made a rich air-fuel ratio richer than the stoichiometric air-fuel ratio and the output air-fuel ratio of the downstream side air-fuel ratio sensor is maintained at a lean judged air-fuel ratio leaner than the stoichiometric air-fuel ratio or more. The control device makes the air-fuel ratio of the exhaust gas flowing into the exhaust purification catalyst change to an air-fuel ratio richer than the stoichiometric air-fuel ratio and at the lean side from the prior air-fuel ratio as air-fuel ratio lean increasing control when, due to the air-fuel ratio rich increasing control, the air-fuel ratio of the exhaust gas flowing into the exhaust purification catalyst is made to change to an air-fuel ratio at the rich side and the output air-fuel ratio of the downstream side air-fuel ratio sensor changes to the lean side. The control device also judges that the downstream side air-fuel ratio sensor suffers from an abnormality, when, due to the air-fuel ratio lean increasing control, the air-fuel ratio of the exhaust gas flowing into the exhaust purification catalyst is made to change to the lean side air-fuel ratio and the output air-fuel ratio of the downstream side air-fuel ratio sensor changes to the rich side.

In a third embodiment, the control device updates a learning value based on the output of the downstream side air-fuel ratio sensor and controls a parameter relating to the air-fuel ratio so as to make the air-fuel ratio of the exhaust gas flowing into the exhaust purification catalyst change in accordance with the learning value as learning control, and the air-fuel ratio rich increasing control is lean stuck learning control wherein the learning value is updated so as to make the air-fuel ratio of the exhaust gas flowing into the exhaust purification catalyst change to an air-fuel ratio at the rich side from the prior air-fuel ratio in the first or second embodiments.

In a forth embodiment, the control device updates the learning value based on the output of the downstream side air-fuel ratio sensor and controls a parameter relating to the air-fuel ratio so as to make the air-fuel ratio of the exhaust gas flowing into the exhaust purification catalyst change in accordance with the learning value as learning control. The air-fuel ratio rich increasing control is lean stuck learning control wherein the learning value is updated so as to make the air-fuel ratio of the exhaust gas flowing into the exhaust purification catalyst change to an air-fuel ratio at the rich side from the prior air-fuel ratio, and the air-fuel ratio lean increasing control is learning value return control wherein the learning value is updated so as to make the air-fuel ratio of the exhaust gas flowing into the exhaust purification catalyst change to an air-fuel ratio richer than the stoichiometric air-fuel ratio and at the lean side from the prior air-fuel ratio up in the second invention.

In a fifth invention, the control device returns the learning value updated by the lean stuck learning control to the value before the updating when it is judged that the downstream side air-fuel ratio sensor suffers from an abnormality in the third or fourth embodiment.

In a sixth embodiment, the control device controls the air-fuel ratio of the exhaust gas flowing into the exhaust purification catalyst so that the air-fuel ratio of the exhaust gas flowing into the exhaust purification catalyst changes to the rich side in proportion to a rich side absolute value of the learning value with respect to the air-fuel ratio of the exhaust gas flowing into the exhaust purification catalyst when the learning value is zero. The learning value is set so that the rich side absolute value becomes an absolute value of a predetermined rich side guard value or less, and the control device reduces the absolute value of the rich side guard value as guard value restriction control when the downstream side air-fuel ratio sensor suffers from an abnormality in any one of the third to fifth embodiments.

In a seventh embodiment, the control device periodically makes the rich side absolute value of the learning value increase beyond the absolute value of the rich side guard value as abnormal confirmation control so that even if, due to the guard value restriction control, the absolute value of the rich side guard value is reduced, the air-fuel ratio of the exhaust gas flowing into the exhaust purification catalyst changes to the rich side beyond the air-fuel ratio corresponding to the rich side guard value with the reduced absolute value in the sixth embodiment.

In an eighth embodiment, the control device performs feedback control so that the air-fuel ratio of the exhaust gas flowing into the exhaust purification catalyst becomes the target air-fuel ratio, and alternately switches a target air-fuel ratio between the rich air-fuel ratio and lean air-fuel ratio. The target air-fuel ratio being switched from the rich air-fuel ratio to the lean air-fuel ratio when the output air-fuel ratio of the downstream side air-fuel ratio sensor becomes a predetermined rich judged air-fuel ratio richer than the stoichiometric air-fuel ratio or becomes a smaller ratio. The control device, in the learning control, based on a cumulative oxygen excess amount being the cumulative value of the amount of oxygen which becomes an excess when trying to make the air-fuel ratio of the exhaust gas flowing into the exhaust purification catalyst the stoichiometric air-fuel ratio in an oxygen increasing period from when the target air-fuel ratio is switched to the lean air-fuel ratio when the target air-fuel ratio is switched again to the rich air-fuel ratio, and a cumulative oxygen deficiency amount being the cumulative value of the amount of oxygen which becomes deficient when trying to make the air-fuel ratio of the exhaust gas flowing into the exhaust purification catalyst the stoichiometric air-fuel ratio in the oxygen decreasing period from when the target air-fuel ratio is switched to the rich air-fuel ratio when the target air-fuel ratio is switched again to the lean air-fuel ratio, updates the learning value so that the difference between these cumulative oxygen excess amount and cumulative oxygen deficiency amount becomes smaller, and the control device reduces the ratio of the amount of change of the learning value with respect to the difference of the cumulative oxygen excess amount and the cumulative oxygen deficiency amount in the case cumulative oxygen excess amount is smaller than the cumulative oxygen deficiency amount, when it is judged that the downstream side air-fuel ratio sensor suffers from an abnormality, compared to when it is not judged that the downstream side air-fuel ratio sensor suffers from an abnormality in any one of the third to fifth embodiments.

In a ninth embodiment, the control device performs feedback control so that the air-fuel ratio of the exhaust gas flowing into the exhaust purification catalyst becomes a target air-fuel ratio and switches the target air-fuel ratio from the rich air-fuel ratio to the lean air-fuel ratio when the output air-fuel ratio of the downstream side air-fuel ratio sensor becomes a predetermined rich judged air-fuel ratio richer than the stoichiometric air-fuel ratio or becomes a small ratio, and switches the target air-fuel ratio from the lean air-fuel ratio to the rich air-fuel ratio when the oxygen storage amount of the exhaust purification catalyst becomes at least a predetermined switching reference storage amount smaller than a maximum storable amount in any one of the first to eighth embodiments.

In a tenth embodiment, there is provided an exhaust purification method for an internal combustion engine, where an exhaust purification catalyst is provided at an exhaust passage of the internal combustion engine, a downstream side air-fuel ratio sensor is provided in the exhaust passage at a downstream side in the direction of flow of exhaust from the exhaust purification catalyst, and a control device controls the air-fuel ratio of the exhaust gas flowing into the exhaust purification catalyst and diagnosing abnormality of the downstream side air-fuel ratio sensor. The control device: either a) makes the air-fuel ratio of the exhaust gas flowing into the exhaust purification catalyst change to an air-fuel ratio at a rich side from the prior air-fuel ratio as air-fuel ratio rich increasing control when the air-fuel ratio of the exhaust gas flowing into the exhaust purification catalyst is made a rich air-fuel ratio richer than the stoichiometric air-fuel ratio and the output air-fuel ratio of the downstream side air-fuel ratio sensor is maintained at a lean judged air-fuel ratio leaner than the stoichiometric air-fuel ratio or more, and b) judges that the downstream side air-fuel ratio sensor suffers from an abnormality, when, due to the air-fuel ratio rich increasing control, the air-fuel ratio of the exhaust gas flowing into the exhaust purification catalyst is made to change to the rich side air-fuel ratio and the output air-fuel ratio of the downstream side air-fuel ratio sensor changes to the lean side; or a) makes the air-fuel ratio of the exhaust gas flowing into the exhaust purification catalyst change to an air-fuel ratio at a rich side from the prior air-fuel ratio as air-fuel ratio rich increasing control when the air-fuel ratio of the exhaust gas flowing into the exhaust purification catalyst is made a rich air-fuel ratio richer than the stoichiometric air-fuel ratio and the output air-fuel ratio of the downstream side air-fuel ratio sensor is maintained at a lean judged air-fuel ratio leaner than the stoichiometric air-fuel ratio or more, b) makes the air-fuel ratio of the exhaust gas flowing into the exhaust purification catalyst change to an air-fuel ratio richer than the stoichiometric air-fuel ratio and at the lean side from the prior air-fuel ratio as air-fuel ratio lean increasing control when, due to the air-fuel ratio rich increasing control, the air-fuel ratio of the exhaust gas flowing into the exhaust purification catalyst is made to change to an air-fuel ratio at the rich side and the output air-fuel ratio of the downstream side air-fuel ratio sensor changes to the lean side, and c) judges that the downstream side air-fuel ratio sensor suffers from an abnormality, when, due to the air-fuel ratio lean increasing control, the air-fuel ratio of the exhaust gas flowing into the exhaust purification catalyst is made to change to the lean side air-fuel ratio and the output air-fuel ratio of the downstream side air-fuel ratio sensor changes to the rich side.

Potential Advantageous Effects of Embodiments of the Present Invention

According to embodiments of the present invention, there is provided an exhaust purification system of an internal combustion engine able to accurately diagnose an abnormality of a cracked element when a downstream side air-fuel ratio sensor suffers from such an abnormality.

BRIEF DESCRIPTION OF DRAWINGS

FIG. 1 is a view schematically showing an internal combustion engine in which the abnormality diagnosis system of embodiments of the present invention is used.

DESCRIPTION OF EMBODIMENTS

Figure 2:
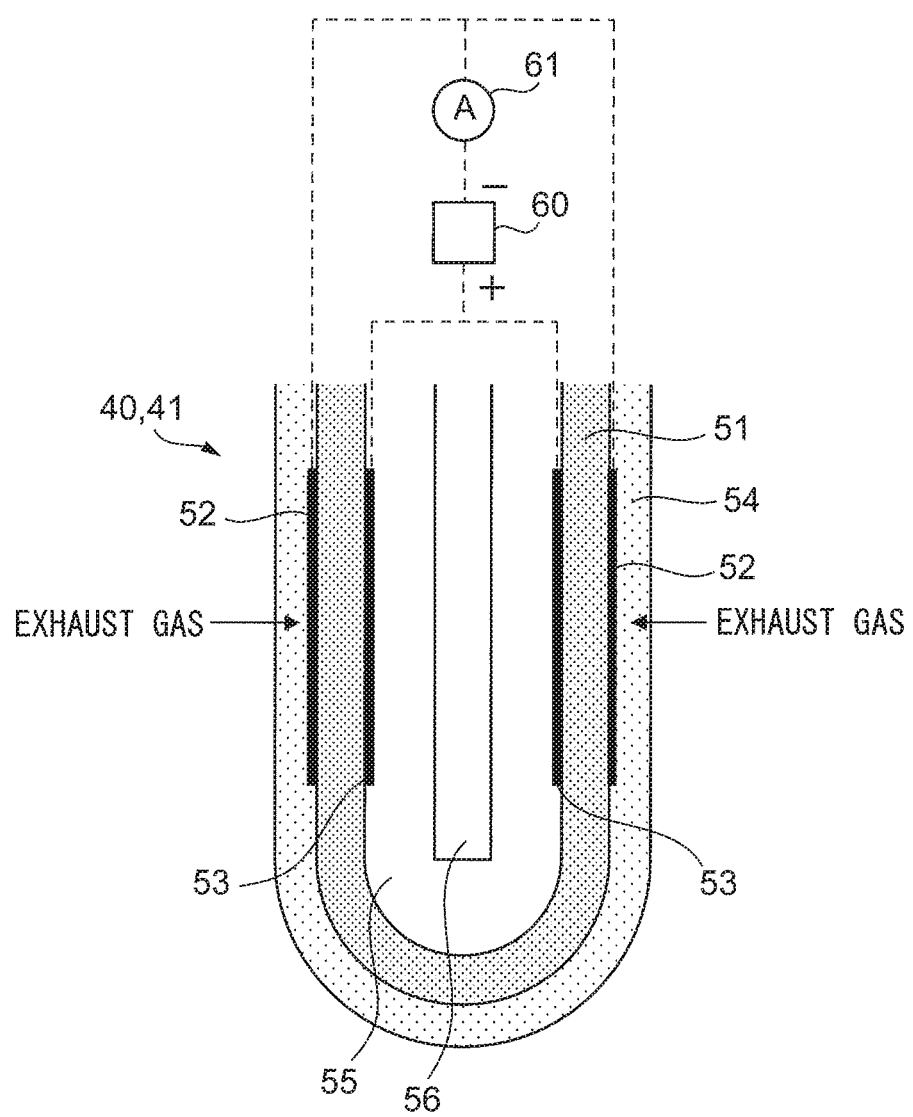
FIG. 2 is a schematic cross-sectional view of an air-fuel ratio sensor.

Below, referring to the drawings, embodiments of the present invention will be explained in detail. Note that, in the following explanation, similar component elements are assigned the same reference numerals.

<Explanation of Internal Combustion Engine as a Whole>

FIG. 1 is a view which schematically shows an internal combustion engine in which an exhaust purification system according to a first embodiment of the present invention is used. Referring to FIG. 1, 1 indicates an engine body, 2 a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, a spark plug 10 is arranged at a center part of an inside wall surface of the cylinder head 4, while a fuel injector 11 is arranged at a side part of the inner wall surface of the cylinder head 4. The spark plug 10 is configured to generate a spark in accordance with an ignition signal. Further, the fuel injector 11 injects a predetermined amount of fuel into the combustion chamber 5 in accordance with an injection signal. Note that, the fuel injector 11 may also be arranged so as to inject fuel into the intake port 7. Further, in the present embodiment, gasoline with a stoichiometric air-fuel ratio of 14.6, is used as the fuel. However, the internal combustion engine using the exhaust purification system of the present invention may also use fuel other than gasoline, or mixed fuel with gasoline.

The intake port 7 of each cylinder is connected to a surge tank 14 through a corresponding intake runner 13, while the surge tank 14 is connected to an air cleaner 16 through an intake pipe 15. The intake port 7, intake runner 13, surge tank 14, and intake pipe 15 form an intake passage. Further, inside the intake pipe 15, a throttle valve 18 which is driven by a throttle valve drive actuator 17 is arranged. The throttle valve 18 can be operated by the throttle valve drive actuator 17 to thereby change the aperture area of the intake passage.

On the other hand, the exhaust port 9 of each cylinder is connected to an exhaust manifold 19. The exhaust manifold 19 has a plurality of runners which are connected to the exhaust ports 9 and a header at which these runners are collected. The header of the exhaust manifold 19 is connected to an upstream side casing 21 which houses an upstream side exhaust purification catalyst 20. The upstream side casing 21 is connected through an exhaust pipe 22 to a downstream side casing 23 which houses a downstream side exhaust purification catalyst 24. The exhaust port 9, exhaust manifold 19, upstream side casing 21, exhaust pipe 22, and downstream side casing 23 form an exhaust passage.

The electronic control unit (ECU) 31 is comprised of a digital computer which is provided with components which are connected together through a bidirectional bus 32 such as a RAM (random access memory) 33, ROM (read only memory) 34, CPU (microprocessor) 35, input port 36, and output port 37. In the intake pipe 15, an air flow meter 39 is arranged for detecting the flow rate of air which flows through the intake pipe 15. The output of this air flow meter 39 is input through a corresponding AD converter 38 to the input port 36. Further, at the header of the exhaust manifold 19, an upstream side air-fuel ratio sensor 40 is arranged which detects the air-fuel ratio of the exhaust gas which flows through the inside of the exhaust manifold 19 (that is, the exhaust gas which flows into the upstream side exhaust purification catalyst 20). In addition, in the exhaust pipe 22, a downstream side air-fuel ratio sensor 41 is arranged which detects the air-fuel ratio of the exhaust gas which flows through the inside of the exhaust pipe 22 (that is, the exhaust gas which flows out from the upstream side exhaust purification catalyst 20 and flows into the downstream side exhaust purification catalyst 24). The outputs of these air-fuel ratio sensors 40 and 41 are also input through the corresponding AD converters 38 to the input port 36. Note that, the configurations of these air-fuel ratio sensors 40 and 41 will be explained later.

Further, an accelerator pedal 42 has a load sensor 43 connected to it which generates an output voltage which is proportional to the amount of depression of the accelerator pedal 42. The output voltage of the load sensor 43 is input to the input port 36 through a corresponding AD converter 38. The crank angle sensor 44 generates an output pulse every time, for example, a crankshaft rotates by 15 degrees. This output pulse is input to the input port 36. The CPU 35 calculates the engine speed from the output pulse of this crank angle sensor 44. On the other hand, the output port 37 is connected through corresponding drive circuits 45 to the spark plugs 10, fuel injectors 11, and throttle valve drive actuator 17. Note that, ECU 31 acts as a control device carrying out various types of control.

The upstream side exhaust purification catalyst 20 and the downstream side exhaust purification catalyst 24 are three-way catalysts which have an oxygen storage ability. Specifically, the exhaust purification catalysts 20 and 24 are three-way catalysts which comprises a carrier made of ceramic on which a precious metal (for example, platinum Pt) having a catalyst effect and a substance having an oxygen storage ability (for example, ceria $CeO_2$) are carried. A three-way catalyst has the function of simultaneously purifying unburned HC, CO and $NO_x$ when the air-fuel ratio of the exhaust gas flowing into the three-way catalyst is maintained at the stoichiometric air-fuel ratio. In addition, when the exhaust purification catalysts 20 and 24 store a certain extent of oxygen, the unburned HC and CO and $NO_x$ are simultaneously purified even if the air-fuel ratio of the exhaust gas flowing into the exhaust purification catalysts 20 and 24 somewhat deviates from the stoichiometric air-fuel ratio to the rich side or lean side.

Accordingly, if the exhaust purification catalysts 20 and 24 have an oxygen storage ability, that is, if the oxygen storage amount of the exhaust purification catalysts 20 and 24 is less than the maximum storage oxygen amount, when the air-fuel ratio of the exhaust gas flowing into the exhaust purification catalysts 20, 24 becomes somewhat leaner than the stoichiometric air-fuel ratio, the excess oxygen contained in the exhaust gas is stored in the exhaust purification catalysts 20, 24. Therefore, the surfaces of the exhaust purification catalysts 20 and 24 are maintained at the stoichiometric air-fuel ratio. As a result, on the surfaces of the exhaust purification catalysts 20 and 24, the unburned HC, CO and $NO_x$ are simultaneously purified. At this time, the air-fuel ratio of the exhaust gas flowing out from the exhaust purification catalysts 20 and 24 becomes the stoichiometric air-fuel ratio.

On the other hand, if exhaust purification catalysts 20 and 24 can release oxygen, that is, the oxygen storage amount of the exhaust purification catalysts 20 and 24 is more than zero, when the air-fuel ratio of the exhaust gas flowing into the exhaust purification catalysts 20, 24 becomes somewhat richer than the stoichiometric air-fuel ratio, the oxygen which is insufficient for reducing the unburned HC and CO contained in the exhaust gas, is released from the exhaust purification catalysts 20 and 24. Therefore, the surfaces of the exhaust purification catalysts 20 and 24 are maintained at the stoichiometric air-fuel ratio. As a result, on the surfaces of the exhaust purification catalysts 20 and 24, the unburned HC, CO and $NO_x$ are simultaneously purified. At this time, the air-fuel ratio of the exhaust gas flowing out from the exhaust purification catalysts 20 and 24 becomes the stoichiometric air-fuel ratio.

In this way, when the exhaust purification catalysts 20 and 24 store a certain extent of oxygen, even if the air-fuel ratio of the exhaust gas flowing into the exhaust purification catalysts 20 and 24 deviates somewhat from the stoichiometric air-fuel ratio to the rich side or lean side, the unburned HC, CO and $NO_x$ are simultaneously purified and the air-fuel ratio of the exhaust gas flowing out from the exhaust purification catalysts 20 and 24 becomes the stoichiometric air-fuel ratio.

<Explanation of Air-Fuel Ratio Sensor>

In the present embodiment, as the air-fuel ratio sensors 40 and 41, cup type limit current type air-fuel ratio sensors are used. FIG. 2 will be used to simply explain the structures of the air-fuel ratio sensors 40 and 41. Each of the air-fuel ratio sensors 40 and 41 is provided with a solid electrolyte layer 51, an exhaust side electrode 52 which is arranged on one side surface of the same, an atmosphere side electrode 53 which is arranged on the other side surface, a diffusion regulation layer 54 which regulates the diffusion of the flowing exhaust gas, a reference gas chamber 55, and a heater part 56 which heats the air-fuel ratio sensor 40 or 41, in particular the solid electrolyte layer 51.

In particular, in each of the cup type air-fuel ratio sensors 40 and 41 of the present embodiment, the solid electrolyte layer 51 is formed into a cylindrical shape with one closed end. Inside of the reference gas chamber 55 which is defined inside of the solid electrolyte layer 51, atmospheric gas (air) is introduced and the heater part 56 is arranged. On the inside surface of the solid electrolyte layer 51, an atmosphere side electrode 53 is arranged. On the outside surface of the solid electrolyte layer 51, an exhaust side electrode 52 is arranged. On the outside surfaces of the solid electrolyte layer 51 and the exhaust side electrode 52, a diffusion regulation layer 54 is arranged to cover the same. Note that, at the outside of the diffusion regulation layer 54, a protective layer (not shown) may be provided for preventing a liquid etc. from depositing on the surface of the diffusion regulation layer 54.

The solid electrolyte layer 51 is formed by a sintered body of $ZrO_2$ (zirconia), $HfO_2$, $ThO_2$, $Bi_2O_3$, or other oxygen ion conducting oxide in which CaO, MgO, $Y_2O_3$, $Yb_2O_3$, etc. is blended as a stabilizer. Further, the diffusion regulation layer 54 is formed by a porous sintered body of alumina, magnesia, silica, spinel, mullite, or another heat resistant inorganic substance. Furthermore, the exhaust side electrode 52 and atmosphere side electrode 53 are formed by platinum or other precious metal with a high catalytic activity.

Further, between the exhaust side electrode 52 and the atmosphere side electrode 53, sensor voltage V is supplied by the voltage control device 60 which is mounted on the ECU 31. In addition, the ECU 31 is provided with a current detection portion 61 which detects the current I which flows between these electrodes 52 and 53 through the solid electrolyte layer 51 when the sensor voltage V is applied. The current which is detected by this current detection portion 61 is the output current I of the air-fuel ratio sensors 40 and 41.

Figure 3:
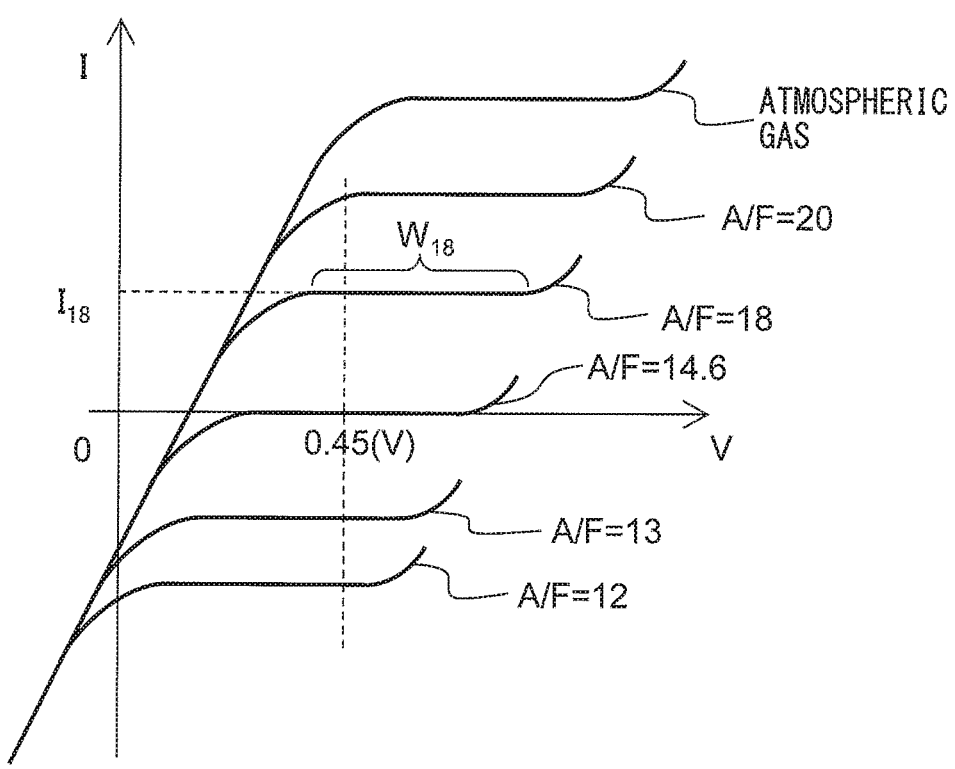
FIG. 3 is a view showing a relationship of an applied voltage V and output current I at different exhaust air-fuel ratios A/F.

The thus configured air-fuel ratio sensors 40 and 41 have the voltage-current (V-I) characteristic such as shown in FIG. 3. As will be understood from FIG. 3, the output current I of the air-fuel ratio sensors 40 and 41 becomes larger the higher (leaner) the air-fuel ratio of the exhaust gas, i.e., the exhaust air-fuel ratio A/F. Further, at the line V-I of each exhaust air-fuel ratio A/F, there is a region parallel to the sensor voltage V axis, that is, a region where the output current I does not change much at all even if the sensor voltage V changes. This voltage region is called the "limit current region". The current at this time is called the "limit current". In FIG. 3, the limit current region and limit current when the exhaust air-fuel ratio is 18 are shown by $W_{18}$ and $I_{18}$.

Figure 4:
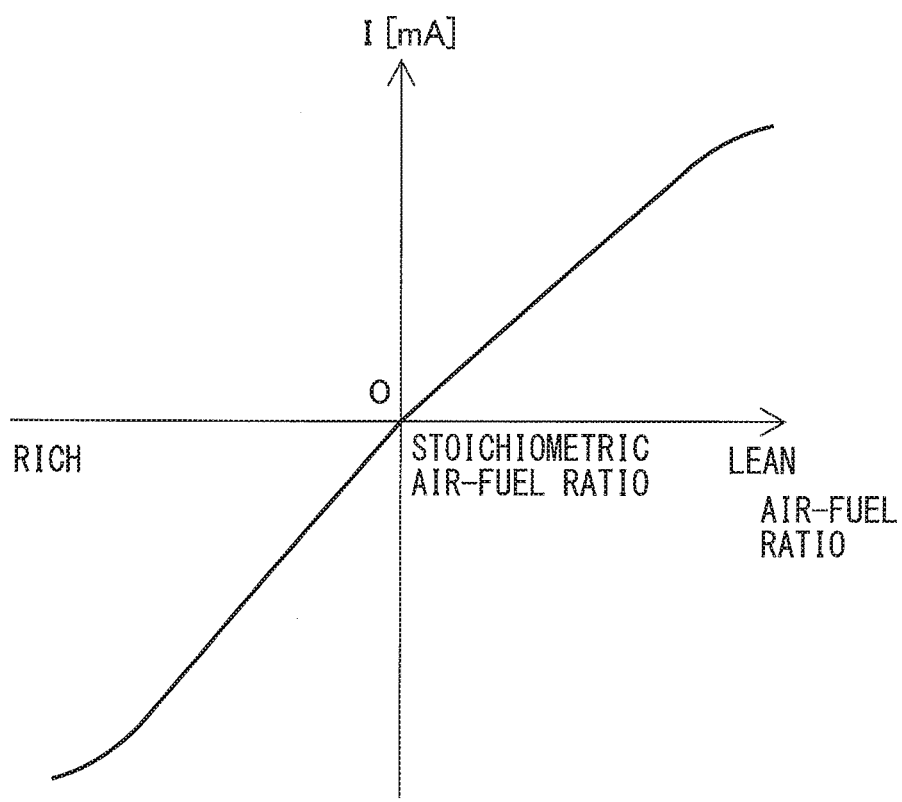
FIG. 4 is a view showing a relationship of an air-fuel ratio and output current I when making the applied voltage V constant.

FIG. 4 is a view which shows the relationship between the exhaust air-fuel ratio and the output current I when making the supplied voltage V constant at about 0.45V (FIG. 3). As will be understood from FIG. 4, in the air-fuel ratio sensors 40 and 41, the output current changes linearly (proportionally) changes with respect to the exhaust air-fuel ratio so that the higher (i.e., the leaner) the exhaust air-fuel ratio, the greater the output current I from the air-fuel ratio sensors 40 and 41. In addition, the air-fuel ratio sensors 40 and 41 are configured so that the output current I becomes zero when the exhaust air-fuel ratio is the stoichiometric air-fuel ratio.

Note that, as the air-fuel ratio sensors 40 and 41, instead of the limit current type air-fuel ratio sensor having the structure shown in FIG. 2, it is also possible to use a layered-type limit current type air-fuel ratio sensor.

<Basic Air-Fuel Ratio Control>

Next, the basic air-fuel ratio control in the internal combustion engine of the present embodiment will be summarized. In the air-fuel ratio control in the present embodiment, feedback control is performed based on the output air-fuel ratio of the upstream side air-fuel ratio sensor 40 to control the fuel injection amount from the fuel injector 11 so that the output air-fuel ratio of the upstream side air-fuel ratio sensor 40 becomes the target air-fuel ratio. That is, in the air-fuel ratio control in the present embodiment, feedback control is performed based on the output air-fuel ratio of the upstream side air-fuel ratio sensor 40 so that the air-fuel ratio of the exhaust gas flowing into the upstream side exhaust purification catalyst 20 becomes the target air-fuel ratio. Note that, the "output air-fuel ratio" means the air-fuel ratio which corresponds to the output value of the air-fuel ratio sensor.

Further, in the air-fuel ratio control of the present embodiment, target air-fuel ratio is set based on the output air-fuel ratio of the downstream side air-fuel ratio sensor 41, etc. Specifically, when the output air-fuel ratio of the downstream side air-fuel ratio sensor 41 becomes a rich air-fuel ratio the target air-fuel ratio is set to a lean set air-fuel ratio. As a result, the air-fuel ratio of exhaust gas flowing into the upstream side exhaust purification catalyst 20 also becomes the lean set air-fuel ratio. In this case, "lean set air-fuel ratio" is a predetermined constant air-fuel ratio which is leaner than the stoichiometric air-fuel ratio (air-fuel ratio serving as center of control) by a certain extent, and, for example, is 14.65 to 20, preferably 14.65 to 18, more preferably 14.65 to 16 or so. Further, the lean set air-fuel ratio can be expressed as an air-fuel ratio acquired by adding a positive air-fuel correction amount to an air-fuel ratio serving as a control center (in the present embodiment, the stoichiometric air-fuel ratio). In addition, in the present embodiment, when the output air-fuel ratio of the downstream side air-fuel ratio sensor 41 becomes a rich judged air-fuel ratio (for example, 14.55), which is slightly richer than the stoichiometric air-fuel ratio, or less, it is judged that the output air-fuel ratio of the downstream side air-fuel ratio sensor 41 has become the rich air-fuel ratio.

If the target air-fuel ratio is changed to the lean set air-fuel ratio, the oxygen excess/deficiency of the exhaust gas which flows into the upstream side exhaust purification catalyst 20 is cumulatively added. The "oxygen excess/deficiency" means an amount of the oxygen which becomes excessive or the oxygen which becomes deficient (excess HC, CO, etc., (below, referred to as unburned gas)) when trying to make the air-fuel ratio of the exhaust gas which flows into the upstream side exhaust purification catalyst 20 the stoichiometric air-fuel ratio. In particular, when the target air-fuel ratio is the lean set air-fuel ratio, the exhaust gas which flows into the upstream side exhaust purification catalyst 20 becomes excessive in oxygen. This excess oxygen is stored in the upstream side exhaust purification catalyst 20. Therefore, the cumulative value of the oxygen excess/deficiency (below, also referred to as the "cumulative oxygen excess/deficiency") can be said to express the estimated value of the oxygen storage amount OSA of the upstream side exhaust purification catalyst 20.

Note that, the oxygen excess/deficiency is calculated based on the output air-fuel ratio of the upstream side air-fuel ratio sensor 40, and the estimated value of the intake air amount to the inside of the combustion chamber 5 which is calculated based on the output of the air flow meter 39, etc. or the fuel feed amount of the fuel injector 11, etc. Specifically, the oxygen excess/deficiency OED is, for example, calculated by the following formula (1):

$$OED = 0.23 \times Qi \times (AFup - AFR) \qquad (1)$$

where 0.23 indicates the concentration of oxygen in the air, Qi indicates the amount of fuel injection, AFup indicates the output air-fuel ratio of the upstream side air-fuel ratio sensor 40, and AFR indicates an air-fuel ratio serving as control center (in the present embodiment, basically stoichiometric air-fuel ratio).

If the cumulative oxygen excess/deficiency acquired by cumulatively adding the thus calculated oxygen excess/deficiency becomes the predetermined switching reference value (which corresponds to a predetermined switching reference storage amount Cref) or more, i.e., in the embodiment of the present invention it becomes the predetermined switching reference amount Cref or more, the target air-fuel ratio which had up to then been the lean set air-fuel ratio is set to the rich set air-fuel ratio. The rich set air-fuel ratio is a predetermined constant air-fuel ratio which is a certain degree richer than the stoichiometric air-fuel ratio (the air-fuel ratio serving as control center), and is for example 12 to 14.58, preferably 13 to 14.57, more preferably 14 to 14.55 or so. Further, the rich set air-fuel ratio can be expressed as an air-fuel ratio acquired by adding a negative air-fuel ratio correction amount to an air-fuel ratio serving as a control center (in the present embodiment, the stoichiometric air-fuel ratio). Note that, in the present embodiment, the difference of the rich set air-fuel ratio from the stoichiometric air-fuel ratio (rich degree) is made the difference of the lean set air-fuel ratio from the stoichiometric air-fuel ratio (lean degree) or less.

After this, when the output air-fuel ratio of the downstream side air-fuel ratio sensor 41 again becomes the rich judged air-fuel ratio or less, the target air-fuel ratio is again made the lean set air-fuel ratio. Then, a similar operation is repeated. In this way, in the present embodiment, the target air-fuel ratio of the exhaust gas flowing into the upstream side exhaust purification catalyst 20 is alternately and repeatedly set to the lean set air-fuel ratio and the rich set air-fuel ratio. In other words, in the present embodiment, the air-fuel ratio of the exhaust gas flowing into the upstream side exhaust purification catalyst 20 is alternately switched between a rich air-fuel ratio and a lean air-fuel ratio.

<Explanation of Air Fuel Ratio Control Using Time Chart>

Figure 5:
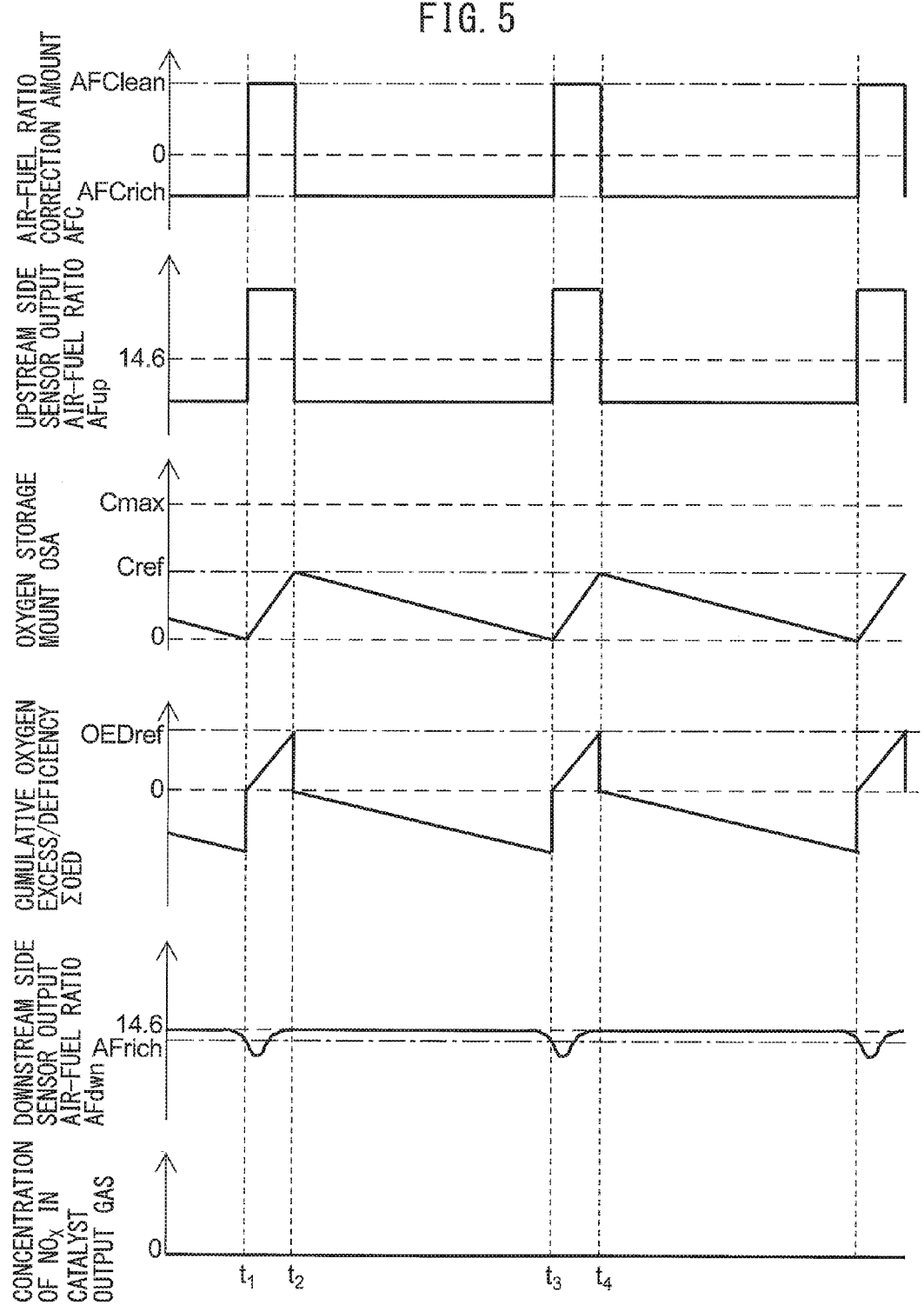
FIG. 5 is a time chart showing a change of oxygen storage amount etc. of an upstream side exhaust purification catalyst at the time of normal operation of an internal combustion engine.

Referring to FIG. 5, the operation explained as above will be explained in detail. FIG. 5 is a time chart of the air-fuel ratio correction amount AFC, the output air-fuel ratio AFup of the upstream side air-fuel ratio sensor 40, the oxygen storage amount OSA of the upstream side exhaust purification catalyst 20, the cumulative oxygen excess/deficiency ΣOED, the output air-fuel ratio AFdwn of the downstream side air-fuel ratio sensor 41, and the concentration of $NO_x$ in the exhaust gas flowing out from the upstream side exhaust purification catalyst 20, when performing the air-fuel ratio control of the present embodiment.

Note that the air-fuel ratio correction amount AFC is a correction amount relating to the target air-fuel ratio of the exhaust gas flowing into the upstream side exhaust purification catalyst 20. When the air-fuel ratio correction amount AFC is 0, the target air-fuel ratio is set to an air-fuel ratio which is equal to the air-fuel ratio serving as the control center (below, referred to as the "control center air-fuel ratio") (in the present embodiment, the stoichiometric air-fuel ratio). When the air-fuel ratio correction amount AFC is a positive value, the target air-fuel ratio becomes an air-fuel ratio leaner than the control center air-fuel ratio (in the present embodiment, the lean air-fuel ratio), while when the air-fuel ratio correction amount AFC is a negative value, the target air-fuel ratio becomes an air-fuel ratio richer than the control center air-fuel ratio (in the present embodiment, rich air-fuel ratio). Further, the "control center air-fuel ratio" means the air-fuel ratio to which of the air-fuel ratio correction amount AFC is added in accordance with the engine operating state, that is, the air-fuel ratio which is the reference when changing the target air-fuel ratio in accordance with the air-fuel ratio correction amount AFC.

In the example shown in FIG. 5, in the state before the time $t_1$, the air-fuel ratio correction amount AFC is set to the rich set correction amount AFCrich (corresponding to rich set air-fuel ratio). That is, the target air-fuel ratio is set to the rich air-fuel ratio Along with this, the output air-fuel ratio of the upstream side air-fuel ratio sensor 40 becomes the rich air-fuel ratio. Unburned gas, etc. contained in the exhaust gas flowing into the upstream side exhaust purification catalyst 20 is purified in the upstream side exhaust purification catalyst 20. Along with this, the oxygen storage amount OSA of the upstream side exhaust purification catalyst 20 gradually decreases. Since due to the purification in the upstream side exhaust purification catalyst 20, unburned gas, etc., is not contained in the exhaust gas flowing out from the upstream side exhaust purification catalyst 20, the output air-fuel ratio AFdwn of the downstream side air-fuel ratio sensor 41 is substantially the stoichiometric air-fuel ratio. Since the air-fuel ratio of the exhaust gas flowing into the upstream side exhaust purification catalyst 20 is a rich air-fuel ratio, the NOx discharging amount from the upstream side exhaust purification catalyst 20 is substantially zero.

If the oxygen storage amount OSA of the upstream side exhaust purification catalyst 20 gradually decreases, the oxygen storage amount OSA approaches zero. Along with this, a part of the unburned gas flowing into the upstream side exhaust purification catalyst 20 starts to flow out without being purified by the upstream side exhaust purification catalyst 20. As a result, the output air-fuel ratio AFdown of the downstream side air-fuel ratio sensor 41 gradually falls, and at the time $t_1$, the output air-fuel ratio AFdwn of the downstream side air-fuel ratio sensor 41 reaches the rich judged air-fuel ratio AFrich.

In the present embodiment, if the output air-fuel ratio AFdwn of the downstream side air-fuel ratio sensor 41 becomes the rich judged air-fuel ratio AFrich or less, in order to make the oxygen storage amount OSA increase, the air-fuel ratio correction amount AFC is switched to the lean set correction amount AFClean (corresponding to lean set air-fuel ratio). Further, at this time, the cumulative oxygen excess/deficiency ΣOED is reset to zero.

Note that, in the present embodiment, the air-fuel ratio correction amount AFC is switched when the output air-fuel ratio AFdwn of the downstream side air-fuel ratio sensor 41 reaches the rich judged air-fuel ratio AFrich. This is because even if the oxygen storage amount OSA of the upstream side exhaust purification catalyst 20 is sufficient, sometimes the air-fuel ratio of the exhaust gas flowing out from the upstream side exhaust purification catalyst 20 deviates very slightly from the stoichiometric air-fuel ratio. Conversely speaking, the rich judged air-fuel ratio is set to an air-fuel ratio which the air-fuel ratio of the exhaust gas flowing out from the upstream side exhaust purification catalyst 20 never reaches when the oxygen storage amount of the upstream side exhaust purification catalyst 20 is sufficient.

If switching the target air-fuel ratio to the lean air-fuel ratio at the time $t_1$, the air-fuel ratio of the exhaust gas flowing into the upstream side exhaust purification catalyst 20 changes from the rich air-fuel ratio to the lean air-fuel ratio. If the air-fuel ratio of the exhaust gas flowing into the upstream side exhaust purification catalyst 20 changes to the lean air-fuel ratio at the time $t_1$, the oxygen storage amount OSA of the upstream side exhaust purification catalyst 20 increases. Further, along with this, the cumulative oxygen excess/deficiency ΣOED also gradually increases.

Therefore, the air-fuel ratio of the exhaust gas flowing out from the upstream side exhaust purification catalyst 20 changes to the stoichiometric air-fuel ratio, and the output air-fuel ratio AFdwn of the downstream side air-fuel ratio sensor 41 returns to the stoichiometric air-fuel ratio. At this time, the air-fuel ratio of the exhaust gas flowing into the upstream side exhaust purification catalyst 20 is the lean air-fuel ratio, but there is sufficient leeway in the oxygen storage ability of the upstream side exhaust purification catalyst 20, and therefore the oxygen in the inflowing exhaust gas is stored in the upstream side exhaust purification catalyst 20 and NOx is removed by reduction. Therefore, the exhaust of $NO_x$ from the upstream side exhaust purification catalyst 20 becomes substantially zero.

Then, if the upstream side exhaust purification catalyst 20 increases in the oxygen storage amount OSA, at the time $t_2$, the oxygen storage amount OSA of the upstream side exhaust purification catalyst 20 reaches the switching reference storage amount Cref. Therefore, the cumulative oxygen excess/deficiency ΣOED reaches the switching reference value OEDref which corresponds to the switching reference storage amount Cref. In the present embodiment, if the cumulative oxygen excess/deficiency ΣOED becomes the switching reference value OEDref or more, the storage of oxygen in the upstream side exhaust purification catalyst 20 is suspended by switching the air-fuel ratio correction amount AFC to the rich set correction amount AFCrich. Therefore, the target air-fuel ratio is made the rich air-fuel ratio. Further, at this time, the cumulative oxygen excess/deficiency ΣOED is reset to 0.

Note that the switching reference storage amount Cref is set to an amount sufficiently small so that the oxygen storage amount OSA does not reach the maximum storable oxygen amount Cmax even if unintentional deviation in air-fuel ratio due to abrupt acceleration of the vehicle, etc. occurs. For example, the switching reference storage amount Cref is made ¾ or less of the maximum storable oxygen amount Cmax before the upstream side exhaust purification catalyst 20 is used, preferably ½ or less thereof, more preferably ⅕ or less thereof. As a result, the air-fuel ratio correction amount AFC is switched to the rich set correction amount AFCrich before the output air-fuel ratio AFdown of the downstream side air-fuel ratio sensor 41 reaches a lean judged air-fuel ratio which is slightly leaner than the stoichiometric air-fuel ratio (for example, 14.65, a lean air-fuel ratio wherein the difference from the stoichiometric air-fuel ratio is almost the same as the difference between the rich judged air-fuel ratio and the stoichiometric air-fuel ratio).

At the time $t_2$, if the target air-fuel ratio is switched to the rich set air-fuel ratio, the air-fuel ratio of the exhaust gas flowing into the upstream side exhaust purification catalyst 20 changes from the lean air-fuel ratio to the rich air-fuel ratio. Since, the exhaust gas flowing into the upstream side exhaust purification catalyst 20 contains unburned gas, etc., the upstream side exhaust purification catalyst 20 gradually decreases in oxygen storage amount OSA. At this time, $NO_x$ amount exhausted from the upstream side exhaust purification catalyst 20 is substantially zero.

The oxygen storage amount OSA of the upstream side exhaust purification catalyst 20 gradually decreases, and at the time $t_3$, in a similar way to time $t_1$, the output air-fuel ratio AFdwn of the downstream side air-fuel ratio sensor 41 reaches the rich judged air-fuel ratio AFrich. Due to this, the air-fuel ratio correction amount AFC is switched to the lean set correction amount AFClean. Then, the cycle of the above mentioned times $t_1$ to $t_3$ is repeated.

As will be understood from the above explanation, according to the present embodiment, it is possible to constantly suppress the amount of exhaust of $NO_x$ from the upstream side exhaust purification catalyst 20. That is, so long as performing the above-mentioned control, basically, it is possible to make the amount of exhaust of $NO_x$ from the upstream side exhaust purification catalyst 20 substantially zero. Further, the cumulative time period when calculating the cumulative oxygen excess/deficiency ΣOED is short, therefore compared with the case of cumulatively adding the values over a long time period, error in calculation is kept from occurring. For this reason, error in calculation of the cumulative oxygen excess/deficiency ΣOED is kept from causing the $NO_x$ to end up being exhausted.

Further, in general, if the oxygen storage amount of the exhaust purification catalyst is maintained constant, the oxygen storage ability of the exhaust purification catalyst falls. That is, to maintain the oxygen storage ability of the exhaust purification catalyst high, the oxygen storage amount of the exhaust purification catalyst has to fluctuate. As opposed to this, according to the present embodiment, as shown in FIG. 5, the oxygen storage amount OSA of the upstream side exhaust purification catalyst 20 constantly fluctuates up and down, therefore the oxygen storage ability is kept from falling.

Note that, in the above embodiment, during the times $t_1$ to $t_2$, the air-fuel ratio correction amount AFC is maintained at the lean set correction amount AFClean. However, during this time period, the air-fuel ratio correction amount AFC does not necessarily have to be maintained constant. It may be set to fluctuate, such as to gradually decrease. Alternatively, in the time period of the times $t_1$ to $t_2$, it is also possible to temporarily set the air-fuel ratio correction amount AFC to a value smaller than 0 (for example, the rich set correction amount, etc.).

Similarly, in the above embodiment, during the times $t_2$ to $t_3$, the air-fuel ratio correction amount AFC is maintained at the rich set correction amount AFCrich. However, during this time period, the air-fuel ratio correction amount AFC does not necessarily have to be maintained constant. It may be set to fluctuate, such as to gradually increase. Alternatively, in the time period of the times $t_2$ to $t_3$, it is also possible to temporarily set the air-fuel ratio correction amount AFC to a value larger than 0 (for example, the lean set correction amount, etc.).

Note that, in the present embodiment, the air-fuel ratio correction amount AFC is set, that is, the target air-fuel ratio is set, by the ECU 31. Therefore, the ECU 31 can be said to continuously or intermittently make the target air-fuel ratio of the exhaust gas flowing into the upstream side exhaust purification catalyst 20 a lean air-fuel ratio until the oxygen storage amount OSA of the upstream side exhaust purification catalyst 20 is estimated to have become the switching reference storage amount Cref or more when the output air-fuel ratio of the downstream side air-fuel ratio sensor 41 becomes the rich judged air-fuel ratio or less and to continuously or intermittently make the target air-fuel ratio a rich air-fuel ratio until the output air-fuel ratio of the downstream side air-fuel ratio sensor 41 becomes a rich judged air-fuel ratio or less without the oxygen storage amount OSA reaching the maximum storable oxygen amount Cmax when the oxygen storage amount OSA of the upstream side exhaust purification catalyst 20 is estimated to have become the switching reference storage amount Cref or more.

More simply speaking, in the present embodiment, the ECU 31 can be said to switch the target air-fuel ratio (that is, the air-fuel ratio of the exhaust gas flowing into the upstream side exhaust purification catalyst 20) to the lean air-fuel ratio when the output air-fuel ratio of the downstream side air-fuel ratio sensor 41 becomes the rich judged air-fuel ratio or less and to switch the target air-fuel ratio (that is, the air-fuel ratio of the exhaust gas flowing into the upstream side exhaust purification catalyst 20) to the rich air-fuel ratio when the oxygen storage amount OSA of the upstream side exhaust purification catalyst 20 becomes the switching reference storage amount Cref or more.

Note that, in the present embodiment, in the air-fuel ratio control, when the output air-fuel ratio AFdwn of the downstream side air-fuel ratio sensor 41 becomes the rich judged air-fuel ratio AFrich or less, the target air-fuel ratio is switched to the lean air-fuel ratio. Further, when the cumulative oxygen excess/deficiency ΣOED becomes the predetermined switching reference value OEDref or more, the target air-fuel ratio is switched to the rich air-fuel ratio. However, as air-fuel ratio control, other control may also be used. As this other control, for example, control may be considered where when the output air-fuel ratio of the downstream side air-fuel ratio sensor 41 becomes the lean judged air-fuel ratio or more, the target air-fuel ratio is switched to the rich air-fuel ratio, while when the output air-fuel ratio of the downstream side air-fuel ratio sensor 41 becomes the rich judged air-fuel ratio or less, the target air-fuel ratio is switched to the lean air-fuel ratio.

<Deviation at Upstream Side Air Fuel Ratio Sensor>

When the engine body 1 has a plurality of cylinders, sometimes a deviation occurs between the cylinders in the air-fuel ratio of the exhaust gas which is exhausted from the cylinders. On the other hand, the upstream side air-fuel ratio sensor 40 is arranged at the header of the exhaust manifold 19, but depending on the position of arrangement, the extent by which the exhaust gas which is exhausted from each cylinder is exposed to the upstream side air-fuel ratio sensor 40 differs between cylinders. As a result, the output air-fuel ratio of the upstream side air-fuel ratio sensor 40 is strongly affected by the air-fuel ratio of the exhaust gas which is exhausted from a certain specific cylinder. Therefore, when the air-fuel ratio of the exhaust gas which is exhausted from a certain specific cylinder becomes an air-fuel ratio which differs from the average air-fuel ratio of the exhaust gas which is exhausted from all cylinders, deviation occurs between the average air-fuel ratio and the output air-fuel ratio of the upstream side air-fuel ratio sensor 40. That is, the output air-fuel ratio of the upstream side air-fuel ratio sensor 40 deviates to the rich side or lean side from the average air-fuel ratio of the actual exhaust gas.

Further, hydrogen of the unburned gas, etc., passes through the diffusion regulation layer of the air-fuel ratio sensor in fast speed. Therefore, if the concentration of hydrogen in the exhaust gas is high, the output air-fuel ratio of the upstream side air-fuel ratio sensor 40 deviates to the lower side (i.e., the richer side) than the actual air-fuel ratio of the exhaust gas.

If deviation occurs in the output air-fuel ratio of the upstream side air-fuel ratio sensor 40 in this way, even if the above mentioned control is performed, sometimes $NO_x$ and oxygen flow out from the upstream side exhaust purification catalyst 20 or a frequency of the unburned gas, etc., flowing out therefrom becomes higher. This phenomenon will be explained with reference to FIG. 6 below.

Figure 6:
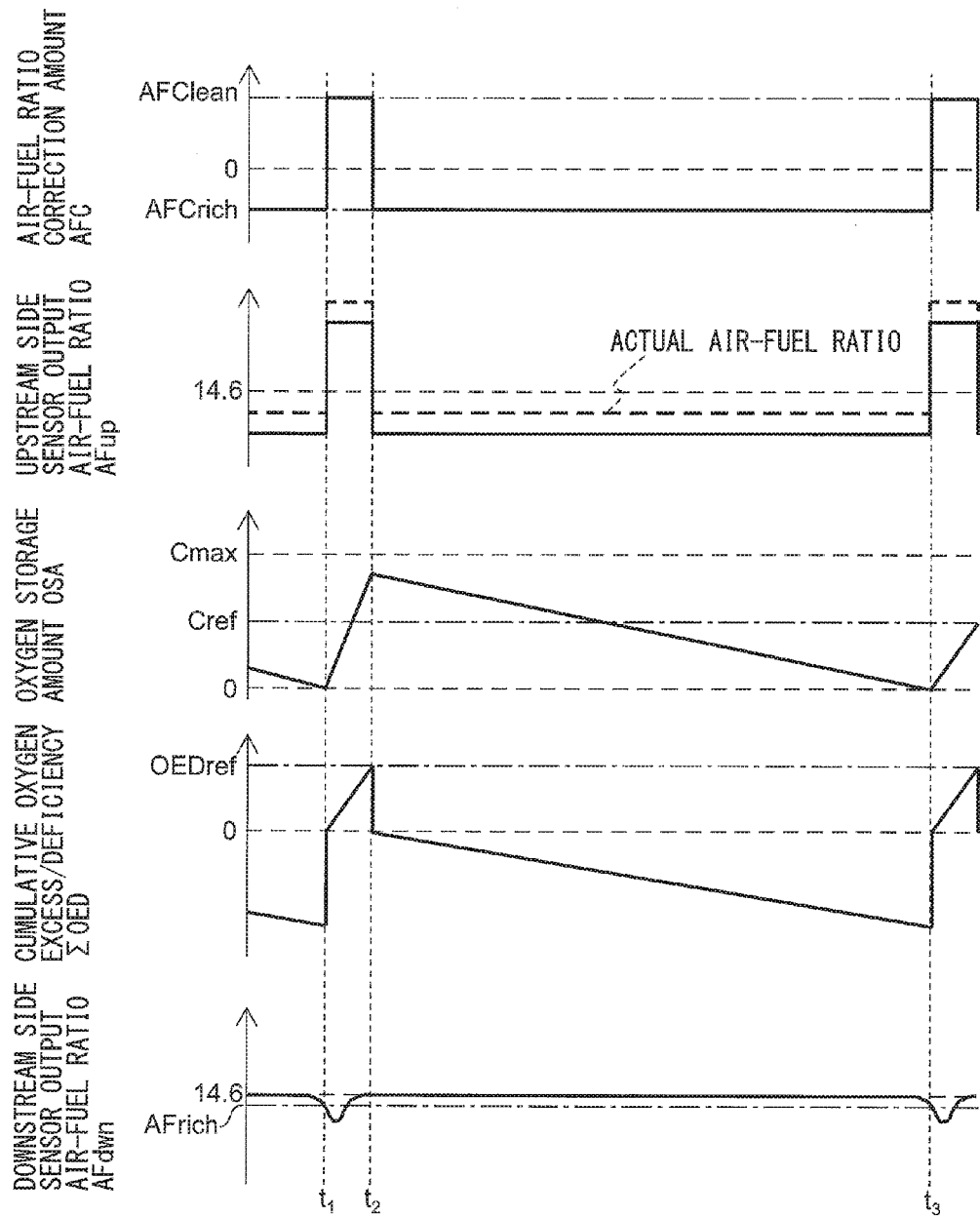
FIG. 6 is a time chart, similar to FIG. 5, showing a change of oxygen storage amount etc. of an upstream side exhaust purification catalyst.
Figure 7:
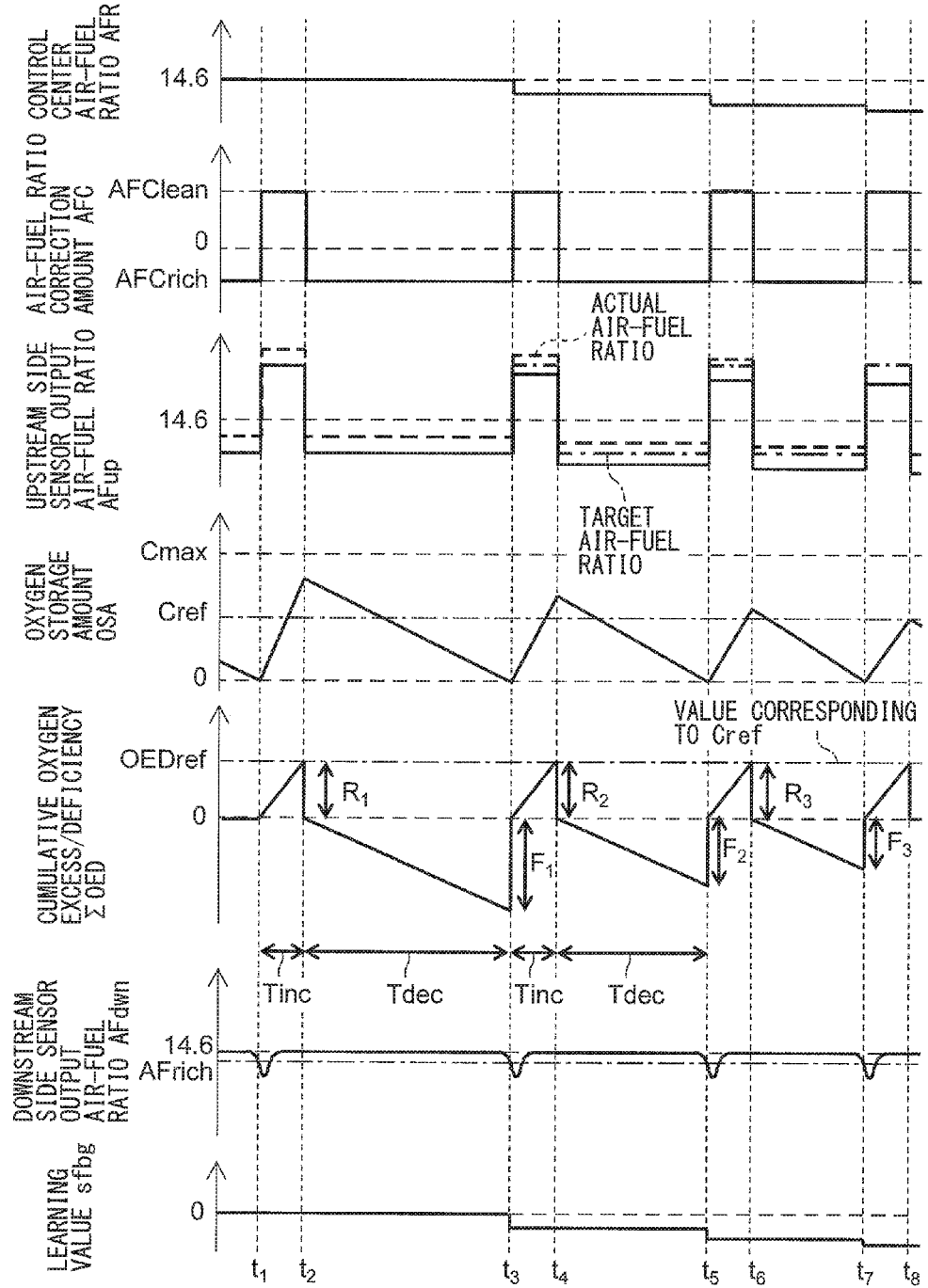
FIG. 7 is a time chart of a control center air-fuel ratio etc.

FIG. 6 is a time chart of the oxygen storage amount OSA of the upstream side exhaust purification catalyst 20, etc., similar to FIG. 5. FIG. 7 shows the case where the output air-fuel ratio of the upstream side air-fuel ratio sensor 40 deviates to the rich side. In the figure, the solid line in the output air-fuel ratio AFup of the upstream side air-fuel ratio sensor 40 shows the output air-fuel ratio of the upstream side air-fuel ratio sensor 40. On the other hand, the broken line shows the actual air-fuel ratio of the exhaust gas flowing around the upstream side air-fuel ratio sensor 40.

In the example shown in FIG. 6 as well, in the state before the time $t_1$, the air-fuel ratio correction amount AFC is set to the rich set correction amount AFCrich, and therefore the target air-fuel ratio is set to the rich set air-fuel ratio. Along with this, the output air-fuel ratio AFup of the upstream side air-fuel ratio sensor 40 becomes an air-fuel ratio equal to the rich set air-fuel ratio. However, since, as explained above, the output air-fuel ratio of the upstream side air-fuel ratio sensor 40 deviates to the rich side, the actual air-fuel ratio of the exhaust gas becomes an air-fuel ratio which is leaner than the rich set air-fuel ratio. That is, the output air-fuel ratio AFup of the upstream side air-fuel ratio sensor 40 becomes lower (richer) than the actual air-fuel ratio (broken line in the figure). For this reason, that is, since the actual air-fuel ratio of the exhaust gas deviates to the lean side, the decreasing speed of the oxygen storage amount OSA of the upstream side exhaust purification catalyst 20 is slower.

Further, in the example shown in FIG. 6, at the time $t_1$, the output air-fuel ratio AFdown of the downstream side air-fuel ratio sensor 41 reaches the rich judged air-fuel ratio AFrich. Therefore, as explained above, at the time $t_1$, the air-fuel ratio correction amount AFC is switched to the lean set correction amount AFClean. Accordingly, the target air-fuel ratio is switched to the lean set air-fuel ratio.

Along with this, the output air-fuel ratio AFup of the upstream side air-fuel ratio sensor 40 becomes an air-fuel ratio equal to the lean set air-fuel ratio. However, as explained above, the output air-fuel ratio of the upstream side air-fuel ratio sensor 40 deviates to the rich side, and therefore the actual air-fuel ratio of the exhaust gas becomes an air-fuel ratio leaner than the lean set air-fuel ratio. That is, the output air-fuel ratio AFup of the upstream side air-fuel ratio sensor 40 becomes lower (richer) than the actual air-fuel ratio (broken line in the drawing) Therefore, the increasing speed of the oxygen storage amount OSA of the upstream side exhaust purification catalyst 20 becomes faster, and the actual oxygen amount supplied to the upstream side exhaust purification catalyst 20 while the target air-fuel ratio set to the lean set air-fuel ratio becomes larger than the switching reference storage amount Cref.

In this way, if the output air-fuel ratio AFdwn of the upstream side air-fuel ratio sensor 40 deviates, when the air-fuel ratio correction amount AFC is set to the lean set correction amount AFClean, the lean degree of the air-fuel ratio of the exhaust gas flowing into the upstream side exhaust purification catalyst 20 becomes larger. For this reason, even if the oxygen storage amount OSA of the upstream side exhaust purification catalyst 20 does not reach the maximum storable oxygen amount Cmax, not all of the $NO_x$ or oxygen flowing into the upstream side exhaust purification catalyst 20 can be stored. Sometimes, $NO_x$ or oxygen ends up flowing out from the upstream side exhaust purification catalyst 20. Further, at the time $t_2$, the oxygen storage amount OSA of the upstream side exhaust purification catalyst 20 becomes the switching reference storage amount Cref or more. If, near the time $t_2$, the above-mentioned such unintended deviation of the air-fuel ratio etc. occurs, $NO_x$ or oxygen can flow out from the upstream side exhaust purification catalyst 20.

From the above, it becomes necessary to detect deviation in the output air-fuel ratio of the upstream side air-fuel ratio sensor 40 and is necessary to correct the output air-fuel ratio etc. based on the detected deviation.

<Normal Learning Control>

Therefore, in this embodiment of the present invention, to compensate for deviation of the output air-fuel ratio of the upstream side air-fuel ratio sensor 40, during normal operation (that is, when feedback control is carried out based on the above-mentioned target air-fuel ratio), normal learning control is performed. Below, this normal learning control will be explained.

Here, the time period from when switching the target air-fuel ratio to the lean air-fuel ratio to when the cumulative oxygen excess/deficiency ΣOED becomes the switching reference value OEDref or more, that is, until switching the target air-fuel ratio again to the rich air-fuel ratio, will be defined as the "oxygen increasing time period". Similarly, the time period from when switching the target air-fuel ratio to the rich air-fuel ratio to when the output air-fuel ratio of the downstream side air-fuel ratio sensor 41 becomes the rich judged air-fuel ratio or less, that is, until switching the target air-fuel ratio again to the lean air-fuel ratio, will be defined as the "oxygen decreasing time period". In the normal learning control of the present embodiment, a cumulative oxygen excess amount is calculated as the absolute value of the cumulative oxygen excess/deficiency ΣOED in the oxygen increasing time period. Note that, the cumulative oxygen excess amount expresses the cumulative value of the amount of oxygen becoming an excess when trying to make the air-fuel ratio of the exhaust gas flowing into the upstream side exhaust purification catalyst 20 the stoichiometric air-fuel ratio in the oxygen increasing time period. In addition, a cumulative oxygen deficiency amount is calculated as the absolute value of the cumulative oxygen excess/deficiency ΣOED in the oxygen decreasing time period. Note that, the cumulative oxygen deficiency amount expresses the cumulative value of the amount of oxygen becoming deficient when trying to make the air-fuel ratio of the exhaust gas flowing into the upstream side exhaust purification catalyst 20 the stoichiometric air-fuel ratio in the oxygen decreasing time period. Further, the control center air-fuel ratio AFR is corrected so that the difference of the cumulative oxygen excess amount and cumulative oxygen deficiency amount becomes smaller. FIG. 7 shows this state.

FIG. 7 is a time chart of the control center air-fuel ratio AFR, the air-fuel ratio correction amount AFC, the output air-fuel ratio AFup of the upstream side air-fuel ratio sensor 40, the oxygen storage amount OSA of the upstream side exhaust purification catalyst 20, the cumulative oxygen excess/deficiency ΣOED, the output air-fuel ratio AFdwn of the downstream side air-fuel ratio sensor 41, and a learning value sfbg. FIG. 7 shows the case, like FIG. 6, where the output air-fuel ratio AFup of the upstream side air-fuel ratio sensor 40 deviates to the low side (rich side). Note that, the learning value sfbg is a value which changes in accordance with the deviation of the output air-fuel ratio of the upstream side air-fuel ratio sensor 40 and is used for correction of the control center air-fuel ratio AFR in the present embodiment. Further, in the figure, the solid line in the output air-fuel ratio AFup of the upstream side air-fuel ratio sensor 40 indicates the output air-fuel ratio of the upstream side air-fuel ratio sensor 40, and the broken line indicates actual air-fuel ratio of the exhaust gas flowing around the upstream side air-fuel ratio sensor 40. Further, the one-dot chain line indicates the target air-fuel ratio, i.e., an air-fuel ratio of the stoichiometric air-fuel ratio plus the air-fuel ratio correction amount AFC.

In the example shown in FIG. 7, similarly to FIGS. 5 and 6, in the state before the time $t_1$, the control center air-fuel ratio is set to the stoichiometric air-fuel ratio, and the air-fuel ratio correction amount AFC is set to the rich set correction amount AFCrich. At this time, the output air-fuel ratio AFup of the upstream side air-fuel ratio sensor 40, as shown by the solid line, becomes an air-fuel ratio corresponding to the rich set air-fuel ratio. However, since the output air-fuel ratio AFup of the upstream side air-fuel ratio sensor 40 deviates, the actual air-fuel ratio of the exhaust gas is an air-fuel ratio which is leaner than the rich set air-fuel ratio (the broken line in FIG. 7). However, in the example shown in FIG. 7, as will be understood from the broken line of FIG. 7, the actual air-fuel ratio of the exhaust gas before the time $t_1$ becomes a rich air-fuel ratio which is leaner than the rich set air-fuel ratio. Therefore, the oxygen storage amount of the upstream side exhaust purification catalyst 20 is gradually decreased.

At the time $t_1$, the output air-fuel ratio AFdwn of the downstream side air-fuel ratio sensor 41 reaches the rich judged air-fuel ratio AFrich. Due to this, as explained above, the air-fuel ratio correction amount AFC is switched to the lean set correction amount AFClean. After the time $t_1$, the output air-fuel ratio of the upstream side air-fuel ratio sensor 40 becomes an air-fuel ratio corresponding to the lean set air-fuel ratio. However, due to deviation of the output air-fuel ratio of the upstream side air-fuel ratio sensor 40, the actual air-fuel ratio of the exhaust gas becomes an air-fuel ratio which is leaner than the lean set air-fuel ratio, that is, an air-fuel ratio with a great lean degree (see broken line of FIG. 7). Therefore, the oxygen storage amount OSA of the upstream side exhaust purification catalyst 20 rapidly increases.

On the other hand, the oxygen excess/deficiency OED is calculated based on the output air-fuel ratio AFup of the upstream side air-fuel ratio sensor 40. However, as explained above, deviation occurs in the output air-fuel ratio AFup of the upstream side air-fuel ratio sensor 40. Therefore, the calculated oxygen excess/deficiency OED becomes a value smaller than the actually oxygen excess/deficiency OED (i.e., a smaller amount of oxygen). As a result, the cumulative oxygen excess/deficiency ΣOED becomes smaller than the actual amount.

At the time $t_2$, the cumulative oxygen excess/deficiency ΣOED reaches the switching reference value OEDref. Therefore, the air-fuel ratio correction amount AFC is switched to the rich set correction amount AFCrich. Therefore, the target air-fuel ratio is set to the rich air-fuel ratio. At this time, the actual oxygen storage amount OSA, as shown in FIG. 7, becomes greater than the switching reference storage amount Cref.

After the time $t_2$, similarly to the state before the time $t_1$, the air-fuel ratio correction amount AFC is set to the rich set correction amount AFCrich and accordingly the target air-fuel ratio is set to the rich air-fuel ratio. At this time as well, the actual air-fuel ratio of the exhaust gas is an air-fuel ratio which is leaner than the rich set air-fuel ratio. As a result, the upstream side exhaust purification catalyst 20 becomes slower in speed of decrease of the oxygen storage amount OSA. In addition, as explained above, at the time $t_2$, the actual oxygen storage amount of the upstream side exhaust purification catalyst 20 becomes greater than the switching reference storage amount Cref. Therefore, time is taken until the actual oxygen storage amount OSA of the upstream side exhaust purification catalyst 20 reaches zero.

At the time $t_3$, the output air-fuel ratio AFdwn of the downstream side air-fuel ratio sensor 41 reaches the rich judged air-fuel ratio AFrich. Due to this, as explained above, the air-fuel ratio correction amount AFC is switched to the lean set correction amount AFClean. Therefore, the target air-fuel ratio is switched from the rich set air-fuel ratio to the lean set air-fuel ratio.

In the present embodiment, as explained above, the cumulative oxygen excess/deficiency ΣOED is calculated from the time $t_1$ to the time $t_2$. In this regard, if referring to the time period from when the target air-fuel ratio is switched to the lean air-fuel ratio (time $t_1$) to when the estimated value of the oxygen storage amount OSA of the upstream side exhaust purification catalyst 20 becomes the switching reference storage amount Cref or more (time $t_2$), as the "oxygen increase time period Tinc", in the present embodiment, the cumulative oxygen excess/deficiency ΣOED is calculated in the oxygen increase time period Tinc. In FIG. 7, the absolute value of the cumulative oxygen excess/deficiency ΣOED in the oxygen increase time period Tinc from the time $t_1$ to time $t_2$ (the cumulative oxygen excess amount) is shown as $R_1$.

This cumulative oxygen excess amount $R_1$ corresponds to the oxygen storage amount OSA at the time $t_2$. However, as explained above, estimation of the oxygen excess/deficiency OED uses the output air-fuel ratio AFup of the upstream side air-fuel ratio sensor 40, and deviation occurs in this output air-fuel ratio AFup. Therefore, in the example shown in FIG. 7, the cumulative oxygen excess amount $R_1$ from the time $t_1$ to time $t_2$ becomes smaller than the value which corresponds to the actual oxygen storage amount OSA at the time $t_2$.

Further, in the present embodiment, the cumulative oxygen excess/deficiency ΣOED is also calculated from the time $t_2$ to time $t_3$. In this regard, if referring to the time period from when the target air-fuel ratio is switched to the rich air-fuel ratio (time $t_2$) to when the output air-fuel ratio AFdwn of the downstream side air-fuel ratio sensor 41 reaches the rich judged air-fuel ratio AFrich (time $t_3$), as the "oxygen decrease time period Tdec", in the present embodiment, the cumulative oxygen excess/deficiency ΣOED is calculated in the oxygen decrease time period Tdec. In FIG. 7, the absolute value of the cumulative oxygen excess/deficiency ΣOED at the oxygen decrease time period Tdec from the time $t_2$ to time $t_3$ is shown as $F_1$.

This cumulative oxygen deficiency amount $F_1$ corresponds to the total oxygen amount which is released from the upstream side exhaust purification catalyst 20 from the time $t_2$ to the time $t_3$. However, as explained above, deviation occurs in the output air-fuel ratio AFup of the upstream side air-fuel ratio sensor 40. Therefore, in the example shown in FIG. 7, the cumulative oxygen deficiency amount $F_1$ from the time $t_2$ to time $t_3$ is larger than the value which corresponds to the total amount of oxygen which is released from the upstream side exhaust purification catalyst 20 from the time $t_2$ to the time $t_3$.

In this regard, in the oxygen increase time period Tinc, oxygen is stored at the upstream side exhaust purification catalyst 20, while in the oxygen decrease time period Tdec, the stored oxygen is completely released. Therefore, the cumulative oxygen excess amount $R_1$ and the cumulative oxygen deficiency amount $F_1$ basically should be the same value. However, as explained above, when deviation occurs in the output air-fuel ratio of the upstream side air-fuel ratio sensor 40, the cumulative value changes in accordance with the deviation. As explained above, when the output air-fuel ratio of the upstream side air-fuel ratio sensor 40 deviates to the low side (rich side), the cumulative oxygen deficiency amount $F_1$ becomes greater than the cumulative oxygen excess amount $R_1$. Conversely, when the output air-fuel ratio of the upstream side air-fuel ratio sensor 40 deviates to the high side (lean side), the cumulative oxygen deficiency amount $F_1$ becomes smaller compared with the cumulative oxygen excess amount $R_1$. In addition, the difference ΔΣOED between the cumulative oxygen excess amount $R_1$ and the cumulative oxygen deficiency amount $F_1$ (=$R_1-F_1$. Below, referred to as the "excess/deficiency error") expresses the extent of deviation at the output air-fuel ratio of the upstream side air-fuel ratio sensor 40. It can be considered that the larger this excess/deficiency error ΔΣOED, the greater the deviation in the output air-fuel ratio of the upstream side air-fuel ratio sensor 40.

Therefore, in the present embodiment, based on the excess/deficiency error ΔΣOED, the control center air-fuel ratio AFR is corrected. In particular, in the present embodiment, the control center air-fuel ratio AFR is corrected so that the difference ΔΣOED between the cumulative oxygen excess amount $R_1$ and the cumulative oxygen deficiency amount $F_1$ becomes smaller.

Specifically, in the present embodiment, the learning value sfbg is calculated by the following formula (2), and the control center air-fuel ratio AFR is corrected by the following formula (3).

$$sfbg(n)=sfbg(n-1)+k_1 \cdot \Delta \Sigma OED \qquad (2)$$

$$AFR=AFRbase+sfbg(n) \qquad (3)$$

Note that, in the above formula (2), "n" expresses the number of calculations or time. Therefore, sfbg(n) is the current calculated value or current learning value. In addition, "$k_1$" in the above formula (2) is the gain which shows the extent by which the excess/deficiency error ΔΣOED is reflected in the control center air-fuel ratio AFR. The larger the value of the gain "$k_1$", the larger the correction amount of the control center air-fuel ratio AFR. In addition, in the above formula (3), the base control center air-fuel ratio AFRbase is a control center air-fuel ratio which is used as base, and is the stoichiometric air-fuel ratio in the present embodiment.

As will be understood from formula (3), when the learning value sfbg is a negative value, the control center air-fuel ratio AFR is changed to the rich side and, accordingly, the air-fuel ratio of the exhaust gas flowing into the upstream side exhaust purification catalyst 20 is changed to the rich side. Further, the larger the absolute value, the larger the degree by which the control center air-fuel ratio AFR is changed to the rich side. Therefore, when the learning value sfbg is zero, the larger the absolute value when the learning value sfbg is a negative value (rich side absolute value) with respect to the air-fuel ratio of the exhaust gas flowing into the upstream side exhaust purification catalyst 20, the greater the air-fuel ratio of the exhaust gas flowing into the upstream side exhaust purification catalyst 20 is changed to the rich side.

Similarly, when the learning value sfbg is a positive value, the control center air-fuel ratio AFR is changed to the lean side and accordingly the air-fuel ratio of the exhaust gas flowing into the upstream side exhaust purification catalyst 20 is changed to the lean side. Further, the larger the absolute value becomes, the greater the degree by which the control center air-fuel ratio AFR is changed to the lean side. Therefore, when the learning value sfbg is zero, the larger the absolute value with respect to the air-fuel ratio of the exhaust gas flowing into the upstream side exhaust purification catalyst 20 when the learning value sfbg is a positive value (lean side absolute value), the more the air-fuel ratio of the exhaust gas flowing into the upstream side exhaust purification catalyst 20 is changed to the lean side.

At the time $t_3$ of FIG. 7, as explained above, the learning value sfbg is calculated based on the cumulative oxygen excess amount $R_1$ and the cumulative oxygen deficiency amount $F_1$. In particular, in the example shown in FIG. 7, since the absolute value $F_1$ of the cumulative oxygen excess/deficiency at the oxygen decrease time period Tdec is larger than the absolute value $R_1$ of the cumulative oxygen excess/deficiency at the oxygen increase time period Tinc, at the time $t_3$, the learning value sfbg is decreased.

At this time, as can be understood from the above formula (3), the control center air-fuel ratio AFR is corrected based on the learning value sfbg. In the example shown in FIG. 7, the learning value sfbg is a negative value, and therefore the control center air-fuel ratio AFR becomes a value smaller than the basic control center air-fuel ratio AFRbase, that is, the rich side value. Accordingly, the air-fuel ratio of the exhaust gas flowing into the upstream side exhaust purification catalyst 20 is corrected to the rich side.

As a result, the deviation of the actual air-fuel ratio of the exhaust gas flowing into the upstream side exhaust purification catalyst 20 with respect to the target air-fuel ratio after the time $t_3$ becomes smaller than before the time $t_3$. Therefore, the difference between the broken line indicating the actual air-fuel ratio and the one-dot chain line indicating the target air-fuel ratio after the time $t_3$ becomes smaller than the difference before the time $t_3$.

Further, after the time $t_3$ as well, an operation similar to the operation during the time $t_1$ to time $t_2$ is performed. Therefore, at the time $t_4$, if the cumulative oxygen excess/deficiency ΣOED reaches the switching reference value OEDref, the target air-fuel ratio is switched from the lean set air-fuel ratio to the rich set air-fuel ratio. Then, at the time $t_5$, when the output current Irdwn of the downstream side air-fuel ratio sensor 41 reaches the rich judged air-fuel ratio AFrich, the target air-fuel ratio is again switched to the lean set air-fuel ratio.

The period from the time $t_3$ to time $t_4$, as explained above, corresponds to the oxygen increase time period Tinc. Therefore, the absolute value of the cumulative oxygen excess/deficiency ΣOED during this period is expressed by the cumulative oxygen excess amount $R_2$ of FIG. 7. Further, the period from the time $t_4$ to time $t_5$, as explained above, corresponds to the oxygen decrease time period Tdec, and therefore the absolute value of the cumulative oxygen excess/deficiency ΣOED during this period is expressed by the cumulative oxygen deficiency amount $F_2$ of FIG. 7. Further, the learning value sfbg is updated based on the difference $\Delta\Sigma OED(=R_2-F_2)$ of the cumulative oxygen excess amount $R_1$ and the cumulative oxygen deficiency amount $F_1$ by using the above formula (2). In the present embodiment, similar control is repeated after the time $t_5$ and, due to this, the learning value sfbg is repeatedly updated.

By updating the normal learning value sfbg as stated above, the output air-fuel ratio AFup of the upstream side air-fuel ratio sensor 40 is gradually separated away from the target air-fuel ratio, but the actual air-fuel ratio of the exhaust gas flowing into the upstream side exhaust purification catalyst 20 gradually approaches the target air-fuel ratio. Due to this, it is possible to gradually compensate the deviation in the output air-fuel ratio of the upstream side air-fuel ratio sensor 40.

Note that, as explained above, the learning value sfbg is updated based on the cumulative oxygen excess/deficiency ΣOED at the oxygen increasing time period Tinc and the cumulative oxygen excess/deficiency ΣOED in the oxygen decreasing time period Tdec directly following this oxygen increasing time period Tinc. This is because, as explained above, the total amount of oxygen stored at the upstream side exhaust purification catalyst 20 in the oxygen increasing time period Tinc and the total amount of oxygen released from the upstream side exhaust purification catalyst 20 in the directly following oxygen decreasing time period Tdec become equal.

In addition, in the present embodiment, based on the cumulative oxygen excess/deficiency ΣOED at one oxygen increasing time period Tinc and the cumulative oxygen excess/deficiency ΣOED at one oxygen decreasing time period Tdec, the learning value sfbg is updated. However, the learning value sfbg may be updated based on the total value or average value of the cumulative oxygen excess/deficiency ΣOED at a plurality of oxygen increasing time periods Tinc and the total value or average value of the cumulative oxygen excess/deficiency ΣOED at a plurality of oxygen decreasing time periods Tdec.

Further, in the present embodiment, based on the learning value sfbg, the control center air-fuel ratio is corrected. However, what is corrected based on the learning value sfbg may be another parameter relating to the air-fuel ratio. As the other parameter, for example, the amount of feed of fuel to the combustion chamber 5, the output air-fuel ratio of the upstream side air-fuel ratio sensor 40, the air-fuel ratio correction amount, etc. may be mentioned.

Note that, as the air-fuel ratio control, the above-mentioned other control may also be performed. Specifically, as the other control, for example, control may be considered where the target air-fuel ratio is switched to the rich air-fuel ratio when the output air-fuel ratio of the downstream side air-fuel ratio sensor 41 becomes the lean judged air-fuel ratio or more and the target air-fuel ratio is switched to the lean air-fuel ratio when the output air-fuel ratio of the downstream side air-fuel ratio sensor 41 becomes the rich judged air-fuel ratio or less.

In this case, the cumulative oxygen deficiency is calculated as the absolute value of the cumulative oxygen excess/deficiency in the oxygen decreasing time period from when the target air-fuel ratio is switched to the rich air-fuel ratio to when the output air-fuel ratio of the downstream side air-fuel ratio sensor 41 becomes the rich judged air-fuel ratio or less. In addition, the cumulative oxygen excess is calculated as the absolute value of the cumulative oxygen excess/deficiency in the oxygen increasing period from when the target air-fuel ratio is switched to the lean air-fuel ratio to when the output air-fuel ratio of the downstream side air-fuel ratio sensor 41 becomes the lean judged air-fuel ratio or more. Further, the control center air-fuel ratio etc. are corrected so that the difference between the cumulative oxygen excess amount and cumulative oxygen deficiency amount becomes smaller.

Therefore, summarizing the above, in the present embodiment, it can be said that, in normal learning control, based on the cumulative oxygen excess amount in the oxygen increasing period from when switching the target air-fuel ratio to the lean air-fuel ratio to when again switching it to the rich air-fuel ratio and the cumulative oxygen deficiency amount in the oxygen decreasing time period from when switching the target air-fuel ratio to the rich air-fuel ratio to when again switching it to the lean air-fuel ratio, a parameter relating to the air-fuel ratio is corrected so that the difference of the cumulative oxygen excess amount and cumulative oxygen deficiency amount becomes smaller.

<Large Deviation in Upstream Side Air-Fuel Ratio Sensor>

In the example shown in FIG. 6, deviation occurs in the output air-fuel ratio of the upstream side air-fuel ratio sensor 40, but the extent thereof is not that large. Therefore, as will be understood from the broken line of FIG. 6, when the target air-fuel ratio is set to the rich set air-fuel ratio, the actual air-fuel ratio of the exhaust gas becomes a rich air-fuel ratio while leaner than the rich set air-fuel ratio.

As opposed to this, if the deviation which occurs at the upstream side air-fuel ratio sensor 40 becomes larger, even if the target air-fuel ratio is set to the rich set air-fuel ratio, sometimes the actual air-fuel ratio of the exhaust gas becomes the stoichiometric air-fuel ratio. This state is shown in FIG. 8.

Figure 8:
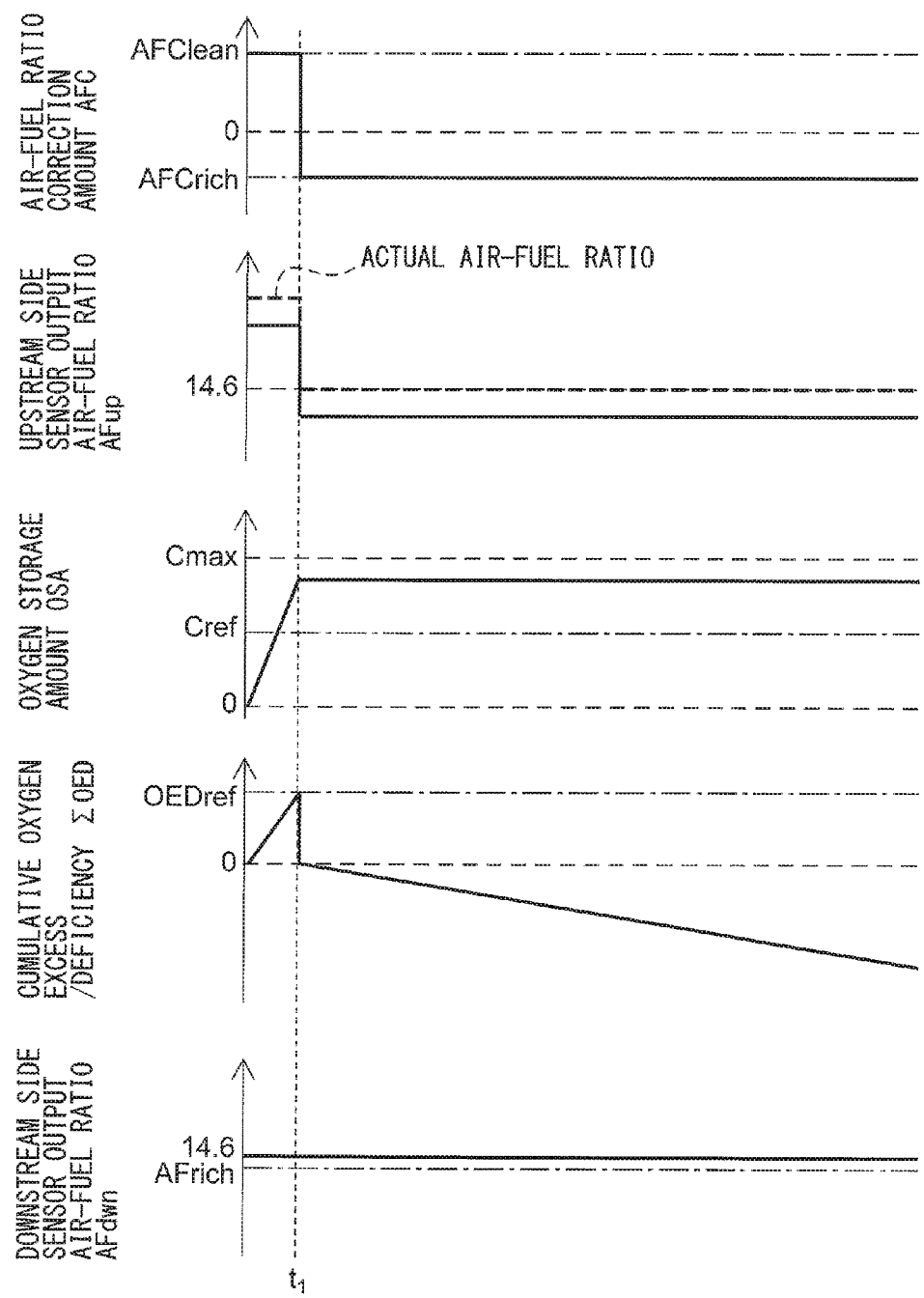
FIG. 8 is a time chart of an air-fuel ratio correction amount etc. when a large deviation occurs in an output value of an upstream side air-fuel ratio sensor.

In FIG. 8, before the time $t_1$, the air-fuel ratio correction amount AFC is set to the lean set correction amount AFClean. Along with this, the output air-fuel ratio AFup of the upstream side air-fuel ratio sensor 40 becomes the lean set air-fuel ratio. However, since the output air-fuel ratio of the upstream side air-fuel ratio sensor 40 greatly deviates to the rich side, the actual air-fuel ratio of the exhaust gas becomes an air-fuel ratio leaner than the lean set air-fuel ratio (broken line in figure).

Then, if, at the time $t_1$, the cumulative oxygen excess/deficiency ΣOED calculated based on the output air-fuel ratio AFup of the upstream side air-fuel ratio sensor 40 reaches the switching reference value OEDref, the air-fuel ratio correction amount AFC is switched to the rich set correction amount AFCrich. Along with this, the output air-fuel ratio AFup of the upstream side air-fuel ratio sensor 40 becomes an air-fuel ratio which corresponds to the rich set air-fuel ratio. However, since the output air-fuel ratio of the upstream side air-fuel ratio sensor 40 greatly deviates to the rich side, the actual air-fuel ratio of the exhaust gas becomes the stoichiometric air-fuel ratio (broken line in figure).

As a result, the oxygen storage amount OSA of the upstream side exhaust purification catalyst 20 does not change, but is maintained at a constant value. Therefore, even if a long time elapses after the air-fuel ratio correction amount AFC is switched to the rich set correction amount AFCrich, since unburned gas is not discharged from the upstream side exhaust purification catalyst 20, the output air-fuel ratio AFdwn of the downstream side air-fuel ratio sensor 41 is maintained at substantially the stoichiometric air-fuel ratio. As explained above, the air-fuel ratio correction amount AFC is switched from the slight rich set correction amount AFCsrich to the lean set correction amount AFClean, when the output air-fuel ratio AFdwn of the downstream side air-fuel ratio sensor 41 reaches the rich judged air-fuel ratio AFrich. However, in the example shown in FIG. 8, since the output air-fuel ratio AFdwn of the downstream side air-fuel ratio sensor 41 is maintained at the stoichiometric air-fuel ratio, the air-fuel ratio correction amount AFC is maintained at the rich set correction amount AFCrich for a long time. In this regard, the above-mentioned normal learning control is predicated on the air-fuel ratio correction amount being alternately switched between the rich set correction amount AFCrich and the lean set correction amount AFClean. Therefore, when the output air-fuel ratio of the upstream side air-fuel ratio sensor 40 greatly deviates, the air-fuel ratio correction amount is not switched, and therefore the above-mentioned normal learning control cannot be performed.

Figure 9:
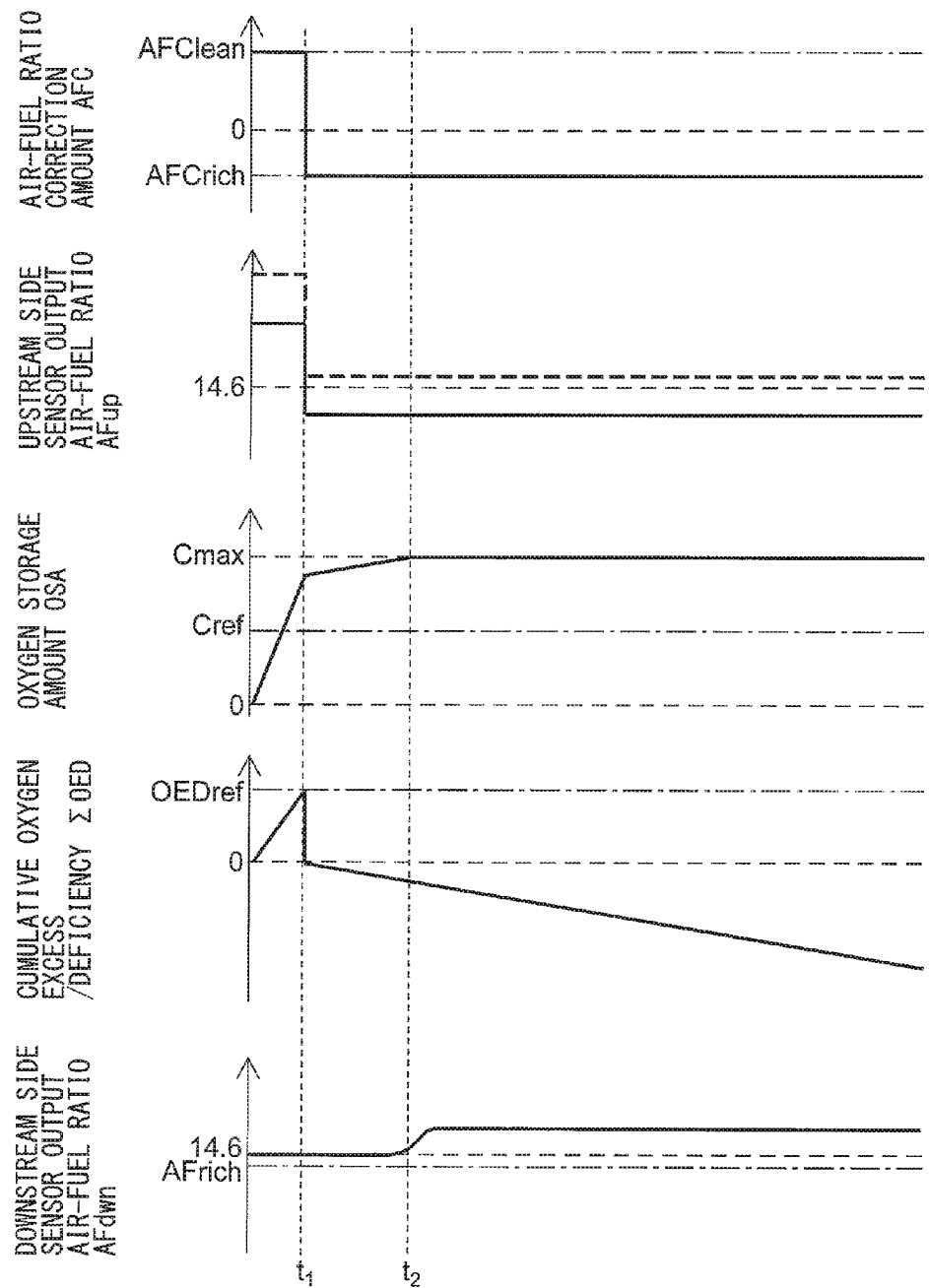
FIG. 9 is a time chart of an air-fuel ratio correction amount etc. when a large deviation occurs in an output value of an upstream side air-fuel ratio sensor.

FIG. 9 is a view similar to FIG. 8, which shows the case where the output air-fuel ratio of the upstream side air-fuel ratio sensor 40 extremely greatly deviates to the rich side. In the example shown in FIG. 9, similarly to the example shown in FIG. 8, at the time $t_1$, the air-fuel ratio correction amount AFC is switched to the rich set correction amount AFCrich. That is, at the time $t_1$, the target air-fuel ratio is set to the rich set air-fuel ratio. However, due to deviation of the output air-fuel ratio of the upstream side air-fuel ratio sensor 40, the actual air-fuel ratio of the exhaust gas becomes a lean air-fuel ratio (broken line in the figure).

As a result, nevertheless the air-fuel ratio correction amount AFC is set to the rich set correction amount AFCrich, exhaust gas of a lean air-fuel ratio flows into the upstream side exhaust purification catalyst 20. Therefore, the oxygen storage amount OSA of the upstream side exhaust purification catalyst 20 gradually increases, and finally reaches the maximum storable oxygen amount Cmax at the time $t_2$. If, in this way, the oxygen storage amount OSA reaches the maximum storable oxygen amount Cmax, the upstream side exhaust purification catalyst 20 cannot store oxygen in the exhaust gas any more. Therefore, oxygen and NOx contained in the inflowing exhaust gas flow out from the upstream side exhaust purification catalyst 20 as it is, and thus the output air-fuel ratio AFdwn of the downstream side air-fuel ratio sensor 41 raises. However, the air-fuel ratio correction amount AFC is switched from the rich set correction amount AFCrich to the lean set correction amount AFClean, when the output air-fuel ratio AFdwn of the downstream side air-fuel ratio sensor 41 reaches the rich judged air-fuel ratio AFrich. Therefore, when the output air-fuel ratio of the upstream side air-fuel ratio sensor 40 deviates extremely greatly, the air-fuel ratio correction amount AFC is not switched, and therefore the above-mentioned normal control cannot be performed.

<Stuck Learning Control>

Therefore, in the present embodiment, even if the deviation of the output air-fuel ratio of the upstream side air-fuel ratio sensor 40 is large, to compensate that deviation, in addition to the above-mentioned normal learning control, i.e., the learning value update control, stoichiometric air-fuel ratio stuck learning control, lean stuck learning control, and rich stuck learning control are performed.

<Stoichiometric Air-Fuel Ratio Stuck Learning>

First, the stoichiometric air-fuel ratio stuck learning control will be explained. The stoichiometric air-fuel ratio stuck learning control is learning control which is performed when the output air-fuel ratio of the downstream side air-fuel ratio sensor 41 is stuck at the stoichiometric air-fuel ratio as shown in the example shown in FIG. 10.

Figure 10:
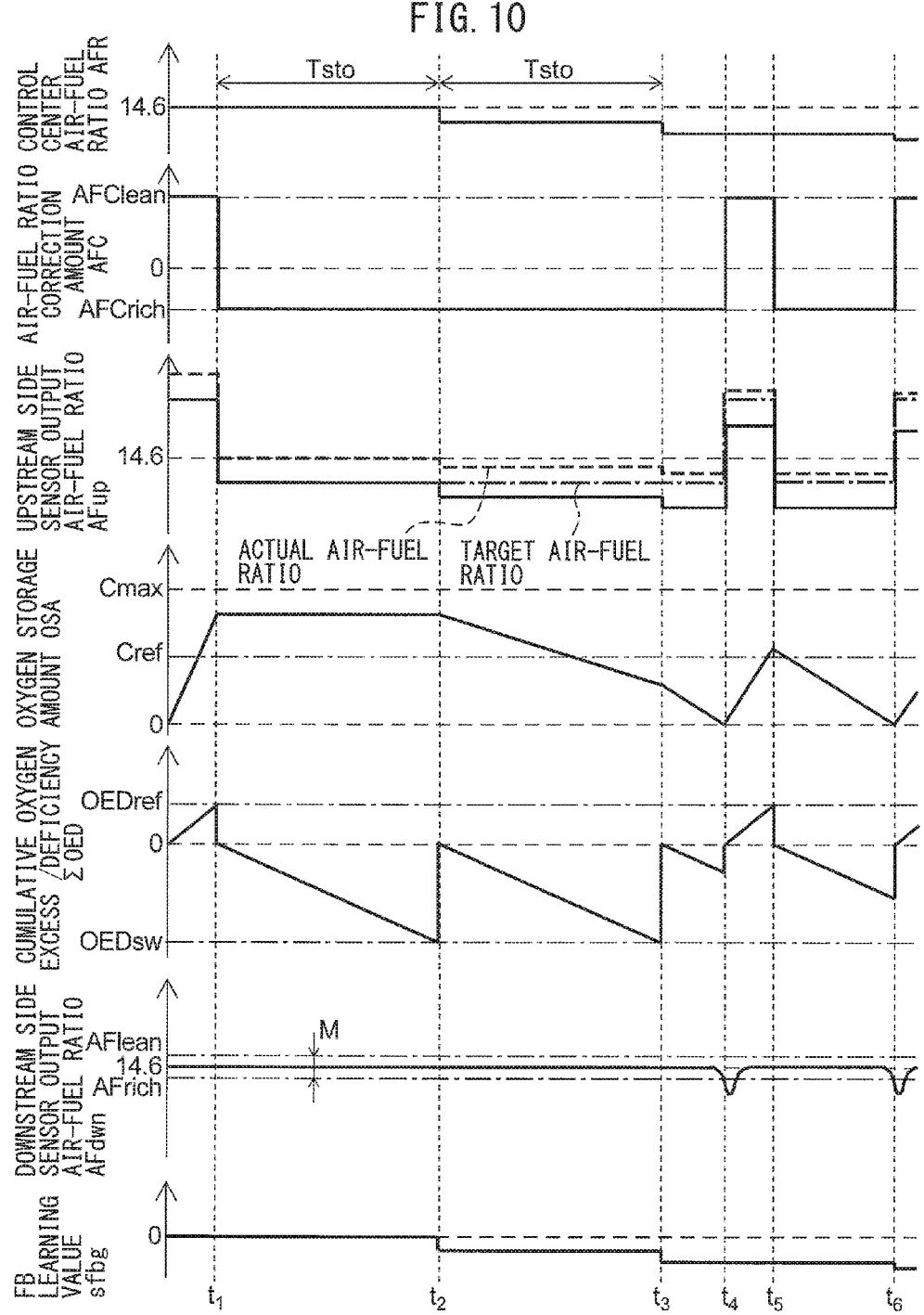
FIG. 10 is a time chart of an air-fuel ratio correction amount etc. when performing stoichiometric air-fuel ratio stuck learning.

In this regard, the region between the rich judged air-fuel ratio AFrich and the lean judged air-fuel ratio AFlean will be referred to as the "the intermediate region M". This intermediate region M corresponds to the stoichiometric air-fuel ratio proximity region which is an air-fuel ratio region between the rich judged air-fuel ratio and the lean judged air-fuel ratio. In stoichiometric air-fuel ratio-stuck learning control, after the air-fuel ratio correction amount AFC is switched to the rich set correction amount AFCrich, that is, after the target air-fuel ratio is switched to the rich set air-fuel ratio, it is judged if the output air-fuel ratio AFdwn of the downstream side air-fuel ratio sensor 41 has been maintained in the intermediate region M for a predetermined stoichiometric air-fuel ratio maintenance judgement time or more. Further, if the output air-fuel ratio AFdwn of the downstream side air-fuel ratio sensor 41 has been maintained in the intermediate region M for the stoichiometric air-fuel ratio maintenance judgement time or more, the learning value sfbg is reduced so that the air-fuel ratio of the exhaust gas flowing into the upstream side exhaust purification catalyst 20 changes to the rich side. FIG. 10 shows this state.

FIG. 10 is a view similar to FIG. 9 which shows a time chart of the air-fuel ratio correction amount AFC, etc. FIG. 10, similarly to FIG. 8, shows the case where the output air-fuel ratio AFup of the upstream side air-fuel ratio sensor 40 greatly deviates to the low side (rich side).

In the example shown in the figure, similarly to FIG. 8, before the time $t_1$, the air-fuel ratio correction amount AFC is set to the lean set correction amount AFClean. Then, at the time t1, the cumulative oxygen excess/deficiency ΣOED reaches the switching reference value OEDref, and the air-fuel ratio correction amount AFC is switched to the rich set correction amount AFCrich. However, since the output air-fuel ratio of the upstream side air-fuel ratio sensor 40 greatly deviates to the rich side, similarly to the example shown in FIG. 8, the actual air-fuel ratio of the exhaust gas is substantially the stoichiometric air-fuel ratio. Therefore, after the time $t_1$, the oxygen storage amount OSA of the upstream side exhaust purification catalyst 20 is maintained at a constant value. As a result, the output air-fuel ratio AFdwn of the downstream side air-fuel ratio sensor 41 is maintained in the stoichiometric air-fuel ratio proximity, that is, intermediate region M, for a long time period.

Therefore, in the present embodiment, if the output air-fuel ratio AFdwn of the downstream side air-fuel ratio sensor 41 is maintained in the intermediate region M for the predetermined stoichiometric air-fuel ratio maintenance judgement time Tsto or more after the air-fuel ratio correction amount AFC is switched to the rich set correction amount AFCrich, the control center air-fuel ratio AFR is corrected. In particular, in the present embodiment, the learning value sfbg is updated so that the air-fuel ratio of the exhaust gas flowing into the upstream side exhaust purification catalyst 20 changes to the rich side.

Specifically, in the present embodiment, the learning value sfbg is calculated by the following formula (4), and the control center air-fuel ratio AFR is corrected by the above formula (3).

$$sfbg(n)=sfbg(n-1)+k_2 \cdot AFCrich \quad (4)$$

Note that in the above formula (4), $k_2$ is the gain which shows the extent of correction of the control center air-fuel ratio AFR ($0<k_2 \leq 1$). The larger the value of the gain $k_2$, the larger the correction amount of the control center air-fuel ratio AFR becomes.

In this regard, as explained above, if the output air-fuel ratio AFdwn of the downstream side air-fuel ratio sensor 41 is maintained in the intermediate region M for a long period of time after the air-fuel ratio correction amount AFC is switched, the actual air-fuel ratio of the exhaust gas is a value close to substantially the stoichiometric air-fuel ratio. Therefore, the deviation at the upstream side air-fuel ratio sensor 40 is the same extent as the difference between the control center air-fuel ratio (stoichiometric air-fuel ratio) and the target air-fuel ratio (in this case, the rich set air-fuel ratio). In the present embodiment, as shown in the above formula (4), the learning value sfbg is updated based on the air-fuel ratio correction amount AFC corresponding to the difference between the control center air-fuel ratio and the target air-fuel ratio. Due to this, it is possible to more suitably compensate for deviation in the output air-fuel ratio of the upstream side air-fuel ratio sensor 40.

In the example shown in FIG. 10, at the time $t_2$ at which the stoichiometric air-fuel ratio maintenance judgement time Tsto elapses from the time $t_1$, the air-fuel ratio correction amount AFC is set to the rich set correction amount AFCrich. Therefore, if formula (4) is used, at the time $t_2$, the learning value sfbg is decreased. As a result, the actual air-fuel ratio of the exhaust gas flowing into the upstream side exhaust purification catalyst 20 changes to the rich side. Due to this, after the time $t_2$, the deviation of the actual air-fuel ratio of the exhaust gas flowing into the upstream side exhaust purification catalyst 20 from the target air-fuel ratio becomes smaller compared with before the time $t_2$. Therefore, after the time $t_2$, the difference between the broken line which shows the actual air-fuel ratio and the one-dot chain line which shows the target air-fuel ratio becomes smaller than the difference before the time $t_2$.

In the example shown in FIG. 10, the gain $k_2$ is set to a relatively small value. Therefore, even if the learning value sfbg is updated at the time $t_2$, deviation of the actual air-fuel ratio of the exhaust gas flowing into the upstream side exhaust purification catalyst 20, from the target air-fuel ratio, remains. Therefore, the actual air-fuel ratio of the exhaust gas becomes an air-fuel ratio which is leaner than the rich set air-fuel ratio, that is, an air-fuel ratio with a small rich degree (see broken line of FIG. 10). For this reason, the decreasing speed of the oxygen storage amount OSA of the upstream side exhaust purification catalyst 20 is slow.

As a result, from the time $t_2$ to the time $t_3$ when the stoichiometric air-fuel ratio maintenance judgement time Tsto elapses, the output air-fuel ratio AFdwn of the downstream side air-fuel ratio sensor 41 is maintained in the stoichiometric air-fuel ratio proximity, i.e., intermediate region M. Therefore, in the example shown in FIG. 10, even at the time $t_3$, the learning value sfbg is updated by using formula (4).

Then, in the example shown in FIG. 10, at the time $t_4$, the output air-fuel ratio AFdwn of the downstream side air-fuel ratio sensor 41 becomes the rich judged air-fuel ratio AFrich or less. After the output air-fuel ratio AFdwn becomes the rich judged air-fuel ratio AFrich or less in this way, as explained above, the air-fuel ratio correction amount AFC is alternately set to the lean set correction amount AFClean and the rich set correction amount AFCrich. Along with this, the above-mentioned normal learning control is performed.

By updating the learning value sfbg by the stoichiometric air-fuel ratio stuck learning control in this way, the learning value can be updated even when the deviation of the output air-fuel ratio AFup of the upstream side air-fuel ratio sensor

40 is large. Due to this, it is possible to compensate deviation at the output air-fuel ratio of the upstream side air-fuel ratio sensor 40.

Note that in the above embodiment, the stoichiometric air-fuel ratio maintenance judgement time Tsto is a predetermined time. In this case, the stoichiometric air-fuel ratio maintenance judgement time is set to equal to or greater than the time usually taken from when switching the target air-fuel ratio to the rich air-fuel ratio to when the absolute value of the cumulative oxygen excess/deficiency ΣOED reaches the maximum storable oxygen amount of the upstream side exhaust purification catalyst 20 at the time when it is unused. Specifically, it is preferably set to two to four times of that time.

Alternatively, the stoichiometric air-fuel ratio maintenance judgement time Tsto may be changed in accordance with other parameters, such as the cumulative oxygen excess/deficiency ΣOED from when the target air-fuel ratio is switched to the rich air-fuel ratio. Specifically, for example, the greater the cumulative oxygen excess/deficiency ΣOED, the shorter the stoichiometric air-fuel ratio maintenance judgement time Tsto is set. Due to this, it is also possible to update the learning value sfbg as stated above when the cumulative oxygen excess/deficiency ΣOED from when the target air-fuel ratio is switched to the rich air-fuel ratio becomes a given amount (for example, OEDsw in FIG. 10). Further, in this case, it is necessary that the above given amount in the cumulative oxygen excess/deficiency ΣOED is set to the maximum storable oxygen amount when the upstream side exhaust purification catalyst 20 is new or more. Specifically, it is preferably set to two to four times of the maximum storable oxygen amount.

Note that, the stoichiometric air-fuel ratio stuck learning control may also be applied in the case of using the abovementioned other control as the basic air-fuel ratio control in the same way as the case of the above-mentioned normal learning control. In this case, in stoichiometric air-fuel ratio stuck learning control, when the target air-fuel ratio is switched to the lean air-fuel ratio, then the output air-fuel ratio of the downstream side air-fuel ratio sensor 41 is maintained in a region of air-fuel ratio near the stoichiometric air-fuel ratio over a stoichiometric air-fuel ratio maintenance judgment time Tsto or more, the learning value sfbg is made to increase or decrease so that the air-fuel ratio of the exhaust gas flowing into the upstream side exhaust purification catalyst 20 changes to the rich side or the lean side in accordance with the target air-fuel ratio at that time.

Therefore, summarizing these all together, in the present embodiment, it can be said that, in stoichiometric air-fuel ratio stuck learning, when the target air-fuel ratio is switched to the lean air-fuel ratio, then the target air-fuel ratio is switched to an air-fuel ratio deviated to one side of the stoichiometric air-fuel ratio (corresponding to rich side in the example shown in FIG. 9), then the output air-fuel ratio of the downstream side air-fuel ratio sensor 41 is maintained in a region of air-fuel ratio near the stoichiometric air-fuel ratio over a stoichiometric air-fuel ratio maintenance judgment time Tsto or more, a parameter relating to the air-fuel ratio is corrected so that the air-fuel ratio of the exhaust gas flowing into the upstream side exhaust purification catalyst 20 changes to that one side in feedback control.

Further, in the above-mentioned stoichiometric air-fuel ratio stuck learning control, the learning value is updated when the target air-fuel ratio is switched to the lean air-fuel ratio, then the output air-fuel ratio of the downstream side air-fuel ratio sensor 41 is maintained in a region of air-fuel ratio near the stoichiometric air-fuel ratio over a stoichiometric air-fuel ratio maintenance judgment time Tsto or more. However, the stoichiometric air-fuel ratio stuck learning may be performed based on the amount of intake air from when switching the target air-fuel ratio to the lean air-fuel ratio, the later mentioned cumulative exhaust gas flow, or other parameter other than time.

<Rich/Lean Stuck Learning>

Figure 11:
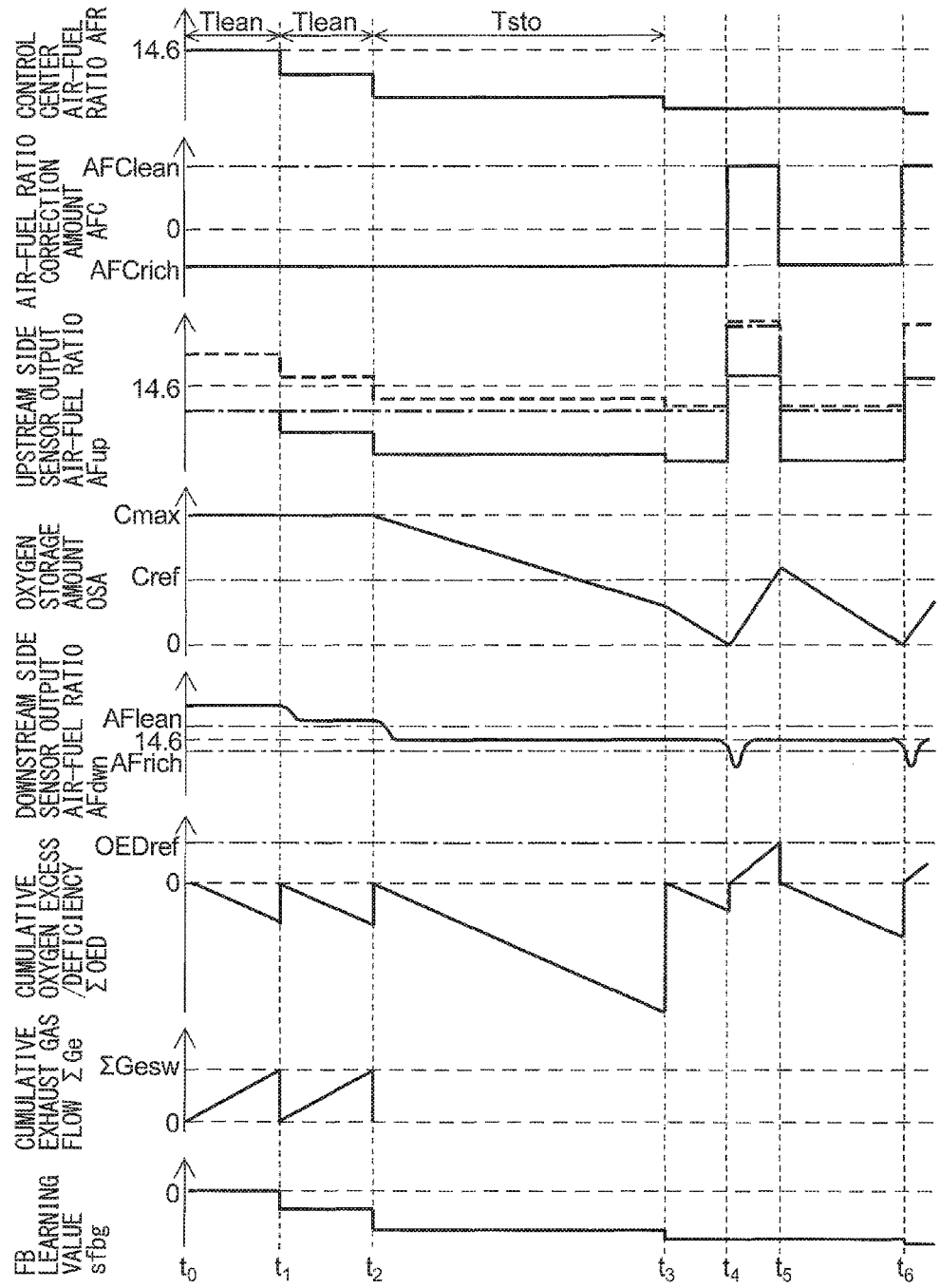
FIG. 11 is a time chart of an air-fuel ratio correction amount etc. when performing lean stuck learning etc.

Next, lean stuck learning control will be explained. The lean stuck learning control is learning control which is performed where, as shown in the example of FIG. 9, although the target air-fuel ratio is set to the rich air-fuel ratio, the output air-fuel ratio of the downstream side air-fuel ratio sensor 41 is stuck at the lean air-fuel ratio. In lean stuck learning control, it is judged if the output air-fuel ratio AFdwn of the downstream side air-fuel ratio sensor 41 has been maintained at the lean air-fuel ratio for a predetermined lean air-fuel ratio maintenance judgement time or more after the air-fuel ratio correction amount AFC is switched to the rich set correction amount AFCrich, that is, after the target air-fuel ratio is switched to the rich set air-fuel ratio. Further, when it is maintained at the lean air-fuel ratio for the lean air-fuel ratio maintenance judgement time or more, the learning value sfbg is decreased so that the air-fuel ratio of the exhaust gas flowing into the upstream side exhaust purification catalyst 20 changes to the rich side. FIG. 11 shows this state.

FIG. 11 is a view, similar to FIG. 9, which shows a time chart of the air-fuel ratio correction amount AFC, etc. FIG. 11, like FIG. 9, shows the case where the output air-fuel ratio AFup of the upstream side air-fuel ratio sensor 40 deviates extremely greatly to the low side (rich side).

In the example shown in the figure, at the time to, the air-fuel ratio correction amount AFC is switched from the lean set correction amount AFClean to the rich set correction amount AFCrich. However, since the output air-fuel ratio of the upstream side air-fuel ratio sensor 40 deviates extremely greatly to the rich side, similarly to the example shown in FIG. 9, the actual air-fuel ratio of the exhaust gas becomes the lean air-fuel ratio. Therefore, after the time $t_0$, the output air-fuel ratio AFdwn of the downstream side air-fuel ratio sensor 41 is maintained at the lean air-fuel ratio.

Therefore, in the present embodiment, when the output air-fuel ratio AFdwn of the downstream side air-fuel ratio sensor 41 has been maintained at the lean air-fuel ratio for the predetermined lean air-fuel ratio maintenance judgement time Tlean or more after the air-fuel ratio correction amount AFC is set to the rich set correction amount AFCrich, the control center air-fuel ratio AFR is corrected. In particular, in the present embodiment, the learning value sfbg is corrected so that the air-fuel ratio of the exhaust gas flowing into the upstream side exhaust purification catalyst 20 changes to the rich side.

Specifically, in the present embodiment, the learning value sfbg is calculated by using the following formula (5) and the control center air-fuel ratio AFR is corrected based on the learning value sfbg by using the above formula (3).

$$sfbg(n)=sfbg(n-1)+k_3\cdot(AFCrich-(AFdwn-14.6)) \quad (5)$$

Note that in the above formula (5), $k_3$ is the gain which expresses the extent of correction of the control center air-fuel ratio AFR ($0<k_3\leq1$). The larger the value of the gain $k_3$, the larger the correction amount of the control center air-fuel ratio AFR.

In this regard, in the example shown in FIG. 11, when the air-fuel ratio correction amount AFC is set at the rich set correction amount AFCrich, the output air-fuel ratio AFdwn of the downstream side air-fuel ratio sensor 41 is maintained at the lean air-fuel ratio. In this case, the deviation in the upstream side air-fuel ratio sensor 40 corresponds to the difference between the target air-fuel ratio and the output air-fuel ratio of the downstream side air-fuel ratio sensor 41. If breaking this down, the deviation in the upstream side air-fuel ratio sensor 40 can be said to be of the same extent as a value acquired by adding the difference between the target air-fuel ratio and the stoichiometric air-fuel ratio (corresponding to the rich set correction amount AFCrich) to the difference between the stoichiometric air-fuel ratio and the output air-fuel ratio of the downstream side air-fuel ratio sensor 41. Therefore, in the present embodiment, as shown in the above formula (5), the learning value sfbg is updated based on the value acquired by adding the rich set correction amount AFCrich to the difference between the output air-fuel ratio of the downstream side air-fuel ratio sensor 41 and the stoichiometric air-fuel ratio. In particular, in the above-mentioned stoichiometric air-fuel ratio stuck learning, the learning value is corrected by an amount corresponding to the rich set correction amount AFCrich, while in lean stuck learning, the learning value is corrected by this amount plus a value corresponding to the output air-fuel ratio AFdwn of the downstream side air-fuel ratio sensor 41. Further, the gain $k_3$ is set to a similar extent to the gain $k_2$. Therefore, the correction amount in the lean stuck learning is larger than the correction amount in stoichiometric air-fuel ratio stuck learning.

In the example shown in FIG. 11, if the formula (5) is used, the learning value sfbg is decreased at the time $t_1$. As a result, the actual air-fuel ratio of the exhaust gas flowing into the upstream side exhaust purification catalyst 20 changes to the rich side. Due to this, after the time $t_1$, the deviation of the actual air-fuel ratio of the exhaust gas flowing into the upstream side exhaust purification catalyst 20 from the target air-fuel ratio becomes smaller, compared with before the time $t_1$. Therefore, after the time $t_1$, the difference between the broken line which shows the actual air-fuel ratio and the one-dot chain line which shows the target air-fuel ratio becomes smaller than the difference before the time $t_1$.

In FIG. 11 shows the example where the gain $k_3$ is set to relatively small value. Therefore, even if the learning value sfbg is updated at the time $t_1$, the deviation remains in the output air-fuel ratio of the upstream side air-fuel ratio sensor 40. In particular, in the example shown in the figure, the actual air-fuel ratio of the exhaust gas remains to be the lean air-fuel ratio. As a result, in the illustrated example, after the time $t_1$, the output air-fuel ratio AFdwn of the downstream side air-fuel ratio sensor 41 is maintained at the lean air-fuel ratio for the lean air-fuel ratio maintenance judgement time Tlean. Therefore, in the example shown in FIG. 13, at the time $t_2$, due to the lean stuck learning, the learning value sfbg is corrected by using the above formula (5).

If, at the time $t_2$, the learning value sfbg is corrected, the deviation of the actual air-fuel ratio of the exhaust gas flowing into the upstream side exhaust purification catalyst 20, from the target air-fuel ratio, becomes smaller. Due to this, in the example shown in the figure, after the time $t_2$, the actual air-fuel ratio of the exhaust gas becomes slightly richer than the stoichiometric air-fuel ratio. Along with this, the output air-fuel ratio AFdwn of the downstream side air-fuel ratio sensor 41 changes from the lean air-fuel ratio to substantially the stoichiometric air-fuel ratio. In particular, in the example shown in FIG. 11, from the time $t_2$ to the time $t_3$, the output air-fuel ratio AFdwn of the downstream side air-fuel ratio sensor 41 is maintained at substantially the stoichiometric air-fuel ratio, that is, in the intermediate region M, for the stoichiometric air-fuel ratio maintenance judgement time Tsto. Therefore, at the time $t_3$, by the stoichiometric air-fuel ratio stuck_learning, the learning value sfbg is corrected by using the above formula (4).

By updating the learning value sfbg in this way by lean stuck learning control, it is possible to update the learning value even when the deviation of the output air-fuel ratio AFup of the upstream side air-fuel ratio sensor 40 is extremely large. Due to this, it is possible to reduce the deviation in the output air-fuel ratio of the upstream side air-fuel ratio sensor 40.

Note that, in the above embodiment, the lean air-fuel ratio maintenance judgement time Tlean is a predetermined time. In this case, the lean air-fuel ratio maintenance judgement time Tlean is set to equal to or greater than the delayed response time of the downstream side air-fuel ratio sensor which is usually taken from when switching the target air-fuel ratio to the rich air-fuel ratio to when the output air-fuel ratio of the downstream side air-fuel ratio sensor 41 changes. Specifically, it is preferably set to two times to four times of that time. Further, the lean air-fuel ratio maintenance judgement time Tlean is shorter than the time usually taken from when switching the target air-fuel ratio to the rich air-fuel ratio to when the absolute value of the cumulative oxygen excess/deficiency $\Sigma OED$ reaches the maximum storable oxygen amount of the upstream side exhaust purification catalyst 20 at the time when the catalyst is new. Therefore, the lean air-fuel ratio maintenance judgement time Tlean is set shorter than the above-mentioned stoichiometric air-fuel ratio maintenance judgement time Tsto.

Alternatively, the lean air-fuel ratio maintenance judgement time Tlean may be changed in accordance with another parameter, such as the exhaust gas flow amount which is cumulatively added from when the target air-fuel ratio is switched to the rich air-fuel ratio. Specifically, for example, the larger the cumulative exhaust gas flow amount $\Sigma Ge$, the shorter the lean air-fuel ratio maintenance judgement time Tlean is set. Due to this, when the cumulative exhaust gas flow from when switching the target air-fuel ratio to the rich air-fuel ratio, becomes a given amount (for example, $\Sigma Gesw$ in FIG. 11), the above-mentioned learning value sfbg can be updated. Further, in this case, the given amount has to be equal to or greater than the total amount of flow of the exhaust gas which is required from when switching the target air-fuel ratio to when the output air-fuel ratio of the downstream side air-fuel ratio sensor 41 changes according to the switch. Specifically, it is preferably set to an amount of 2 to 4 times of that total flow.

Next, rich stuck learning control will be explained. The rich stuck learning control is control similar to the lean stuck learning control, and is learning control which is performed when although the target air-fuel ratio is set to the lean air-fuel ratio, the output air-fuel ratio of the downstream side air-fuel ratio sensor 41 is stuck at the rich air-fuel ratio. In rich stuck learning control, it is judged if the output air-fuel ratio AFdwn of the downstream side air-fuel ratio sensor 41 is maintained at the rich air-fuel ratio for a predetermined rich air-fuel ratio maintenance judgement time (similar to lean air-fuel ratio maintenance judgement time) or more, after switching the air-fuel ratio correction amount AFC to the lean set correction amount AFClean, i.e., after switching the target air-fuel ratio to the lean set air-fuel ratio. Further, when maintained at the rich air-fuel ratio for the rich air-fuel ratio maintenance judgement time or more, the learning value sfbg is increased so that the air-fuel ratio of the exhaust gas flowing into the upstream side exhaust purification catalyst 20 changes to the lean side. That is, in rich stuck learning control, control is performed with rich and lean reversed from the above lean stuck learning control.

Note that, in the present embodiment, in addition to normal learning control, stoichiometric air-fuel ratio stuck learning control, lean stuck learning control, and rich stuck learning control are performed. If summarizing these, this can be called "learning control" where the learning value is updated based on the output of the downstream side air-fuel ratio sensor 41 and a parameter relating to the air-fuel ratio is controlled to make the air-fuel ratio of the exhaust gas flowing into the upstream side exhaust purification catalyst 20 change in accordance with the learning value.

<Cracked Element of Air-Fuel Ratio Sensor>

Figure 12:
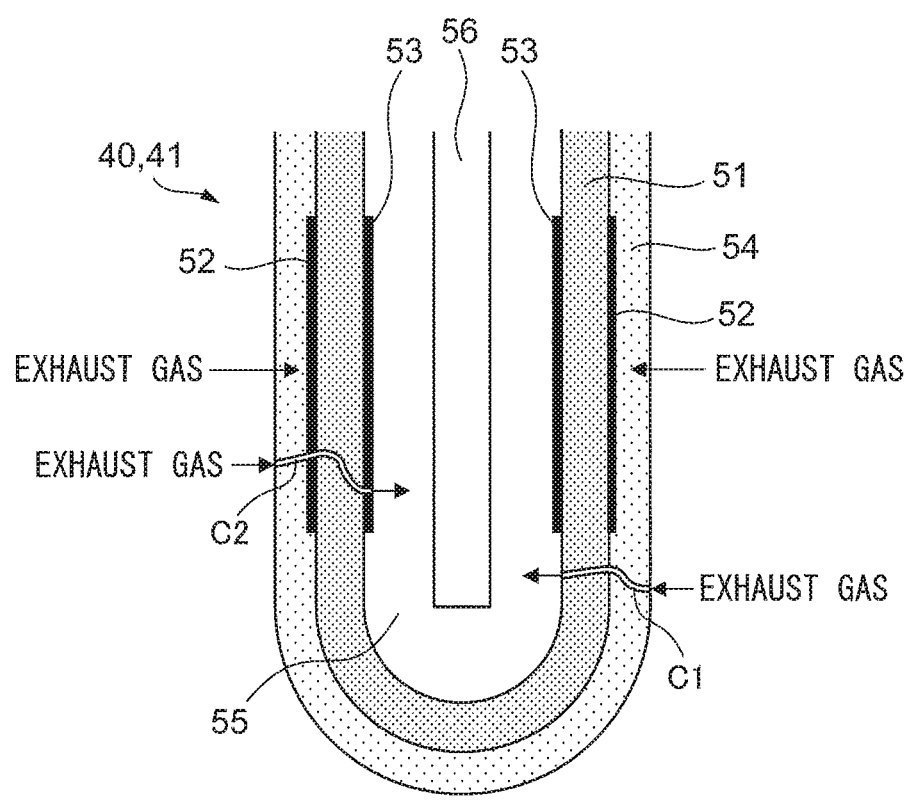
FIG. 12 is a schematic cross-sectional view of an air-fuel ratio sensor suffering from a cracked element.

In this regard, as an abnormality which occurs at the above-mentioned such air-fuel ratio sensors 40, 41, cracking of the element forming the air-fuel ratio sensor 40 or 41, that is, the phenomenon referred to as a "cracked element", may be mentioned. Specifically, a crack which passes through the solid electrolyte layer 51 and diffusion regulating layer 54 (C1 of FIG. 12) or a crack which passes through the solid electrolyte layer 51 and diffusion regulating layer 54 plus the two electrodes 52, 53 (C2 of FIG. 12) sometimes occurs. If such a cracked element occurs, as shown in FIG. 12, exhaust gas enters into the reference gas chamber 55 through the cracked part.

As a result, when the air-fuel ratio of the exhaust gas around the air-fuel ratio sensors 40, 41 is the rich air-fuel ratio, exhaust gas of the rich air-fuel ratio enters the reference gas chamber 55. Due to this, in the reference gas chamber 55, the rich air-fuel ratio exhaust gas diffuses and the oxygen concentration around the atmosphere side electrode 53 falls. On the other hand, in this case as well, the exhaust side electrode 52 is exposed through the diffusion regulating layer 54 to the exhaust gas. For this reason, the difference in oxygen concentration between the surroundings of the atmosphere side electrode 53 and the surroundings of the exhaust side electrode 52 falls and as a result the output air-fuel ratios of the air-fuel ratio sensors 40, 41 become lean air-fuel ratios. That is, if an air-fuel ratio sensor 40 or 41 suffers from a cracked element, even if the air-fuel ratio of the exhaust gas around the air-fuel ratio sensor 40 or 41 is a rich air-fuel ratio, the output air-fuel ratio of the air-fuel ratio sensor 40 or 41 ends up becoming a lean air-fuel ratio.

On the other hand, if the air-fuel ratio of the exhaust gas around the air-fuel ratio sensors 40, 41 is a lean air-fuel ratio, such a reversal phenomenon of an output air-fuel ratio does not occur. This is because if the air-fuel ratio of the exhaust gas is a lean air-fuel ratio, the output current of each air-fuel ratio sensor 40 or 41 depends on the amount of oxygen which reaches the surface of the exhaust side electrode 52 through the diffusion regulating layer 54 rather than the difference of air-fuel ratios of the two sides of the solid electrolyte layer 51.

Figure 13:
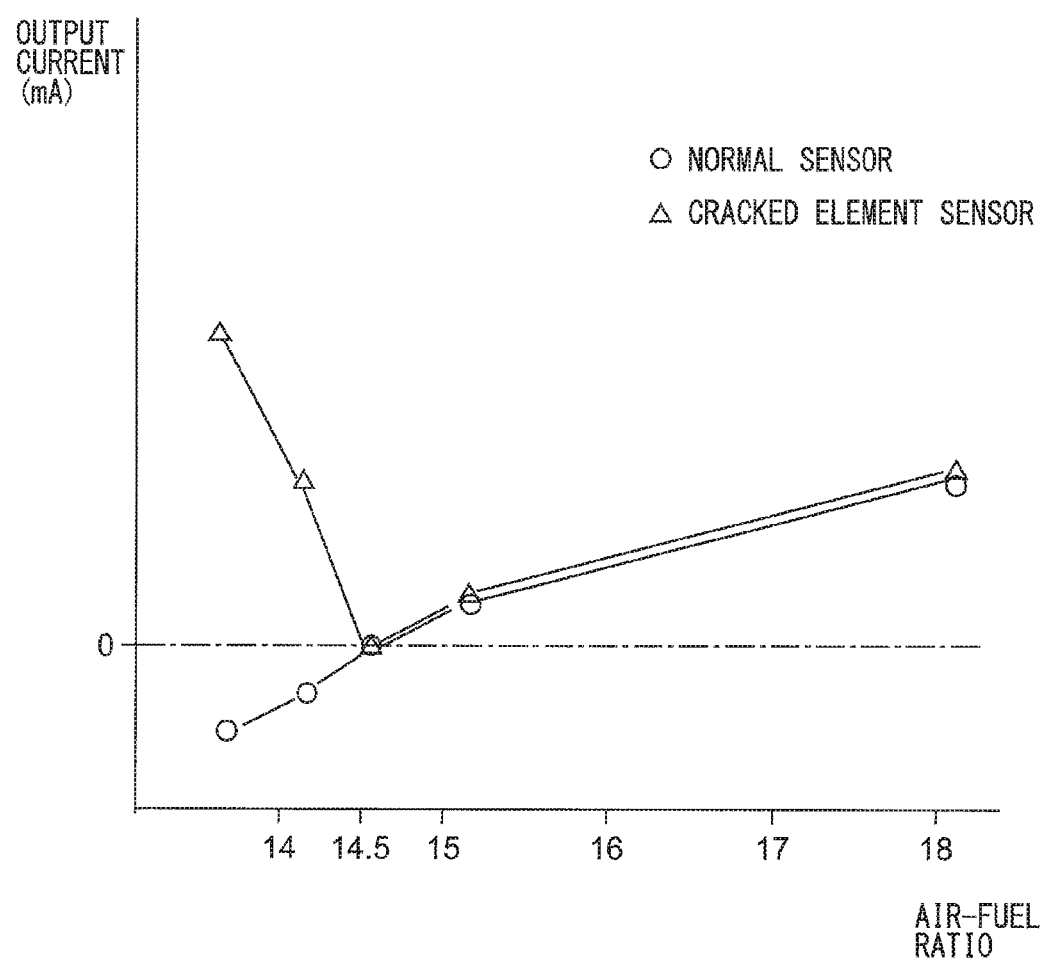
FIG. 13 is a view showing a relationship of an exhaust air-fuel ratio and the voltage V and an output air-fuel ratio of the air-fuel ratio sensor similar to FIG. 3 when making the applied voltage constant.

FIG. 13 shows the relationship, similar to FIG. 3, between the exhaust air-fuel ratio and the output air-fuel ratios of the air-fuel ratio sensors 40, 41 when making the applied voltage constant at 0.45V or so. As shown in FIG. 13, if the air-fuel ratio sensors 40, 41 are normal (circle marks in figure), the output currents of the air-fuel ratio sensors 40, 41 are increased as the exhaust air-fuel ratio becomes larger, that is, as the exhaust air-fuel ratio becomes leaner. On the other hand, when an air-fuel ratio sensor 40 or 41 suffers from the abnormality of a cracked element (triangle marks in figure), if the exhaust air-fuel ratio is 14.6 or more or a lean air-fuel ratio, the output current of the air-fuel ratio sensor 40 or 41 increases as the exhaust air-fuel ratio becomes larger. As opposed to this, when the exhaust air-fuel ratio is 14.6 or less or a rich air-fuel ratio, the output current of the air-fuel ratio sensor 40 or 41 increases as the exhaust air-fuel ratio becomes smaller, that is, as the exhaust air-fuel ratio becomes richer.

When the downstream side air-fuel ratio sensor 41 suffers from the abnormality of a cracked element in this way, even if the air-fuel ratio of the exhaust gas around the downstream side air-fuel ratio sensor 41 is the rich air-fuel ratio, the output air-fuel ratio AFdwn becomes the lean air-fuel ratio. That is, when the target air-fuel ratio is set to the rich air-fuel ratio, the output air-fuel ratio AFdwn of the downstream side air-fuel ratio sensor 41 becomes the lean air-fuel ratio. On the other hand, as explained above, even if the deviation of the upstream side air-fuel ratio sensor 40 is large, when the target air-fuel ratio is set to the rich air-fuel ratio, the output air-fuel ratio AFdwn of the downstream side air-fuel ratio sensor 41 becomes the lean air-fuel ratio. For this reason, if, despite the target air-fuel ratio being made the rich air-fuel ratio, the output air-fuel ratio AFdwn of the downstream side air-fuel ratio sensor 41 ends up being stuck to the lean air-fuel ratio, it is not possible to judge which of these is the cause.

Figure 14:
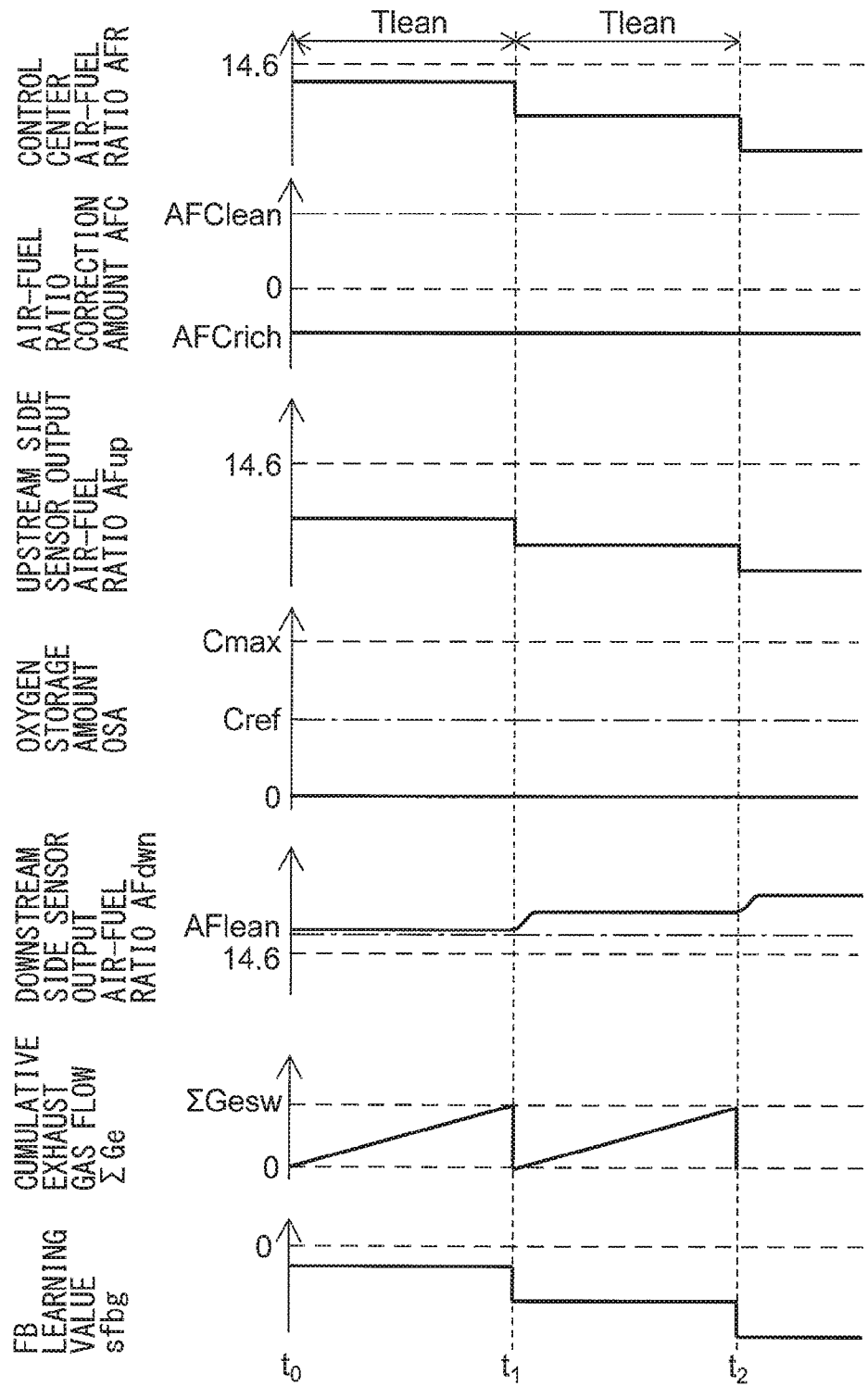
FIG. 14 is a time chart of a control center air-fuel ratio etc.

FIG. 14 is a time chart of the control center air-fuel ratio etc. in the case where the above-mentioned lean stuck control is performed in the state where the downstream side air-fuel ratio sensor 41 suffers from the abnormality of a cracked element. In the example shown in FIG. 14, at the time $t_0$ on, the air-fuel ratio correction amount AFC is maintained at the rich set correction amount AFCrich. In the example shown in FIG. 14, the output air-fuel ratio AFup of the upstream side air-fuel ratio sensor 40 has not deviated, therefore the air-fuel ratio of the exhaust gas flowing into the upstream side exhaust purification catalyst 20 becomes a rich air-fuel ratio. Further, in the example shown in FIG. 14, at the time $t_0$, the oxygen storage amount OSA of the upstream side exhaust purification catalyst 20 becomes substantially zero. For this reason, the air-fuel ratio of the exhaust gas flowing out from upstream side exhaust purification catalyst 20 also becomes the rich air-fuel ratio. The downstream side air-fuel ratio sensor 41 suffers from the abnormality of a cracked element, therefore at the time $t_0$ on, even if the air-fuel ratio of the exhaust gas flowing out from the upstream side exhaust purification catalyst 20 is the rich air-fuel ratio, the output air-fuel ratio AFdwn of the downstream side air-fuel ratio sensor 41 becomes the lean air-fuel ratio. Therefore, at the time $t_0$ on, the output air-fuel ratio AFdwn of the downstream side air-fuel ratio sensor 41 is maintained at the lean air-fuel ratio.

As a result, since, at the time $t_0$ on, the output air-fuel ratio AFdwn of the downstream side air-fuel ratio sensor 41 does not become the rich judged air-fuel ratio AFrich or less, the air-fuel ratio correction amount AFC is maintained as is as the rich set correction amount AFCrich. Along with this, the output air-fuel ratio AFdwn of the downstream side air-fuel ratio sensor 41 is also maintained as is as the lean air-fuel ratio. If such a state continues over the lean air-fuel ratio maintenance judgment time Tlean or more, due to the above-mentioned lean stuck learning control, the learning value sfbg is made to decrease. Therefore, in the example shown in FIG. 14 as well, at the time $t_1$ after the elapse of the lean air-fuel ratio maintenance judgment time Tlean from the time $t_0$, the learning value sfbg is made to decrease. As a result, the control center air-fuel ratio AFR is made to decrease and the air-fuel ratio of the exhaust gas flowing into the upstream side exhaust purification catalyst 20 is made to decrease (change to the rich side).

As shown in FIG. 13, when the downstream side air-fuel ratio sensor 41 suffers from the abnormality of a cracked element, when the air-fuel ratio of the exhaust gas around the downstream side air-fuel ratio sensor 41 is the rich air-fuel ratio, the larger the rich degree, the greater the lean degree of the output air-fuel ratio AFdwn. Therefore, if, at the time $t_1$, the control center air-fuel ratio AFR is shifted to the rich side and the air-fuel ratio of the exhaust gas flowing into the upstream side exhaust purification catalyst 20 changes to the rich side, along with this, the output air-fuel ratio AFdwn of the downstream side air-fuel ratio sensor 41 changes to the lean side.

Further, at the time $t_1$ on as well, the air-fuel ratio correction amount AFC is maintained as is as the rich set correction amount AFCrich and the output air-fuel ratio AFdwn of the downstream side air-fuel ratio sensor 41 is also maintained as is as the lean air-fuel ratio. Therefore, at the time $t_2$ after the elapse of the lean air-fuel ratio maintenance judgment time Tlean from the time $t_1$, the learning value sfbg is made to decrease and the control center air-fuel ratio AFR is made to decrease. Along with this, the output air-fuel ratio AFdwn of the downstream side air-fuel ratio sensor 41 changes to the lean side.

If referring to FIG. 11 for the explanation, if the output air-fuel ratio of the upstream side air-fuel ratio sensor 40 deviates, the output air-fuel ratio AFdwn of the downstream side air-fuel ratio sensor 41 also changes to the rich side if making the control center air-fuel ratio AFR decrease, that is, making the air-fuel ratio of the exhaust gas flowing into the upstream side exhaust purification catalyst 20 change to the rich side. As opposed to this, if the downstream side air-fuel ratio sensor 41 suffers from the abnormality of a cracked element, the output air-fuel ratio AFdwn of the downstream side air-fuel ratio sensor 41 changes to the lean side if making the control center air-fuel ratio AFR decrease. Therefore, in the present embodiment, this difference in modes of response is utilized to suitably diagnose the abnormality of a cracked element of the downstream side air-fuel ratio sensor 41.

<Diagnosis of Abnormality of Downstream Side Air-Fuel Ratio Sensor>

In the present embodiment, first, when the air-fuel ratio of the exhaust gas flowing into the upstream side exhaust purification catalyst 20 is made the rich air-fuel ratio, if the output air-fuel ratio AFdwn of the downstream side air-fuel ratio sensor 41 is maintained at the lean judged air-fuel ratio AFlean or more over a predetermined judgment time or more, the air-fuel ratio of the exhaust gas flowing into the upstream side exhaust purification catalyst 20 is made to change to an air-fuel ratio at the rich side from the air-fuel ratio up to that as air-fuel ratio rich increasing control. This air-fuel ratio rich increasing control may be lean stuck learning control updating the learning value sfbg so as to make the air-fuel ratio of the exhaust gas flowing into the upstream side exhaust purification catalyst 20 change to an air-fuel ratio at the rich side from the prior air-fuel ratio.

Further, when using air-fuel ratio rich increasing control to make the air-fuel ratio of the exhaust gas flowing into the upstream side exhaust purification catalyst 20 change to an air-fuel ratio at the rich side, it is judged that the downstream side air-fuel ratio sensor 41 has become abnormal if the output air-fuel ratio AFdwn of the downstream side air-fuel ratio sensor 41 changes to the lean side. In addition, in the present embodiment, when it is judged that the downstream side air-fuel ratio sensor has become abnormal, the learning value updated by the lean stuck learning control is returned to the value before updating.

Figure 15:
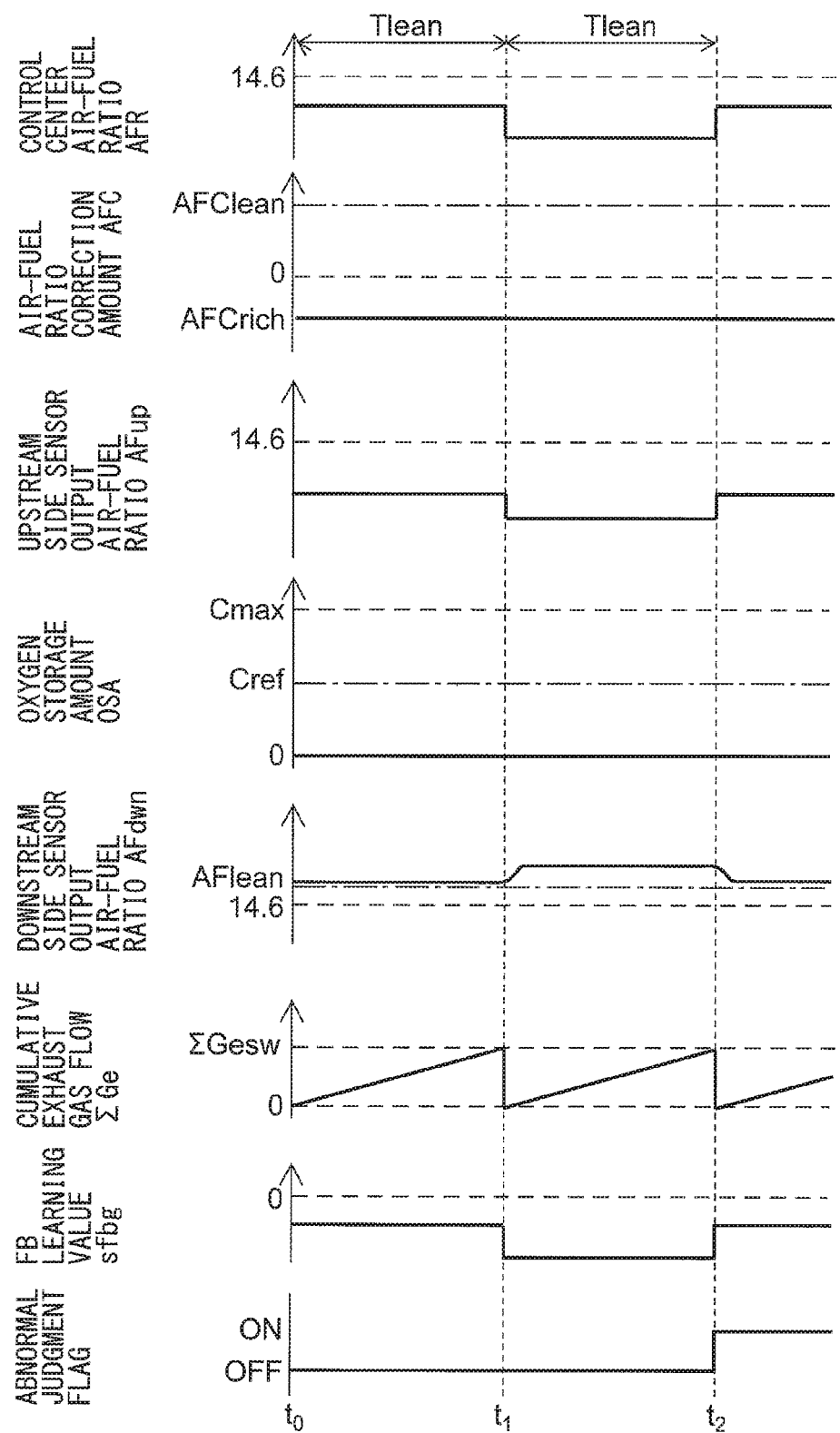
FIG. 15 is a time chart of a control center air-fuel ratio etc.
Figure 16:
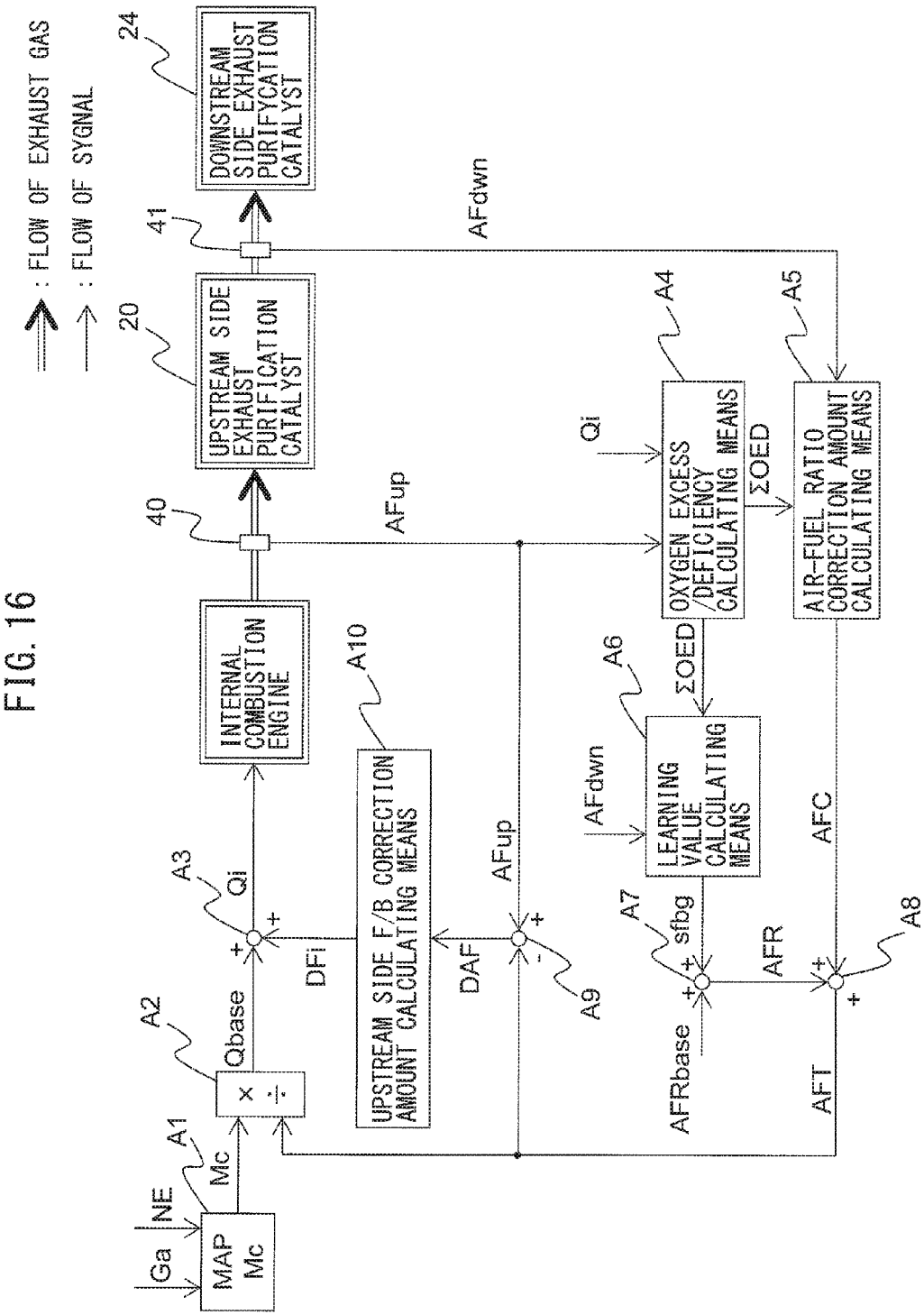
FIG. 16 is a functional block diagram of a control device.

FIG. 15 is a time chart, similar to FIG. 14, of the control center air-fuel ratio AFR etc. in the case where the downstream side air-fuel ratio sensor 41 suffers from the abnormality of a cracked element. In the same way as the example shown in FIG. 14, the air-fuel ratio correction amount AFC is maintained at the rich set correction amount AFCrich. Further, at the time $t_1$, lean stuck learning control is used to make the learning value sfbg decrease. As a result, the control center air-fuel ratio AFR is made to decrease and the air-fuel ratio of the exhaust gas flowing into the upstream side exhaust purification catalyst 20 is made to decrease.

At this time, the downstream side air-fuel ratio sensor 41 is suffering from the abnormality of a cracked element, therefore at the time $t_1$, if the air-fuel ratio of the exhaust gas flowing into the upstream side exhaust purification catalyst 20 changes to the rich side, along with this, the output air-fuel ratio AFdwn of the downstream side air-fuel ratio sensor 41 changes to the lean side. Therefore, at the time $t_1$ on, the output air-fuel ratio AFdwn of the downstream side air-fuel ratio sensor 41 becomes an air-fuel ratio at the lean side from the prior air-fuel ratio.

After this, in the present embodiment, at the time $t_2$ after the elapse of the lean air-fuel ratio maintenance judgment time Tlean from the time $t_1$, the downstream side air-fuel ratio sensor 41 is diagnosed for abnormality. Specifically, as shown in FIG. 15, if the output air-fuel ratio AFdwn of the downstream side air-fuel ratio sensor 41 at the time $t_2$ is at the lean side from the output air-fuel ratio AFdwn of the downstream side air-fuel ratio sensor 41 at the time $t_1$ or before that, it is judged that the downstream side air-fuel ratio sensor 41 suffers from the abnormality of a cracked element. That is, when at the time $t_1$ the air-fuel ratio of the exhaust gas flowing into the upstream side exhaust purification catalyst 20 is made to change to the rich side, it is judged that the downstream side air-fuel ratio sensor 41 suffers from the abnormality of a cracked element when the output air-fuel ratio AFdwn of the downstream side air-fuel ratio sensor 41 changes to the lean side. In the example shown in FIG. 15, at the time $t_2$, it is judged that the abnormality of a cracked element has occurred and, for this reason, the abnormal judgment flag is set ON.

On the other hand, opposite to the example shown in FIG. 15, if the output air-fuel ratio AFdwn of the downstream side air-fuel ratio sensor 41 at the time $t_2$ is the same as the output air-fuel ratio AFdwn of the downstream side air-fuel ratio sensor 41 at the time $t_1$ or before that or is at the rich side from that, it is judged that the downstream side air-fuel ratio sensor 41 does not suffer from the abnormality of a cracked element. That is, when at the time $t_1$ making the air-fuel ratio of the exhaust gas flowing into the upstream side exhaust purification catalyst 20 change to the rich side, it is judged that the downstream side air-fuel ratio sensor 41 does not suffer from the abnormality of a cracked element when the output air-fuel ratio AFdwn of the downstream side air-fuel ratio sensor 41 does not change or changes to the rich side. Due to this, the abnormality of a cracked element of the downstream side air-fuel ratio sensor 41 can be suitably diagnosed.

Here, at the time $t_2$ after the elapse of the lean air-fuel ratio maintenance judgment time Tlean from the time $t_1$, the output air-fuel ratio AFdwn of the downstream side air-fuel ratio sensor 41 is maintained at the lean judged air-fuel ratio AFlean or more in the state where the air-fuel ratio correction amount AFC is maintained at the rich set correction amount AFCrich. Therefore, basically, at the time $t_2$, the above-mentioned lean stuck learning control is used to decrease the learning value sfbg and the control center air-fuel ratio AFR is made to decrease. However, in the present embodiment, if at the time $t_2$ the abnormal judgment flag is set ON, at the time $t_2$, the learning value sfbg is not made to decrease. Rather, at the time $t_1$, the learning value sfbg updated by the lean stuck learning control is returned to the value before updating. Due to this, the learning value sfbg can be kept from ending up being excessively corrected.

Note that, in the present embodiment, at the time $t_2$ after the lean air-fuel ratio maintenance judgment time Tlean has elapsed from the time $t_1$, the downstream side air-fuel ratio sensor 41 is diagnosed for the abnormality of a cracked element. However, if after the elapse of a delay time from when the control center air-fuel ratio AFR is made to change to the rich side at the time $t_1$ to when the downstream side air-fuel ratio sensor 41 starts to react, it is also possible to diagnose the downstream side air-fuel ratio sensor 41 for the abnormality of a cracked element before the time $t_2$ or at the time $t_2$ on. Similarly, in the present embodiment, at the time $t_2$ after the lean air-fuel ratio maintenance judgment time Tlean has elapsed from the time $t_1$, the learning value sfbg is returned to the original value before updating. However, if after judgment that the downstream side air-fuel ratio sensor 41 suffers from the abnormality of a cracked element, the learning value sfbg may also be returned to the original value before updating before the time $t_2$ or from the time $t_2$ on.

Further, in the present embodiment, at the time $t_1$, by using the lean stuck learning control to make the control center air-fuel ratio AFR change to the rich side from the prior value, the air-fuel ratio of the exhaust gas flowing into the upstream side exhaust purification catalyst 20 is made to change to the rich side air-fuel ratio. Abnormality is diagnosed based on the response of the output air-fuel ratio AFdwn of the downstream side air-fuel ratio sensor 41 to this change. However, when the air-fuel ratio of the exhaust gas flowing into the upstream side exhaust purification catalyst 20 is made the rich air-fuel ratio, so long as making the air-fuel ratio of the exhaust gas flowing into the upstream side exhaust purification catalyst 20 change to an air-fuel ratio at the rich side from the prior air-fuel ratio as air-fuel ratio rich increasing control if the output air-fuel ratio AFdwn of the downstream side air-fuel ratio sensor 41 is maintained at the lean judged air-fuel ratio AFlean or more over a predetermined judgment time or more, control different from the above-mentioned lean stuck learning control may be used to make the air-fuel ratio of the exhaust gas flowing into the upstream side exhaust purification catalyst 20 change to the rich side air-fuel ratio. Therefore, instead of the control center air-fuel ratio, the air-fuel ratio correction amount or the amount of injection of fuel from the fuel injector 11 etc. can be changed. Alternatively, the air-fuel ratio of the exhaust gas flowing into the upstream side exhaust purification catalyst 20 may be made to change to the rich side air-fuel ratio at a timing different from the timing of performing the lean stuck learning control.

<Explanation of Specific Control>

Next, referring to FIGS. 16 to 20, the control device in the present embodiment will be specifically explained. The control device in the present embodiment is configured so as to include the functional blocks A1 to A10, as shown in the block diagram of FIG. 16. Below, while referring to FIG. 16, the different functional blocks will be explained. The operations of these functional blocks A1 to A10 are basically executed by the ECU 31.

<Calculation of Fuel Injection Amount>

First, calculation of the fuel injection amount will be explained. In calculating the fuel injection amount, the cylinder intake air calculating means A1, basic fuel injection calculating means A2, and fuel injection calculating means A3 are used.

The intake air calculating means A1 calculates the intake air amount Mc to each cylinder based on the intake air flow rate Ga, engine speed NE, and map or calculation formula which is stored in the ROM 34 of the ECU 31. The intake air flow rate Ga is measured by the air flow meter 39, and the engine speed NE is calculated based on the output of the crank angle sensor 44.

The basic fuel injection calculating means A2 divides the cylinder intake air amount Mc calculated by the intake air calculating means A1, by the target air-fuel ratio AFT to calculate the basic fuel injection amount Qbase (Qbase=Mc/AFT). The target air-fuel ratio AFT is calculated by the later explained target air-fuel ratio setting means A8.

The fuel injection calculating means A3 adds the later explained F/B correction amount DFi to the basic fuel injection amount Qbase which was calculated by the basic fuel injection calculating means A2, to calculate the fuel injection amount Qi (Qi=Qbase+DFi). An injection is instructed to the fuel injector 11 so that fuel of the thus calculated fuel injection amount Qi is injected from the fuel injector 11.

<Calculation of Target Air Fuel Ratio>

Next, calculation of the target air-fuel ratio will be explained. In calculating the target air-fuel ratio, oxygen excess/deficiency calculating means A4, air-fuel ratio correction amount calculating means A5, learning value calculating means A6, control center air-fuel ratio calculating means A7, and target air-fuel ratio setting means A8 are used.

The oxygen excess/deficiency calculating means A4 calculates the cumulative oxygen excess/deficiency ΣOED, based on the fuel injection amount Qi calculated by the fuel injection calculating means A3 and the output air-fuel ratio AFup of the upstream side air-fuel ratio sensor 40. For example, the oxygen excess/deficiency calculating means A4 calculates the cumulative oxygen excess/deficiency ΣOED, by multiplying the difference between the output air-fuel ratio AFup of the upstream side air-fuel ratio and the control center air-fuel ratio AFR by the fuel injection amount Qi, and by cumulatively adding the products.

The air-fuel ratio correction amount calculating means A5 calculates the air-fuel ratio correction amount AFC, based on the cumulative oxygen excess/deficiency ΣOED calculated by the oxygen excess/deficiency calculating means A4 and the output air-fuel ratio AFdwn of the downstream side air-fuel ratio sensor 41. Specifically, the air-fuel ratio correction amount AFC is calculated based on the flow chart shown in FIG. 17.

The learning value calculating means A6 calculates the learning value sfbg, based on the output air-fuel ratio AFdwn of the downstream side air-fuel ratio sensor 41 and the cumulative oxygen excess/deficiency ΣOED calculated by the oxygen excess/deficiency calculating means A4, etc. Specifically, the learning value sfbg is calculated based on the flow chart of the normal leaning control shown in FIG. 18, the flow chart of the stack leaning control shown in FIG. 19, and the flowchart of the control for diagnosing abnormality and setting leaning value shown in FIG. 20. The leaning value sfbg calculated in such a way is stored in a memory of the RAM 33 of ECU 31, which does not delete data even if an ignition key of the vehicle equipped with the internal combustion engine is turned to OFF.

The control center air-fuel ratio calculating means A7 calculates the control center air-fuel ratio AFR, based on the basic control center air-fuel ratio AFRbase and the learning value sfbg which was calculated by the learning value calculating means A6. Specifically, the control center air-fuel ratio AFR is calculated by adding the leaning value sfbg to the basic control center air-fuel ratio AFRbase, as shown in the above-mentioned formula (3).

The target air-fuel ratio setting means A8 adds the air-fuel ratio correction amount AFC which was calculated by the target air-fuel ratio correction calculating means A5 to the control center air-fuel ratio AFR which was calculated by the control center air-fuel ratio calculating means A7, to calculate the target air-fuel ratio AFT. The thus calculated target air-fuel ratio AFT is input to the basic fuel injection calculating means A2 and later explained air-fuel ratio deviation calculating means A9.

<Calculation of F/B Correction Amount>

Next, calculation of the F/B correction amount based on the output air-fuel ratio AFup of the upstream side air-fuel ratio sensor 40 will be explained. In calculating the F/B correction amount, air-fuel ratio deviation calculating means A9, and F/B correction calculating means A10 are used.

The air-fuel ratio deviation calculating means A9 subtracts the target air-fuel ratio AFT which was calculated by the target air-fuel ratio setting means A8 from the output air-fuel ratio AFup of the upstream side air-fuel ratio sensor 40 to calculate the air-fuel ratio deviation DAF (DAF=AFup−AFT). This air-fuel ratio deviation DAF is a value which expresses the excess/deficiency of the amount of fuel feed to the target air-fuel ratio AFT.

The F/B correction calculating means A10 processes the air-fuel ratio deviation DAF which was calculated by the air-fuel ratio deviation calculating means A9 by proportional integral derivative processing (PID processing) to calculate the F/B correction amount DFi for compensating for the excess/deficiency of the fuel feed amount based on the following formula (6). The thus calculated F/B correction amount DFi is input to the fuel injection calculating means A3.

$$DFi=Kp \cdot DAF+Ki \cdot SDAF+Kd \cdot DDAF \quad (6)$$

Note that, in the above formula (6), Kp is a preset proportional gain (proportional constant), Ki is a preset integral gain (integral constant), and Kd is a preset derivative gain (derivative constant). Further, DDAF is the time derivative of the air-fuel ratio deviation DAF and is calculated by dividing the difference between the currently updated air-fuel ratio deviation DAF and the previously updated air-fuel ratio deviation DAF by a time corresponding to the updating interval. Further, SDAF is the time integral of the air-fuel ratio deviation DAF. This time derivative SDAF is calculated by adding the currently updated air-fuel ratio deviation DAF to the previously updated time integral SDAF (SDAF=SDAF+DAF).

<Flow Chart of Control for Setting Air-Fuel Ratio Correction Amount>

Figure 17:
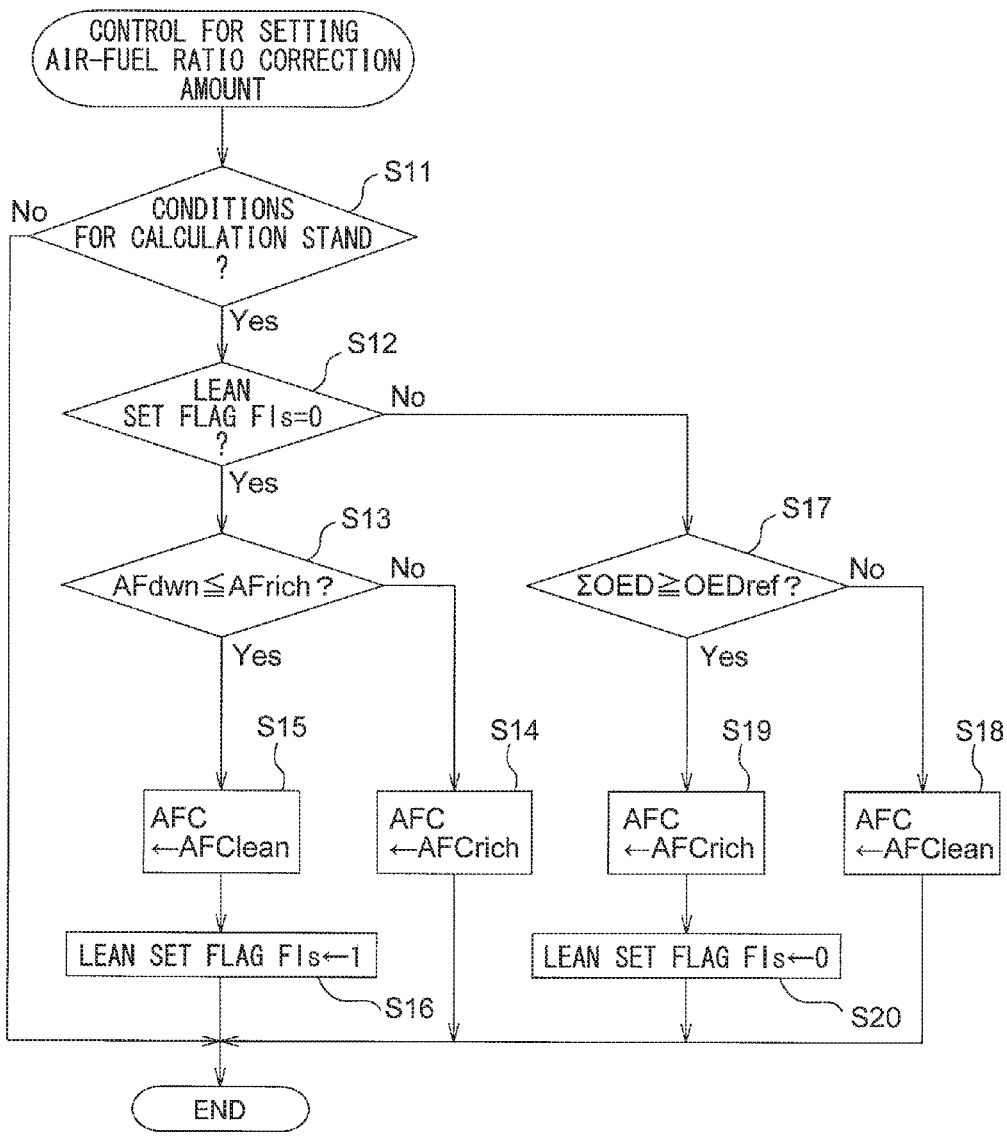
FIG. 17 is a flow chart showing a control routine of processing for calculating an air-fuel ratio correction amount.

FIG. 17 is a flow chart showing the control routine of control for setting the air-fuel ratio correction amount AFC. The control routine shown in the figure is performed by interruption every certain time interval.

As shown in FIG. 17, first, at step S11, it is judged if the condition for calculation of the air-fuel ratio correction amount AFC stands. The case where the condition for calculation of the air-fuel ratio correction amount AFC stands is, for example, in the case where normal operation is performed, in which a feedback control is performed, such as in the case where fuel cut control is not performed. When it is judged at step S11 that the condition for calculation of the air-fuel ratio correction amount AFC stands, the routine proceeds to step S12.

Next, at step S12, it is judged if the lean set flag Fls is set to "0". The lean set flag Fls is a flag which is set to "1" when the air-fuel ratio correction amount AFC is set to the lean set correction amount AFClean, and is set to "0" otherwise. When it is judged at step S12 that the lean set flag Fls is set to "0", the routine proceeds to step S13. At step S13, it is judged if the output air-fuel ratio AFdwn of the downstream side air-fuel ratio sensor 41 is the rich judged air-fuel ratio AFrich or less. If it is judged that the output air-fuel ratio AFdwn of the downstream side air-fuel ratio sensor 41 is larger than the rich judged air-fuel ratio AFrich, the routine proceeds to step 14. At step S14, the air-fuel correction amount AFC is maintained to the rich set correction amount AFCrich, and the control routine is ended.

On the other hand, if the oxygen storage amount OSA of the upstream side exhaust purification catalyst 20 decreases and thus the air-fuel ratio of the exhaust gas flowing out from the upstream side exhaust purification catalyst 20 falls, it is judged that the output air-fuel ratio AFdwn of the downstream side air-fuel ratio sensor 41 is the rich judged air-fuel ratio AFrich or less at step S13. In this case, the routine proceeds to step S15, and the air-fuel ratio correction amount AFC is switched to the lean set correction amount AFClean. Next, at step S16, the lean set flag Fls is set to "1", then the control routine is ended.

If the lean set flag Fls is set to "1", in the next control routine, at step S12, it is judged that the lean set flag Fls is not set to "0", and thus the routine proceeds to step S17. In step S17, it is judged if the cumulative oxygen excess/deficiency ΣOED from the time when the air-fuel ratio correction amount AFC was switched to the lean set correction amount AFClean is lower than the switching reference value OEDref. If it is judged that the cumulative oxygen excess/deficiency ΣOED is lower than the switching reference value OEDref, the routine proceeds to step S18, and the air-fuel ratio correction amount AFC is continuously set to the lean set correction amount AFClean and is maintained. Then, the control routine is ended. On the other hand, if the oxygen storage amount of the upstream side exhaust purification catalyst 20 increases, finally, it is judged at step S17 that the cumulative oxygen excess/deficiency ΣOED is equal to or greater than the switching reference value OEDref, and thus the routine proceeds to step S19. At step S19, the air-fuel ratio correction amount AFC is switched to the rich set correction amount AFCrich. Next, at step S20, the lean set flag Fls is reset to "0", and then the control routine is ended.

<Flow Chart of Normal Learning Control>

Figure 20:
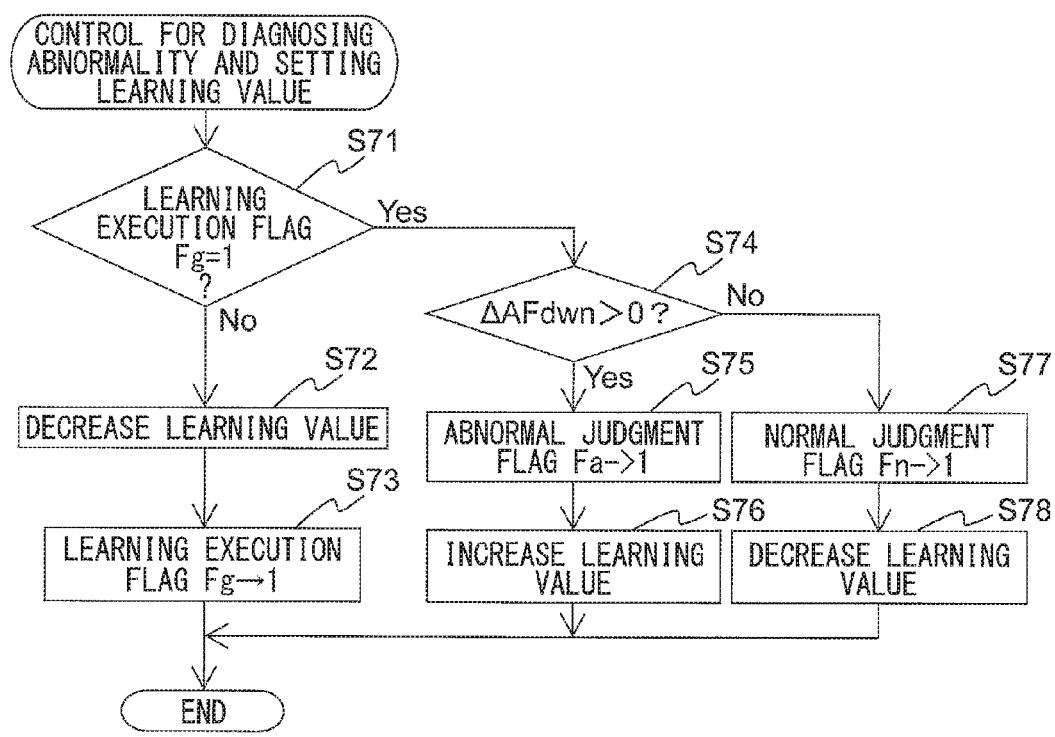
FIG. 20 is a flow chart showing a control routine of control for diagnosing abnormality and setting a learning value.

FIG. 20 is a flow chart showing the control routine of normal leaning control. The control routine shown in the figure is performed by interruption every certain time interval.

Figure 18:
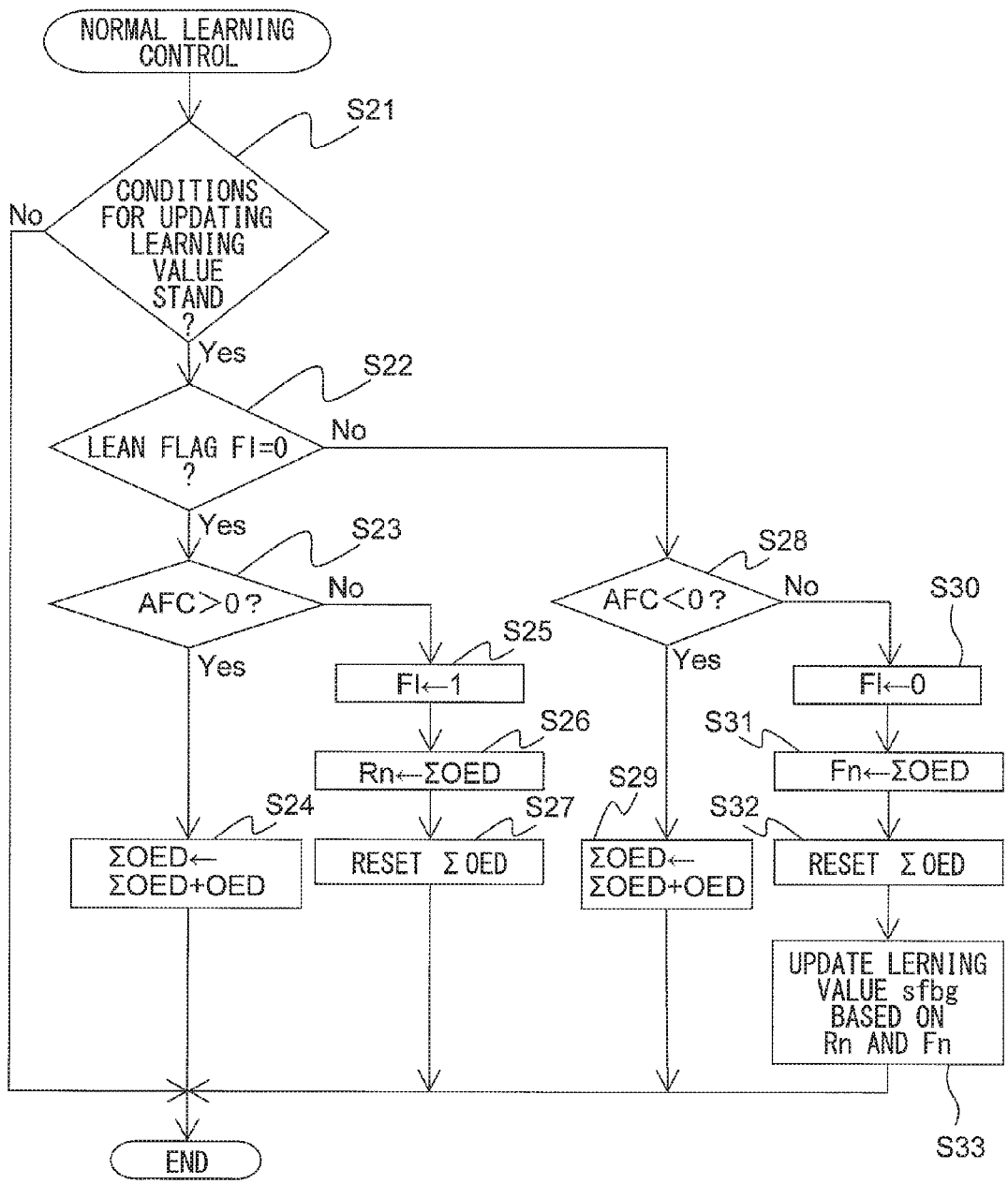
FIG. 18 is a flow chart showing a control routine of normal learning control.

As shown in FIG. 18, first, at step S21, it is judged if the condition for updating the learning value sfbg stands. As the case when the condition for updating stands, for example, normal control being performed, etc., may be mentioned. When it is judged at step S21 that the condition for updating the learning value sfbg stands, the routine proceeds to step S22. At step S22, it is judged if the lean flag Fl has been set to "0". When it is judged at step S22 that the lean flag Fl has been set to "0", the routine proceeds to step S23.

At step S23, it is judged if the air-fuel ratio correction amount AFC is larger than 0, that is, if the target air-fuel ratio is a lean air-fuel ratio. If, at step S23, it is judged that the air-fuel ratio correction amount AFC is larger than 0, the routine proceeds to step S24. At step S24, the cumulative oxygen excess/deficiency ΣOED is increased by the current oxygen excess/deficiency OED.

Then, if the target air-fuel ratio is switched to the rich air-fuel ratio, at the next control routine, at step S23, it is judged if the base air-fuel ratio correction amount AFCbase is 0 or less and thus the routine proceeds to step S25. At step S25, the lean flag Fl is set to "1", next, at step S26, Rn is made the absolute value of the current cumulative oxygen excess/deficiency ΣOED. Next, at step S27, the cumulative oxygen excess/deficiency ΣOED is reset to 0 and then the control routine is ended.

On the other hand, if the lean flag Fl is set to "1", at the next control routine, the routine proceeds from step S22 to step S28. At step S28, it is judged if the air-fuel ratio correction amount AFC is smaller than 0, that is, the target air-fuel ratio is the rich air-fuel ratio. When it is judged at step S28 that the air-fuel ratio correction amount AFC is smaller than 0, the routine proceeds to step S29. At step S29, the cumulative oxygen excess/deficiency ΣOED is increased by the current oxygen excess/deficiency OED.

Then, if the target air-fuel ratio is switched to the lean air-fuel ratio, at step S28 of the next control routine, it is judged that the air-fuel ratio correction amount AFC is 0 or more, then the routine proceeds to step S30. At step S30, the lean flag Fr is set to "0", then, at step S31, Fn is set to the absolute value of the current cumulative oxygen excess/deficiency ΣOED. Next, at step S32, the cumulative oxygen excess/deficiency ΣOED is reset to 0. Next, at step S33, the learning value sfbg is updated based on Rn which was calculated at step S26 and the Fn which was calculated at step S31, then the control routine is ended.

<Flow Chart of Stuck Learning Control>

Figure 19:
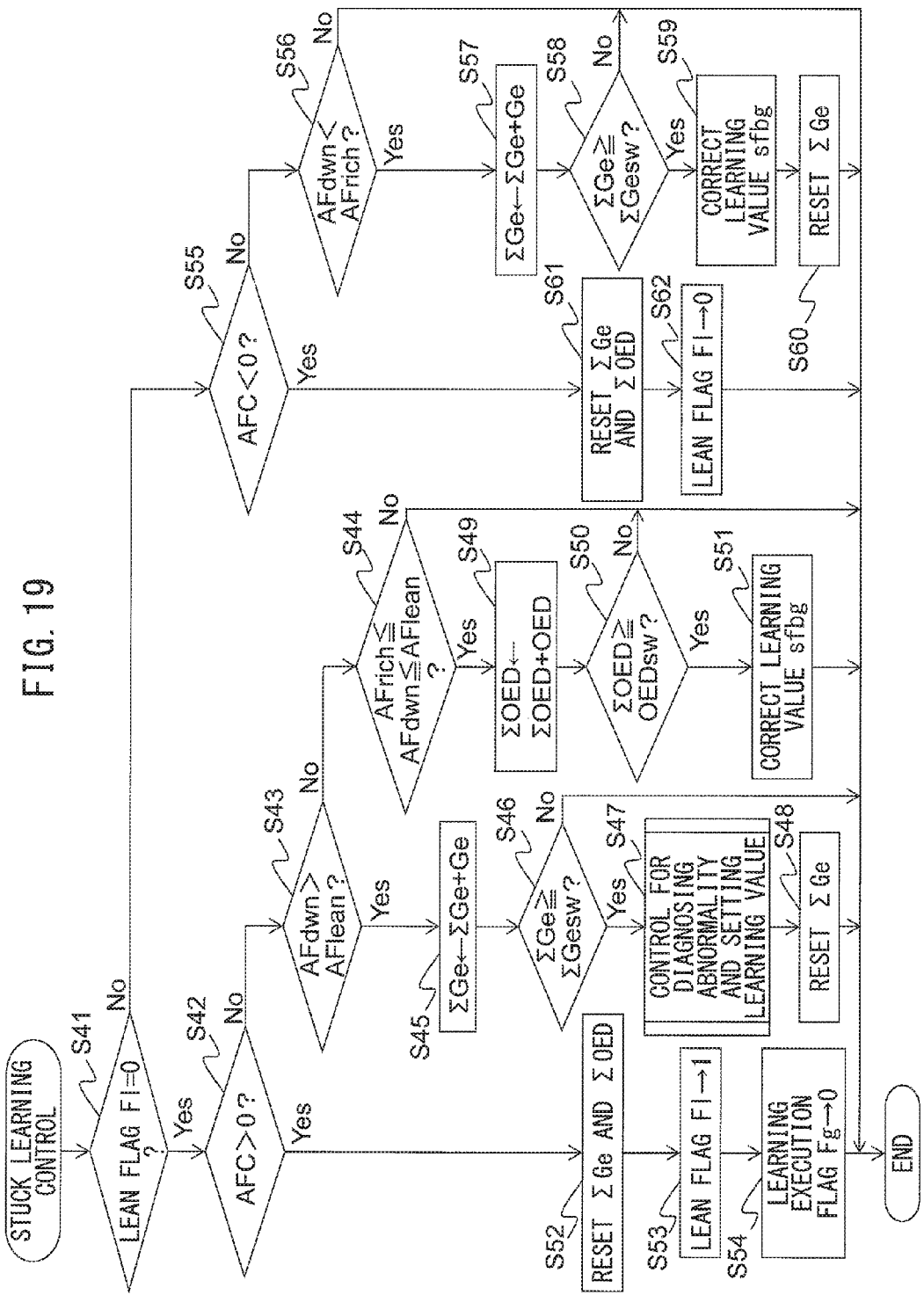
FIG. 19 is a flow chart showing a control routine of stuck learning control.

FIG. 19 is a flow chart showing the control routine of stuck learning control (stoichiometric air-fuel ratio stuck control, rich stuck control, and lean stuck control). The routine shown in the figure is performed by interruption every certain time interval. Note that in the example shown in FIG. 19, updating of the learning value sfbg, etc., is performed when the cumulative exhaust gas flow amount ΣGe reaches the predetermined given amount ΣGesw, instead of when the elapsed time becomes the lean air-fuel ratio maintenance judgment time Tlean.

As shown in FIG. 19, first, at step S41, it is judged if the lean flag Fl is set to "0". If it is judged, at step S41, that the lean flag Fl is set to "0", the routine proceeds to step S42. At step S42, it is judged if the air-fuel ratio correction amount AFC is larger than 0, that is, if the target air-fuel ratio is the lean air-fuel ratio. If it is judged at step S42 that the air-fuel ratio correction amount AFC is 0 or less, the routine proceeds to step S43.

At step S43, it is judged if the output air-fuel ratio AFdwn of the downstream side air-fuel ratio sensor 41 is larger than the lean judged air-fuel ratio AFlean, and at step S44, it is judged if the output air-fuel ratio AFdwn is a value between the rich judged air-fuel ratio AFrich and the lean judged air-fuel ratio AFlean. If it is judged at steps S43 and S44 that the output air-fuel ratio AFdwn is smaller than the rich judged air-fuel ratio AFrich, that is, if it is judged that the output air-fuel ratio is the rich air-fuel ratio, the control routine is ended. On the hand, if it is judged at steps S43 and S44 that the output air-fuel ratio AFdwn is larger than the lean judged air-fuel ratio AFlean, that is, if it is judged that the output air-fuel ratio is the lean air-fuel ratio, the routine proceeds to step S45.

At step S45, the new cumulative exhaust gas flow amount ΣGe is set to a value acquired by adding the current exhaust gas flow amount Ge to the cumulative exhaust gas flow amount ΣGe. Note that, the cumulative exhaust gas flow amount ΣGe is calculated, for example, based on the air flow meter 39. Next, at step S46, it is judged if the cumulative exhaust gas flow amount ΣGe which was calculated at step S45 is the predetermined amount ΣGesw or more. If, at step S45, it is judged that ΣGe is smaller than ΣGesw, the control routine is ended. On the other hand, if the cumulative exhaust gas flow amount ΣGe increases and thus, at step S46, it is judged that ΣGe is ΣGesw or more, the routine proceeds to step S47. At step S47, control for diagnosing abnormality and setting a leaning value which is explained below is performed. Next, at step S48, the cumulative exhaust gas flow amount ΣGe is reset to "0", and then the control routine is ended.

On the other hand, when it is judged at steps S43 and S44 that the output air-fuel ratio AFdwn is a value between the rich judged air-fuel ratio AFrich and the lean judged air-fuel ratio AFlean, the routine proceeds to step S49. At step S49, the new cumulative oxygen excess/deficiency ΣOED is set to a value acquired by adding the current oxygen excess/deficiency OED to cumulative oxygen excess/deficiency ΣOED. Next, at step S50, it is judged if the cumulative oxygen excess/deficiency ΣOED which was calculated at step S49 is a predetermined amount OEDsw or more. If it is judged at step S50 that ΣOED is smaller than OEDsw, the control routine is ended. On the other hand, if cumulative oxygen excess/deficiency ΣOED increases and thus it is judged at step S50 that ΣOED is OEDsw or more, the routine proceeds to step S51. At step S51, the learning value sfbg is corrected by using the above-mentioned formula (4).

Then, when the target air-fuel ratio is switched and it is judged at step S42 that the air-fuel ratio correction amount AFC is larger than 0, the routine proceeds to step S52. At step S52, the cumulative exhaust gas flow amount ΣGe and the cumulative oxygen excess/deficiency ΣOED are reset to 0. Next, at step S53, the lean flag Fl is set to "1", and at step S54, a learning execution flag Fg which is explained below is reset to "0".

If the lean flag Fl is set to "1", at the next control routine, the routine proceeds from step S41 to step S55. At step S55, it is judged if the air-fuel ratio correction amount AFC is smaller than 0, that is, if the target air-fuel ratio is the rich air-fuel ratio. When it is judged at step S55 that the air-fuel ratio correction amount AFC is 0 or more, the routine proceeds to step S56.

At step S56, it is judged if the output air-fuel ratio AFdwn of the downstream side air-fuel ratio sensor 41 is smaller than the rich judged air-fuel ratio AFrich. If it is judged at steps S56 that the output air-fuel ratio AFdwn is equal to or larger than the rich judged air-fuel ratio AFrich, that is, if the output air-fuel ratio is the lean air-fuel ratio, the control routine is ended. On the other hand, if it is judged at steps S56 that the output air-fuel ratio AFdwn is smaller than the rich judged air-fuel ratio AFrich, that is, if it is judged that the output air-fuel ratio is the rich air-fuel ratio, the routine proceeds to step S57.

At step S57, the new cumulative exhaust gas flow amount ΣGe is set to a value acquired by adding the current exhaust gas flow amount Ge to the cumulative exhaust gas flow amount ΣGe. Next, at step S56, it is judged if the cumulative exhaust gas flow amount ΣGe which was calculated at step S55 is the predetermined amount ΣGesw or more. If at step S58 it is judged that ΣGe is smaller than ΣGesw, the control routine is ended. On the other hand, if the cumulative exhaust gas flow amount ΣGe increases and thus it is judged at step S58 that ΣGe is ΣGesw or more, the routine proceeds to step S59. At step S59, the learning value sfbg is corrected by using the above formula (5).

Then, if the target air-fuel ratio is switched and thus it is judged at step S55 that the air-fuel ratio correction amount AFC is smaller than 0, the routine proceeds to step S61. At step S61, the cumulative exhaust gas flow amount ΣGe and the cumulative oxygen excess/deficiency ΣOED are reset to 0. Next, at step S62, the lean flag Fl is set to "0" and the control routine is ended.

<Flow Chart of Control for Diagnosing Abnormality and Setting Learning Value>

FIG. 20 is a flow chart showing a control routine of control for diagnosing abnormality and setting a learning value performed at step S47 of FIG. 19. The illustrated control routine is performed every time step S47 of FIG. 19 is executed.

First, at step S71, it is judged if the learning execution flag Fg is "1". The learning execution flag is a flag set to "1" when, due to the lean stuck learning control, the learning value sfbg to be updated after the air-fuel ratio correction amount AFC is set to the rich set correction amount AFCrich and is set to "0" in other cases. If at step S71 it is judged that the learning execution flag Fg is not "1", the routine proceeds to step S72. At step S72, the learning value sfbg is made to decrease based on the above-mentioned formula (5). Next, at step S73, the learning execution flag Fg is set to "1", then the control routine is made to end.

After this, when, at step S54 of FIG. 19, the learning execution flag Fg is not reset to "0", but control for diagnosing abnormality and setting the learning value of step S47 is performed again, at step S71, it is judged that the learning execution flag Fg is set to "1", then the routine proceeds to step S74. At step S74, it is judged if the amount of change ΔAFdwn of the output air-fuel ratio AFdwn of the downstream side air-fuel ratio sensor 41 after the learning value was made to decrease at step S72 the previous time is larger than "0", that is, if the output air-fuel ratio AFdwn has changed to the lean side. If at step S74 the amount of change ΔAFdwn is larger than "0", the output air-fuel ratio AFdwn changes to the lean side, therefore the routine proceeds to step S75 where the abnormal judgment flag of the downstream side air-fuel ratio sensor 41 is set to "1" (ON). Next, at step S76, the learning value sfbg is made to decrease by exactly the amount of decrease of the learning value sfbg at step S72, and the control routine is made to end.

On the other hand, when at step S74 it is judged that the amount of change ΔAFdwn is 0 or less, the output air-fuel ratio AFdwn has not changed or has changed to the rich side. For this reason, the routine proceed to step S77 where the normal judgment flag Fn of the downstream side air-fuel ratio sensor 41 is set to "1" (ON). Next, at step S78, the ratio is made to decrease based on the above-mentioned formula (5), then the control routine is made to end.

Second Embodiment

Next, referring to FIG. 21 to FIG. 24, an exhaust purification system according to a second embodiment of the present invention will be explained. The configuration and control in the exhaust purification system according to the second embodiment are basically similar to the configuration and control in the exhaust purification system according to the first embodiment except for the points which are explained below.

In the present embodiment, the learning value sfbg is set to the rich side guard value Grich or more and the lean side guard value Glean or less. Therefore, for example, when the learning value sfbg which is calculated by the above-mentioned formula (2), formula (4), and formula (5) has become a value smaller than the rich side guard value Grich, the learning value sfbg is set to the rich side guard value Grich. Similarly, when the learning value sfbg which is calculated by the above-mentioned formula (2), formula (4), and formula (5) has become a value larger than the lean side guard value Glean, the learning value sfbg is set to the lean side guard value Glean. By restricting the learning value sfbg to a value between the two guard values Grich, Glean in this way, it is possible to keep the absolute value of the learning value sfbg from being set to an excessive value when there is some sort of abnormality in the control device etc.

Further, in the present embodiment, when it is judged that the downstream side air-fuel ratio sensor 41 suffers from an abnormality, the absolute value of the rich side guard value Grich of the learning value sfbg is made smaller as guard value restriction control.

Figure 21:
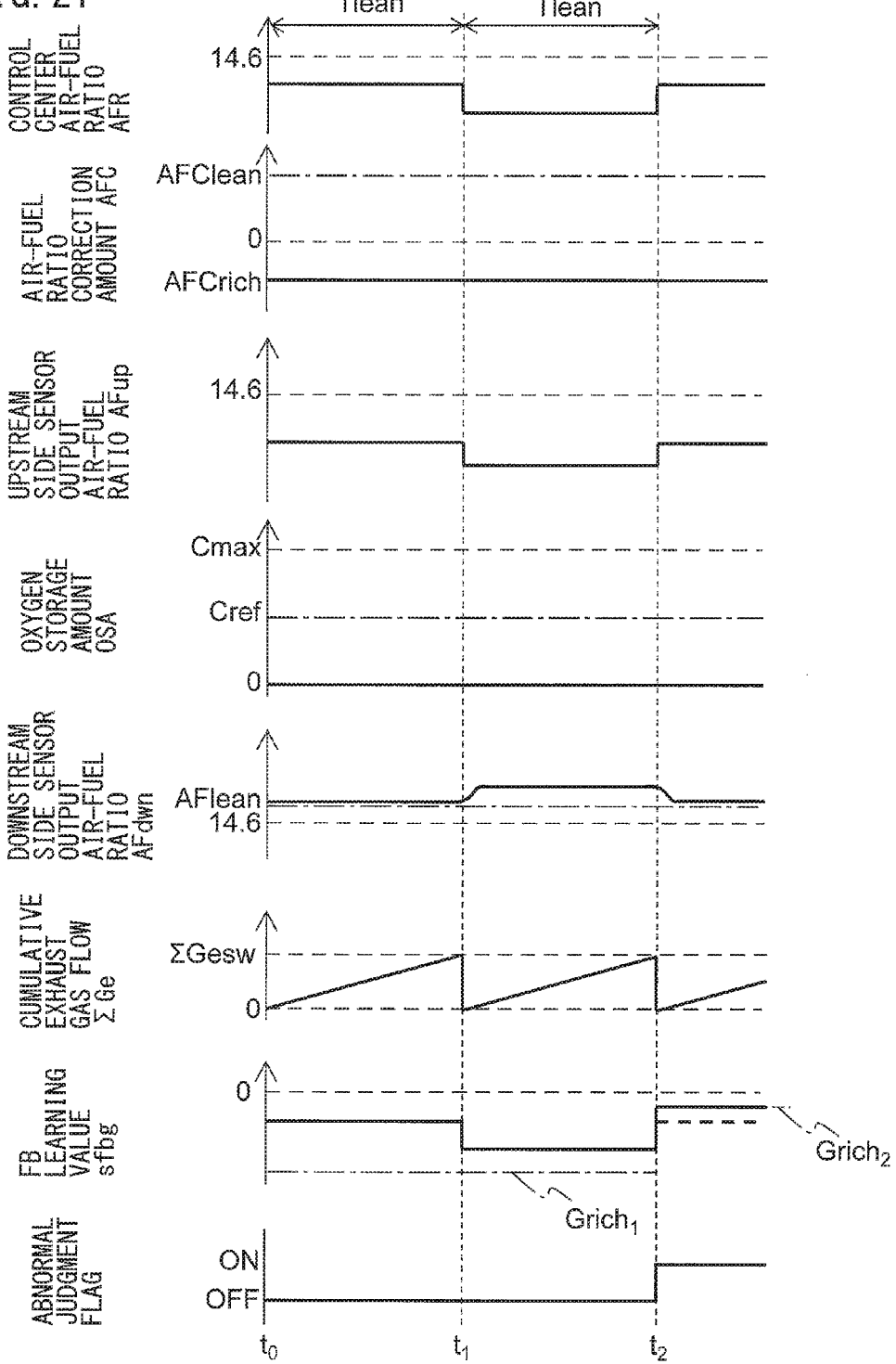
FIG. 21 is a time chart of a control center air-fuel ratio etc.

FIG. 21 is a time chart similar to FIG. 14 of the control center air-fuel ratio AFR etc. in the case where the downstream side air-fuel ratio sensor 41 suffers from the abnormality of a cracked element. In the same way as the example shown in FIG. 14, the air-fuel ratio correction amount AFC is maintained at the rich set correction amount AFCrich. Further, at the time $t_1$, the lean stuck learning control is used to make the learning value sfbg decrease. Since the downstream side air-fuel ratio sensor 41 suffers from the abnormality of a cracked element, along with this, the output air-fuel ratio AFdwn of the downstream side air-fuel ratio sensor 41 changes to the lean side. As a result, in the same way as the example shown in FIG. 15, at the time $t_2$ after the lean air-fuel ratio maintenance judgment time Tlean elapses from the time $t_1$, it is judged that the downstream side air-fuel ratio sensor 41 suffers from the abnormality of a cracked element.

In the present embodiment, before the time $t_2$, the rich side guard value Grich of the learning value sfbg is set to the first rich side guard value $Grich_1$. The absolute value of the first rich side guard value $Grich_1$ is relatively large and is made a value which will not be reached so long as there is no abnormality or a special operating state does not continue. Similarly, before the time $t_2$, the lean side guard value Glean of the learning value sfbg is set to the first lean side guard value $Glean_1$ (not shown). The absolute value of the first lean side guard value $Glean_1$ is also relatively large and is made a value not reached so long as there no abnormality or no special operating state continues.

In the example shown in FIG. 21, in the period from the time $t_0$ to the time $t_2$, the learning value sfbg becomes a value larger than the rich side guard value Grich. Accordingly, the absolute value of the learning value sfbg becomes a value smaller than the absolute value of the rich side guard value Grich. Therefore, in the period from the time $t_0$ to the time $t_2$, the learning value sfbg is not limited by the rich side guard value Grich and is made the value as calculated by the above-mentioned formula (2), formula (4), formula (5), etc.

On the other hand, in the present embodiment, if, at the time $t_2$, it is judged that the downstream side air-fuel ratio sensor 41 suffers from an abnormality, the rich side guard value Grich is set to the second rich side guard value $Grich_2$. The absolute value of the second rich side guard value $Grich_2$ is smaller than the absolute value of the first rich side guard value $Grich_1$. That is, in the present embodiment, if it is judged that the downstream side air-fuel ratio sensor 41 suffers from an abnormality, the absolute value of the rich side guard value Grich of the learning value sfbg is made smaller as guard value restriction control.

In addition, in the present embodiment, when at the time $t_2$ it is judged that the downstream side air-fuel ratio sensor 41 suffers from an abnormality, the lean side guard value Glean may also be set to a second lean side guard value $Glean_2$. The absolute value of the second lean side guard value $Glean_2$ is smaller than the absolute value of the first lean side guard value $Glean_1$. Therefore, in the present embodiment, if it is judged that the downstream side air-fuel ratio sensor 41 suffers from an abnormality, the absolute value of the lean side guard value Glean of the learning value sfbg may be made smaller as guard value restriction control.

In the same way as the above-mentioned first embodiment, at the time $t_2$ on, the learning value sfbg is calculated so as to become the same as the value before the time $t_1$ (broken line in FIG. 21). However, the thus calculated learning value sfbg is smaller than the rich side guard value Grich which was increased at the time $t_2$. As a result, as shown by the solid line in FIG. 21, at the time $t_2$ on, the learning value sfbg is set to a value the same as the rich side guard value Grich.

According to the present embodiment, by making the absolute value of the rich side guard value Grich smaller when the downstream side air-fuel ratio sensor 41 suffers from the abnormality of a cracked element, the learning value sfbg can be kept from ending up being excessively updated to the rich side.

In this regard, for example when the downstream side air-fuel ratio sensor 41 is diagnosed for abnormality in a special engine operating state etc., sometimes an error will arise in the judgment of the downstream side air-fuel ratio sensor 41 suffering from a cracked element. For this reason, it is necessary to periodically perform the task of confirming whether the downstream side air-fuel ratio sensor 41 really suffers from the abnormality of a cracked element after a certain extent of time from judgment of abnormality.

Therefore, in the present embodiment, even when guard value restriction control is used to make the absolute value of the rich side guard value Grich smaller, the learning value sfbg is made to decrease beyond the rich side guard value Grich as abnormal confirmation control periodically so that the air-fuel ratio of the exhaust gas flowing into the upstream side exhaust purification catalyst 20 changes to the rich side beyond the air-fuel ratio corresponding to the rich side guard value Grich made smaller in absolute value. That is, in abnormal confirmation control, the rich side absolute value of the learning value sfbg is made to increase beyond the absolute value of the rich side guard value Grich so that the air-fuel ratio of the exhaust gas flowing into the upstream side exhaust purification catalyst 20 changes to the rich side beyond the air-fuel ratio corresponding to the rich side guard value Grich made smaller in absolute value.

Figure 22:
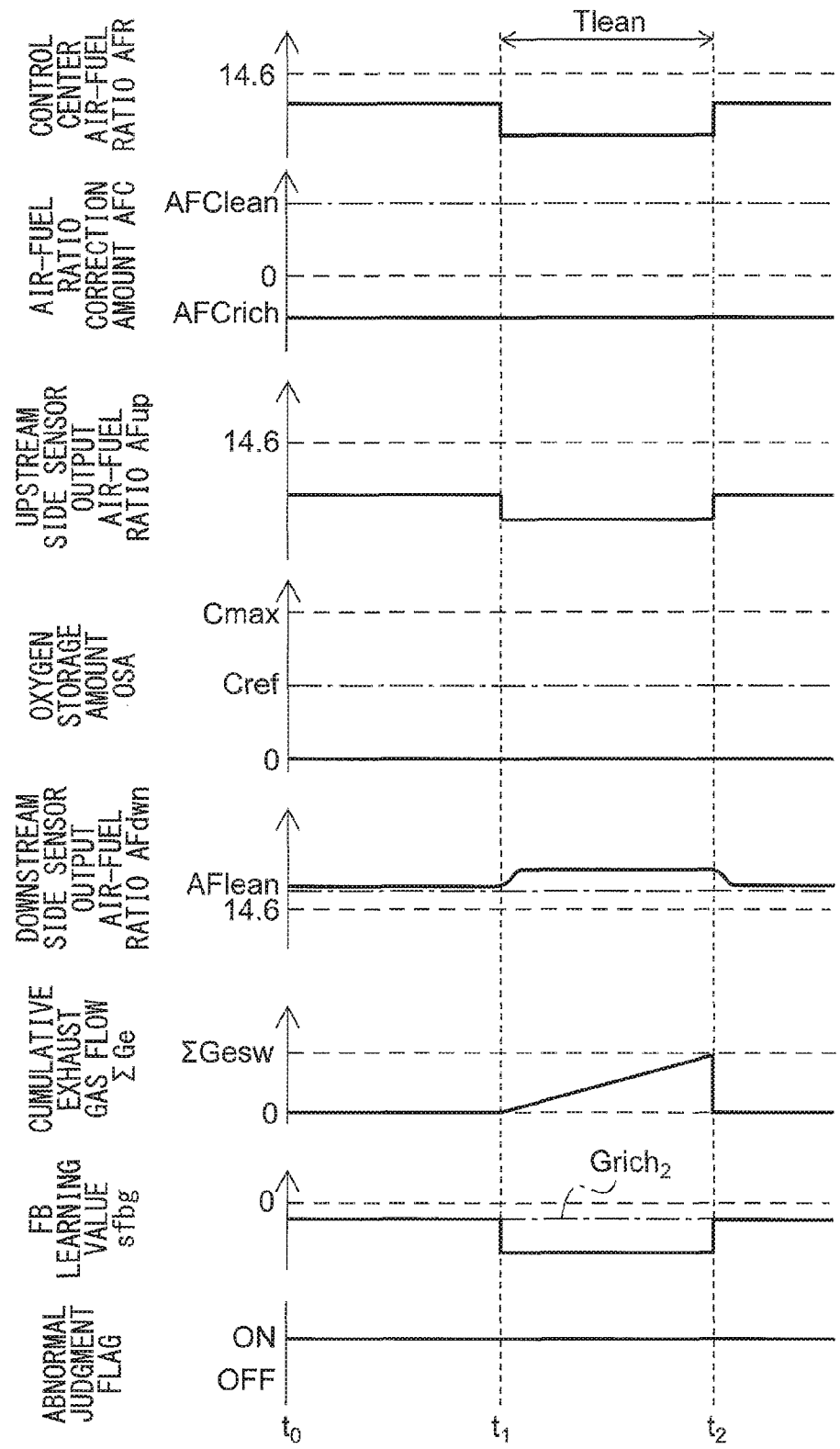
FIG. 22 is a time chart of a control center air-fuel ratio etc.

Referring to FIG. 22, control of the learning value etc. after the rich side guard value Grich of the learning value sfbg is set to the second rich side guard value $Grich_2$ will be explained. FIG. 22 is a time chart, similar to FIG. 21, of the control center air-fuel ratio AFR etc. In the example shown in FIG. 22, before the time $t_0$, guard value restriction control is used to set the rich side guard value Grich at the second rich side guard value $Grich_2$. Accordingly, the absolute value is made smaller.

In the example shown in FIG. 22, the time $t_1$ is the time after the elapse of a predetermined time (abnormal confirmation time interval) from when guard value restriction control is used to set the rich side guard value Grich to the second rich side guard value $Grich_2$ or when the previous cycle of abnormal confirmation control has ended. In particular, in the example shown in FIG. 22, the air-fuel ratio correction amount AFC is set to the rich set correction amount AFCrich and the output air-fuel ratio AFdwn of the downstream side air-fuel ratio sensor 41 becomes the lean judged air-fuel ratio AFlean or more over the abnormal confirmation time interval from when the rich side guard value Grich is set to the second rich side guard value $Grich_2$ etc.

In the present embodiment, at the time $t_1$, due to abnormal confirmation control, the learning value sfbg is temporarily made to decrease beyond the rich side guard value Grich. That is, the rich side absolute value of the learning value sfbg is made to increase beyond the absolute value of the rich side guard value Grich. Due to this, at the time $t_1$, the control center air-fuel ratio AFR is changed to the rich side and as a result, the air-fuel ratio of the exhaust gas flowing into the upstream side exhaust purification catalyst 20 changes to the rich side. The oxygen storage amount OSA of the upstream side exhaust purification catalyst 20 becomes substantially zero, therefore if the air-fuel ratio of the exhaust gas flowing into the upstream side exhaust purification catalyst 20 changes to the rich side, the air-fuel ratio of the exhaust gas flowing out from the upstream side exhaust purification catalyst 20 also changes to the rich side.

As explained above, when the downstream side air-fuel ratio sensor 41 suffers from the abnormality of a cracked element, if the rich degree of the air-fuel ratio of the exhaust gas around the downstream side air-fuel ratio sensor 41 becomes larger, the lean degree of the output air-fuel ratio of the downstream side air-fuel ratio sensor 41 becomes larger. For this reason, in the example shown in FIG. 22, if, at the time $t_1$, the learning value sfbg is made to decrease, along with this, the output air-fuel ratio AFdwn of the downstream side air-fuel ratio sensor 41 rises.

After this, in the present embodiment, at the time $t_2$ after the elapse of the lean air-fuel ratio maintenance judgment time Tlean from the time $t_1$, abnormality of the downstream side air-fuel ratio sensor 41 is confirmed. Specifically, as shown in FIG. 22, when at the time $t_2$ the output air-fuel ratio AFdwn of the downstream side air-fuel ratio sensor 41 is at the lean side from the output air-fuel ratio AFdwn of the downstream side air-fuel ratio sensor 41 at the time $t_1$ or before that, it is judged that the downstream side air-fuel ratio sensor 41 suffers from the abnormality of a cracked element. That is, when making the air-fuel ratio of the exhaust gas flowing into the upstream side exhaust purification catalyst 20 change to the rich side at the time $t_1$, it is judged that the downstream side air-fuel ratio sensor 41 suffers from the abnormality of a cracked element when the output air-fuel ratio AFdwn of the downstream side air-fuel ratio sensor 41 changes to the lean side. In the example shown in FIG. 22, at the time $t_2$ it is judged that there is the abnormality of a cracked element. For this reason, the abnormal judgment flag is continued in the ON state. In addition, at the time $t_2$, the learning value sfbg is returned to the value before the time $t_1$.

On the other hand, opposite from the example shown in FIG. 22, when the output air-fuel ratio AFdwn of the downstream side air-fuel ratio sensor 41 at the time $t_2$ is the same as the output air-fuel ratio AFdwn of the downstream side air-fuel ratio sensor 41 at the time $t_1$ or before that or is at the rich side from this, it is judged that the downstream side air-fuel ratio sensor 41 does not suffer from the abnormality of a cracked element. That is, when making the air-fuel ratio of the exhaust gas flowing into the upstream side exhaust purification catalyst 20 change to the rich side at the time $t_1$, it is judged that the downstream side air-fuel ratio sensor 41 does not suffer from the abnormality of a cracked element when the output air-fuel ratio AFdwn of the downstream side air-fuel ratio sensor 41 does not change or has changed to the rich side. In this case, the previously ON abnormal judgment flag is reset to OFF. In this case as well, at the time $t_2$, the learning value sfbg is returned to the value before the time $t_1$.

In the present embodiment, if, in this way, guard value restriction control is used to make the rich side guard value Grich larger, the learning value sfbg is set to a value smaller than the rich side guard value Grich as abnormal confirmation control periodically. Due to this, even when it is mistakenly judged that the downstream side air-fuel ratio sensor 41 is abnormal, the mistaken judgment can be suitably cancelled.

Note that, in the present embodiment, when a predetermined time (abnormal confirmation time interval) has elapsed (time $t_1$) from when the rich side guard value Grich is set to the second rich side guard value $Grich_2$ by guard value restriction control or when the previous cycle of abnormal confirmation control is completed, abnormal confirmation control is started. However, the abnormal confirmation control does not necessarily have to be performed at this timing so long as being periodically performed. For example, this may be performed when, as shown in FIG. 22, the cumulative exhaust gas flow ΣGesw is predetermined and becomes a predetermined amount when guard value restriction control is used to set the rich side guard value Grich to the second rich side guard value $Grich_2$ or when the previous cycle of abnormal confirmation control is completed.

<Flow Chart of Control for Correction of Learning Value>

Figure 23:
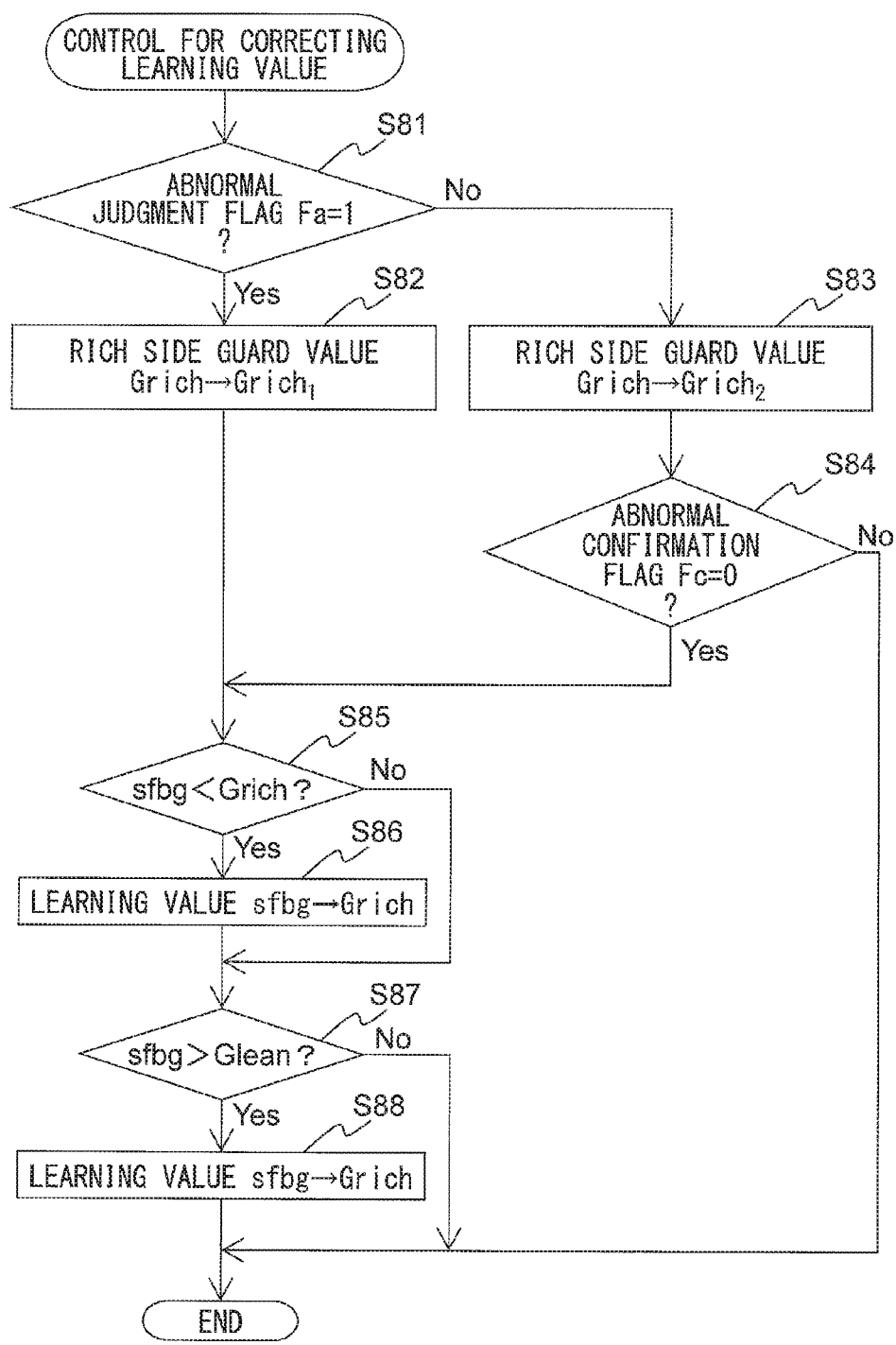
FIG. 23 is a flow chart showing a control routine of learning value correction control wherein a learning value is corrected based on a guard value.

FIG. 23 is a flow chart showing a control routine of control for correction of the learning value using guard values to correct the learning value sfbg. The illustrated control routine is performed by interruption every certain time interval.

As shown in FIG. 23, first, at step S81, it is judged if the abnormal judgment flag Fa is set to "0", that is, it is judged whether the downstream side air-fuel ratio sensor 41 has not been judged abnormal. If at step S81 it is judged that the abnormal judgment flag Fa is set to "0", the routine proceeds to step S82. At step S82, the rich side guard value Grich is set to the first rich side guard value $Grich_1$, then the routine proceeds to step S85.

On the other hand, if at step S81 it is judged that the abnormal judgment flag Fa is not set to "0", that is, if it is judged that the downstream side air-fuel ratio sensor 41 suffers from an abnormality, the routine proceeds to step S83. At step S83, the rich side guard value Grich is set to the second rich side guard value $Grich_2$ ($|Grich_2|<|Grich_1|$), then the routine proceeds to step S84.

At step S84, it is judged if the abnormal confirmation flag Fc is set to "0". The abnormal confirmation flag Fc is a flag which is set to "1" when the learning value sfbg should be decreased by the later explained abnormal confirmation control and is set to "0" when otherwise. When the abnormal confirmation flag Fc is set to "1", the learning value sfbg is not limited to inside the guard values, therefore steps S85 to S88 are skipped, then the control routine is made to end. On the other hand, when at step S84 the abnormal confirmation flag Fc is set to "0", the routine proceeds to step S85.

At step S85, it is judged if the current learning value sfbg is smaller than the rich side guard value Grich. If at step S85 it is judged that the current learning value sfbg is the rich side guard value Grich or more, step S86 is skipped. On the other hand, if at step S85 it is judged that the current learning value sfbg is smaller than the rich side guard value Grich, the routine proceeds to step S86. At step S86, the value of the learning value sfbg is changed to a value the same as the rich side guard value Grich.

Next, at step S87, it is judged if the current learning value sfbg is larger than the lean side guard value Glean. If at step S87 it is judged that the current learning value sfbg is the lean side guard value Glean or less, step S88 is skipped. On the other hand, if at step S87 it is judged that the current learning value sfbg is larger than the lean side guard value Glean, the routine proceeds to step S88. At step S88, the value of the learning value sfbg is changed to a value the same as the lean side guard value Glean, then the control routine is made to end.

<Abnormality Confirmation Control>

Figure 24:
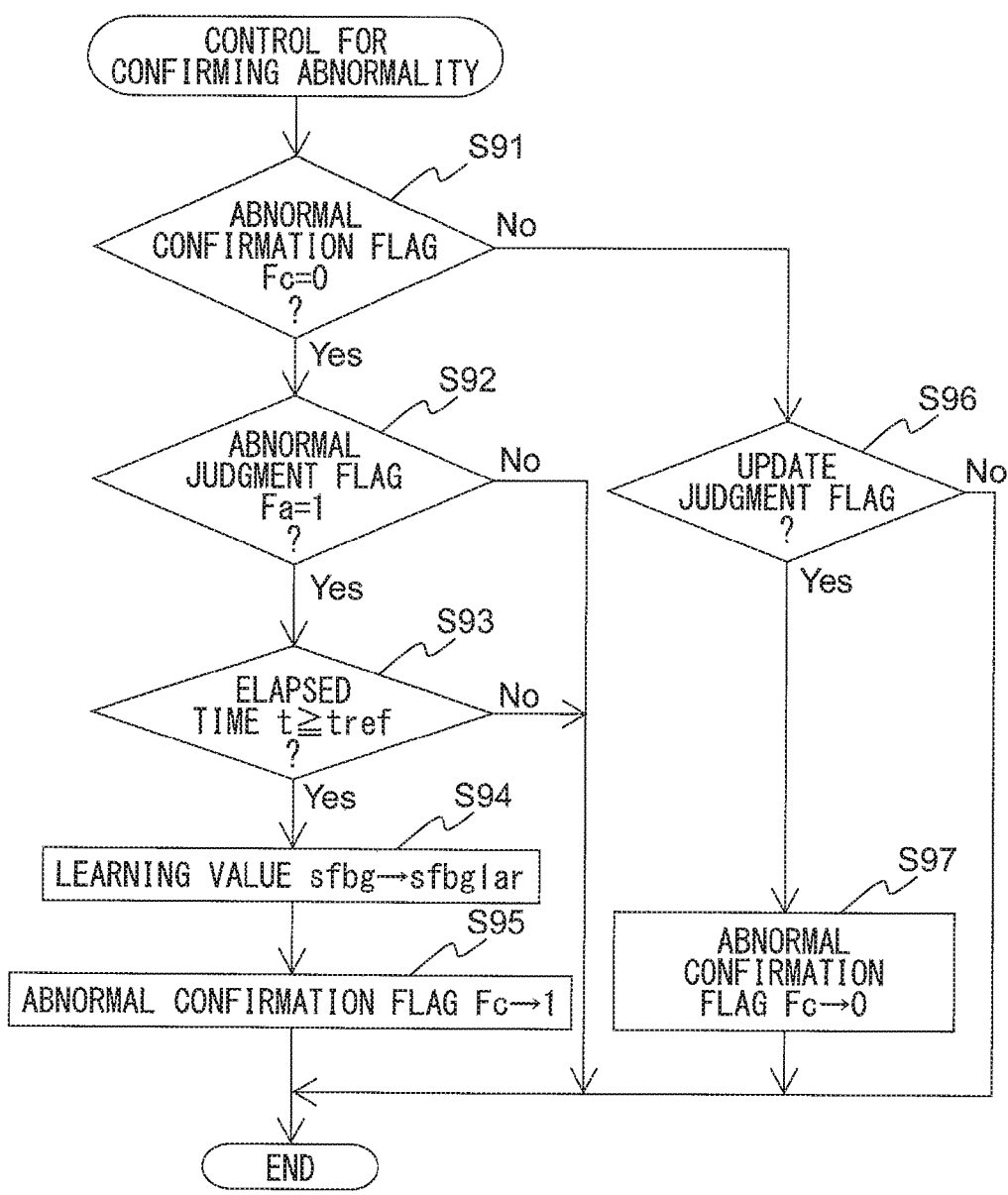
FIG. 24 is a flow chart showing a control routine of control for confirmation of an abnormality.

FIG. 24 is a flow chart showing a control routine of control for confirmation of abnormality periodically confirming if there is actually an abnormality if it is judged the downstream side air-fuel ratio sensor 41 suffers from the abnormality of a cracked element. The illustrated control routine is performed by interruption at certain time intervals.

First, at step S91, it is judged if the abnormal confirmation flag Fc is set to "0". If it is judged that the abnormal confirmation flag Fc is set to "0", the routine proceeds to step S92. At step S92, it is judged if the abnormal judgment flag Fa has been set to "1", that is, if the downstream side air-fuel ratio sensor 41 has the abnormality of a cracked element. If it is judged that the abnormal judgment flag Fa is set to "0", the control routine is made to end. On the other hand, if at step S92 the abnormal judgment flag Fa is set to "1", the routine proceeds to step S93.

At step S93, it is judged if the elapsed time "t" from when the rich side guard value Grich is set to the second rich side guard value $Grich_2$ due to guard value restriction control or when the previous cycle of abnormal confirmation control is completed is a predetermined abnormal confirmation time interval tref or more. If it is judged that the elapsed time t is shorter than the abnormal confirmation time interval tref, the control routine is made to end. On the other hand, if at step S93 it is judged that the elapsed time "t" is the abnormal confirmation time interval tref or more, the routine proceeds to step S94. At step S94, the value of the learning value sfbg is set to a predetermined negative value sfbglar. Note that, the absolute value of the predetermined value sfbglar is made a value larger than the absolute value of the rich side guard value Grich ($|sfbglar|>|Grich|$). Next, at step S95, the abnormal confirmation flag Fc is set to "1".

If the abnormal confirmation flag Fc is set to "1", at the next control routine, the routine proceeds from step S91 to step S96. At step S96, the abnormal confirmation flag Fc is set to "1", therefore in control for diagnosing abnormality and setting the learning value shown in FIG. 20, it is judged if the abnormal judgment flag Fa has been updated or the normal judgment flag Fn is set to "1", that is, it is judged if the judgment flag has been updated. If at step S96 it is judged that the judgment flag has not been updated, the control routine is made to end. On the other hand, if at step S96 it is judged that the judgment flag has been updated, the routine proceeds to step S97. At step S97, the abnormal confirmation flag Fc is reset to "0", then the control routine is made to end.

Third Embodiment

Next, referring to FIG. 25 and FIG. 26, an exhaust purification system according to a third embodiment of the present invention will be explained. The configuration and control in the exhaust purification system according to the third embodiment are basically similar to the configuration and control in the exhaust purification system according to the first embodiment or the second embodiment other than the points explained below.

In this regard, in the first embodiment shown in FIG. 15, when making the learning value sfbg decrease at the time $t_1$, the downstream side air-fuel ratio sensor 41 is diagnosed for abnormality by whether the output air-fuel ratio AFdwn of the downstream side air-fuel ratio sensor 41 has changed to the lean side. However, even when the downstream side air-fuel ratio sensor 41 does not suffer from the abnormality of a cracked element, when the learning value sfbg is made to decrease, sometimes the engine operating state will happen to rapidly change and the output air-fuel ratio AFdwn of the downstream side air-fuel ratio sensor 41 will end up changing to the lean side.

Therefore, in the present embodiment, in the same way as the first embodiment, first, when the air-fuel ratio of the exhaust gas flowing into the upstream side exhaust purification catalyst 20 is made the rich air-fuel ratio, if the output air-fuel ratio AFdwn of the downstream side air-fuel ratio sensor 41 is maintained at the lean judged air-fuel ratio AFlean or more for a predetermined judgment time or more, the air-fuel ratio of the exhaust gas flowing into the upstream side exhaust purification catalyst 20 is made to change to an air-fuel ratio at the rich side from the prior air-fuel ratio as air-fuel ratio rich increasing control. In addition, in the present embodiment, when, due to air-fuel ratio rich increasing control, the air-fuel ratio of the exhaust gas flowing into the upstream side exhaust purification catalyst 20 is made to change to the rich side, the air-fuel ratio of the exhaust gas flowing into the upstream side exhaust purification catalyst 20 is made to change to an air-fuel ratio richer than the stoichiometric air-fuel ratio at the lean side from the prior air-fuel ratio as air-fuel ratio lean increasing control if the output air-fuel ratio AFdwn of the downstream side air-fuel ratio sensor 41 changes to the lean side. This air-fuel ratio lean increasing control may be control where the learning value sfbg is updated so that the air-fuel ratio of the exhaust gas flowing into the upstream side exhaust purification catalyst 20 is made to change to an air-fuel ratio richer than the stoichiometric air-fuel ratio and at the lean side from the prior air-fuel ratio as learning value return control.

Further, when air-fuel ratio lean increasing control is used to make the air-fuel ratio of the exhaust gas flowing into the upstream side exhaust purification catalyst 20 change to the lean side air-fuel ratio, it is judged that the downstream side air-fuel ratio sensor 41 suffers from an abnormality if the output air-fuel ratio AFdwn of the downstream side air-fuel ratio sensor 41 changes to the rich side.

Figure 25:
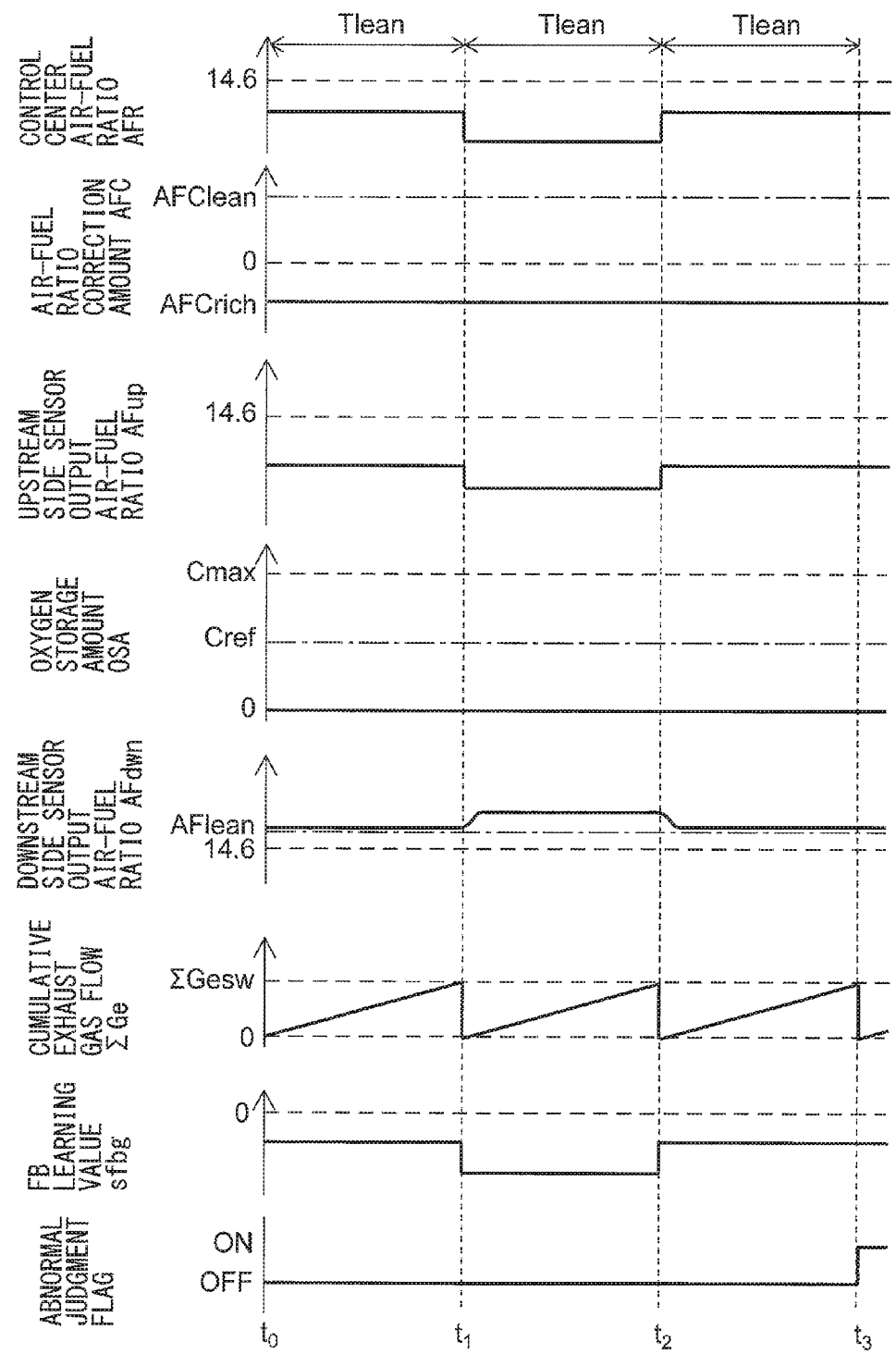
FIG. 25 is a time chart of a control center air-fuel ratio etc.

FIG. 25 is a time chart, similar to FIG. 15, of the control center air-fuel ratio AFR etc. in the case where the downstream side air-fuel ratio sensor 41 suffers from the abnormality of a cracked element. In the same way as the example shown in FIG. 15, the air-fuel ratio correction amount AFC is maintained at the rich set correction amount AFCrich. Further, at the time $t_1$, the lean stuck learning control is used to make the learning value sfbg decrease. At this time, the downstream side air-fuel ratio sensor 41 suffers from the abnormality of a cracked element, therefore if the learning value sfbg at the time $t_1$ is made to decrease, the output air-fuel ratio AFdwn of the downstream side air-fuel ratio sensor 41 changes to the lean side. Therefore, at the time $t_1$ on, the output air-fuel ratio AFdwn of the downstream side air-fuel ratio sensor 41 becomes an air-fuel ratio at the lean side from the prior air-fuel ratio.

After this, in the present embodiment, at the time $t_2$ after the elapse of the lean air-fuel ratio maintenance judgment time Tlean from the time $t_1$, it is judged whether the decrease of the learning value sfbg at the time $t_1$ caused the output air-fuel ratio AFdwn of the downstream side air-fuel ratio sensor 41 to change to the lean side. In the example shown in FIG. 25, at the time $t_2$, the output air-fuel ratio AFdwn of the downstream side air-fuel ratio sensor 41 changes to the lean side compared with before the time $t_1$. For this reason, in the present embodiment, at the time $t_2$, the learning value sfbg is made to increase as learning value return control.

In the learning value return control, the learning value sfbg is made to increase in a range smaller than 0. That is, at the time $t_2$, the absolute value of the learning value sfbg is made to decrease, but is not changed until the signs reverse. Therefore, for example, the learning value sfbg can be made to increase by exactly the same amount as the amount made to decrease at the time $t_1$. As a result, at the time $t_2$, the air-fuel ratio of the exhaust gas flowing into the upstream side exhaust purification catalyst 20 is maintained at the rich air-fuel ratio while being made to change to an air-fuel ratio at the lean side from the prior air-fuel ratio.

After this, in the present embodiment, at the time $t_3$ after the elapse of the lean air-fuel ratio maintenance judgment time Tlean from the time $t_2$, the downstream side air-fuel ratio sensor 41 is diagnosed for abnormality. Specifically, as shown in FIG. 25, if the output air-fuel ratio AFdwn of the downstream side air-fuel ratio sensor 41 at the time $t_3$ is at the rich side from the output air-fuel ratio AFdwn of the downstream side air-fuel ratio sensor 41 at the time $t_2$ or before that, it is judged that the downstream side air-fuel ratio sensor 41 is suffering from the abnormality of a cracked element. That is, when at the time $t_2$ making the air-fuel ratio of the exhaust gas flowing into the upstream side exhaust purification catalyst 20 change to the lean side, it is judged that the downstream side air-fuel ratio sensor 41 is suffering from the abnormality of a cracked element when the output air-fuel ratio AFdwn of the downstream side air-fuel ratio sensor 41 changes to the rich side. In the example shown in FIG. 15, at the time $t_3$, it is judged that the abnormality of a cracked element has occurred and, for this reason, the abnormal judgment flag is set to ON.

In the present embodiment, if the abnormal judgment flag is set to ON, the gain used for calculation of the learning value sfbg (gain $k_1$ of formula (2), gain $k_2$ of formula (4), gain $k_3$ of formula (5)) is made to decrease. Therefore, for example, by making the gain $k_1$ decrease, the ratio of the amount of changing the learning value sfbg with respect to the difference in the cumulative oxygen excess amount R and cumulative oxygen deficiency amount F is made smaller. Note that, in the present embodiment, both if the cumulative oxygen excess amount R is smaller than the cumulative oxygen deficiency amount F (that is, if the excess/deficiency error $\Delta\Sigma$OED is a negative value) and in the opposite case (that is, if the excess/deficiency error $\Sigma$OED is a positive value), the gain $k_1$ is made smaller. However, the gain $k_1$ may also be made smaller only when the cumulative oxygen excess amount R is smaller than the cumulative oxygen deficiency amount F or only in the reverse case (that is, the gain $k_1$ may be changed in accordance with the sign of the excess/deficiency error $\Sigma$OED). Further, by making the gain $k_2$ decrease, the correction amount of the learning value sfbg in the stoichiometric air-fuel ratio stuck learning control is made smaller. In addition, by making the gain $k_3$ decrease, the correction amount of the learning value sfbg in the rich stuck learning control and the lean stuck learning control is made smaller.

When in this way the downstream side air-fuel ratio sensor 41 suffers from the abnormality of a cracked element, it is possible to make the gains at the different learning controls smaller to thereby keep the learning value sfbg from ending up being mistakenly greatly corrected.

On the other hand, opposite to the example shown in FIG. 25, if the output air-fuel ratio AFdwn of the downstream side air-fuel ratio sensor 41 at the time $t_3$ is the same as the output air-fuel ratio AFdwn of the downstream side air-fuel ratio sensor 41 at the time $t_2$ or before that or is at the lean side from that, it is judged that the downstream side air-fuel ratio sensor 41 does not suffer from the abnormality of a cracked element. That is, when at the time $t_2$ making the air-fuel ratio of the exhaust gas flowing into the upstream side exhaust purification catalyst 20 change to the lean side, it is judged that the downstream side air-fuel ratio sensor 41 suffers from the abnormality of a cracked element when the output air-fuel ratio AFdwn of the downstream side air-fuel ratio sensor 41 does not change or has changed to the lean side. Due to this, it is possible to suitably diagnose the abnormality of a cracked element of the downstream side air-fuel ratio sensor 41.

Note that, in the present embodiment, at the time $t_3$ after the elapse of the lean air-fuel ratio maintenance judgment time Tlean from the time $t_2$, the abnormality of a cracked element of the downstream side air-fuel ratio sensor 41 is diagnosed. However, it is also possible to diagnose the abnormality of a cracked element before the time $t_3$ or at the time $t_3$ if at the time $t_2$ after the elapse of a response delay time from when making the control center air-fuel ratio AFR change to the rich side to when the downstream side air-fuel ratio sensor 41 starts to respond.

<Flow Chart of Control for Diagnosing Abnormality and Setting Learning Value>

Figure 26:
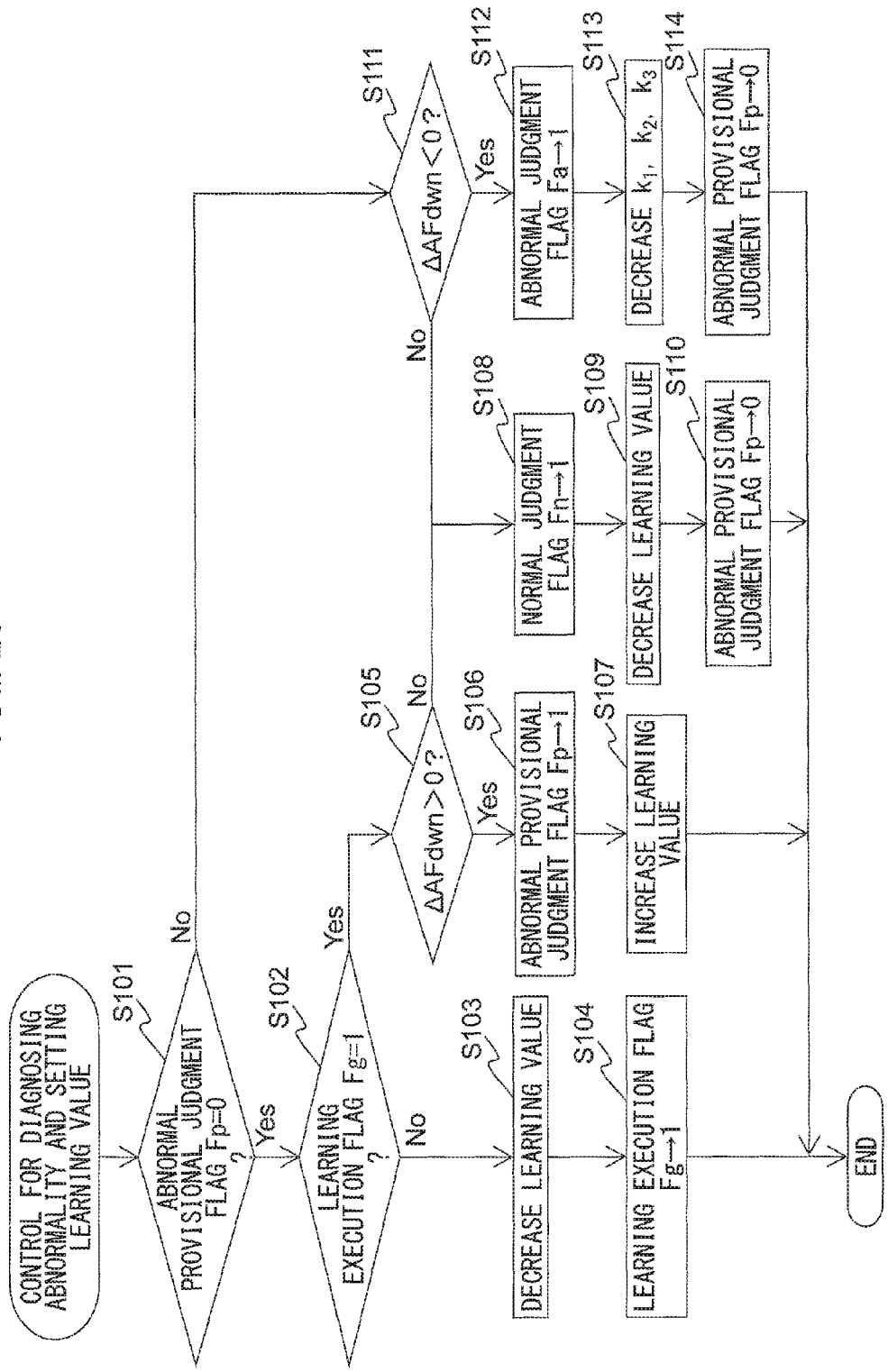
FIG. 26 is a flow chart showing a control routine of control for diagnosing an abnormality and setting a learning value.

FIG. 26 is a flow chart showing a control routine of control for diagnosing abnormality and setting a learning value performed at step S47 of FIG. 19. The illustrated control routine is performed every time step S47 of FIG. 19 is performed. Further, steps S102 to S109 of FIG. 26 are similar to steps S71 to S78 of FIG. 20, therefore except for step S106, the explanation will be omitted.

As shown in FIG. 26, first, at step S101, it is judged if the abnormal provisional judgment flag Fp has been set to "0". The abnormal provisional judgment flag Fp is a flag which is set to "1" when the learning value sfbg is decreased and therefore the output air-fuel ratio AFdwn of the downstream side air-fuel ratio sensor 41 changes to the lean side and is set to "0" in other cases. Therefore, the abnormal provisional judgment flag Fp, in the example shown in FIG. 25, is set to "1" when it is judged at the time $t_2$ that the output air-fuel ratio AFdwn of the downstream side air-fuel ratio sensor 41 is changing to the lean side compared with before the time $t_1$.

When at step S101 it is judged that the abnormal provisional judgment flag Fp is set to "0", the routine proceeds to step S102. After this, if at step S105 it is judged that the amount of change ΔAFdwn is larger than "0", the routine proceeds to step S106. At step S106, the abnormal provisional judgment flag Fp is set to "1".

If the abnormal provisional judgment flag Fp is set to "1", at the next control routine, the routine proceeds from step S101 to step S111. At step S111, it is judged if the amount of change ΔAFdwn of the output air-fuel ratio AFdwn of the downstream side air-fuel ratio sensor 41 from when making the learning value increase the previous time at step S107 is smaller than "0", that is, if the output air-fuel ratio AFdwn has changed to the rich side. If, at step S111, the amount of change ΔAFdwn is smaller than "0", the output air-fuel ratio AFdwn changes to the rich side, therefore the routine proceeds to step S112 where the abnormal judgment flag Fa of the downstream side air-fuel ratio sensor 41 is set to "1" (ON). Next, at step S113, the gains $k_1$, $k_2$, $k_3$ are decreased. Next, at step S114, the abnormal provisional judgment flag Fp is reset to "0". Note that, the abnormal provisional judgment flag Fp is reset to "0" at step S110 even if the normal judgment flag Fn is set to "1" at step S108.

Note that, in the present embodiment, when it is judged that downstream side air-fuel ratio sensor 41 has the abnormality of a cracked element, the gains at the different learning controls are made smaller. However, when it is judged that the abnormality of a cracked element has occurred, it is also possible to change the guard values in the same way as the exhaust purification system according to the second embodiment. Further, in the exhaust purification system according to the first embodiment as well, if it is judged that the abnormality of a cracked element has occurred, the learning value sfbg may be returned to the value before updating or the gains at the different learning controls may be made smaller without returning the learning value sfbg to the value before updating. In addition, in the exhaust purification system according to the second embodiment as well, if it is judged that the abnormality of a cracked element has occurred, it is possible to change the guard values or make the gains at the different learning controls smaller without changing the guard values.

REFERENCE SIGNS LIST 1. engine body
5. combustion chamber
7. intake port
9. exhaust port
19. exhaust manifold
20. upstream side exhaust purification catalyst
24. downstream side exhaust purification catalyst
31. ECU
40. upstream side air-fuel ratio sensor
41. downstream side air-fuel ratio sensor

What is claimed is:

1. An exhaust purification system of an internal combustion engine, the exhaust purification system comprising:
an exhaust purification catalyst provided at an exhaust passage of the internal combustion engine, a downstream side air-fuel ratio sensor provided in the exhaust passage at a downstream side in a direction of flow of exhaust gas from the exhaust purification catalyst, and a control device controlling an air-fuel ratio of the exhaust gas flowing into the exhaust purification catalyst and diagnosing abnormality of the downstream side air-fuel ratio sensor, wherein
the control device is configured to
make the air-fuel ratio of the exhaust gas flowing into the exhaust purification catalyst change to an air-fuel ratio at a rich side from a prior air-fuel ratio as air-fuel ratio rich increasing control when the air-fuel ratio of the exhaust gas flowing into the exhaust purification catalyst is a rich air-fuel ratio richer than a stoichiometric air-fuel ratio and an output air-fuel ratio of the downstream side air-fuel ratio sensor is maintained greater than or equal to a lean judged air-fuel ratio leaner than the stoichiometric air-fuel ratio, and judge that the downstream side air-fuel ratio sensor suffers from an abnormality, when, due to the air-fuel ratio rich increasing control, the air-fuel ratio of the exhaust gas flowing into the exhaust purification catalyst is made to change to the rich side air-fuel ratio and the output air-fuel ratio of the downstream side air-fuel ratio sensor changes to a lean side.

2. The exhaust purification system of an internal combustion engine according to claim 1 wherein the control device is further configured to update a learning value based on the output of the downstream side air-fuel ratio sensor and is to control a parameter relating to the air-fuel ratio so as to make the air-fuel ratio of the exhaust gas flowing into the exhaust purification catalyst change in accordance with the learning value as learning control, and the air-fuel ratio rich increasing control is lean stuck learning control wherein the learning value is updated so as to make the air-fuel ratio of the exhaust gas flowing into the exhaust purification catalyst change to an air-fuel ratio at the rich side from the air-fuel ratio up to then.

3. The exhaust purification system of an internal combustion engine according to claim 2 wherein the control device is further configured to return the learning value updated by the lean stuck learning control to a value before the updating when it is judged that the downstream side air-fuel ratio sensor suffers from an abnormality.

4. The exhaust purification system of an internal combustion engine according to claim 2 wherein the control device is further configured to control the air-fuel ratio of the exhaust gas flowing into the exhaust purification catalyst so that the air-fuel ratio of the exhaust gas flowing into the exhaust purification catalyst changes to the rich side in proportion to a rich side absolute value of the learning value with respect to the air-fuel ratio of the exhaust gas flowing into the exhaust purification catalyst when the learning value is zero, the learning value is set so that the rich side absolute value becomes less than or equal to an absolute value of a predetermined rich side guard value, and the control device is further configured to reduce the absolute value of the predetermined rich side guard value as guard value restriction control when the downstream side air-fuel ratio sensor suffers from an abnormality.

5. The exhaust purification system of an internal combustion engine according to claim 4, wherein the control device is further configured to periodically make the rich side absolute value of the learning value increase beyond the absolute value of the predetermined rich side guard value as abnormal confirmation control so that even if, due to the guard value restriction control, the absolute value of the predetermined rich side guard value is reduced, the air-fuel ratio of the exhaust gas flowing into the exhaust purification catalyst changes to the rich side beyond an air-fuel ratio corresponding to the predetermined rich side guard value with the reduced absolute value.

6. The exhaust purification system of an internal combustion engine according to claim 2 wherein the control device performs feedback control so that the air-fuel ratio of the exhaust gas flowing into the exhaust purification catalyst becomes a target air-fuel ratio, and alternately switches the target air-fuel ratio between the rich air-fuel ratio and lean air-fuel ratio, the target air-fuel ratio being switched from the rich air-fuel ratio to the lean air-fuel ratio when the output air-fuel ratio of the downstream side air-fuel ratio sensor becomes less than or equal to a predetermined rich judged air-fuel ratio richer than the stoichiometric air-fuel ratio, the control device, in the learning control, based on a cumulative oxygen excess amount being a cumulative value of an amount of oxygen which becomes an excess when the control device makes the air-fuel ratio of the exhaust gas flowing into the exhaust purification catalyst the stoichiometric air-fuel ratio in an oxygen increasing period from when the target air-fuel ratio is switched to the lean air-fuel ratio to when the target air-fuel ratio is switched again to the rich air-fuel ratio, and a cumulative oxygen deficiency amount being a cumulative value of an amount of oxygen which becomes deficient when the control device makes the air-fuel ratio of the exhaust gas flowing into the exhaust purification catalyst the stoichiometric air-fuel ratio in an oxygen decreasing period from when the target air-fuel ratio is switched to the rich air-fuel ratio to when the target air-fuel ratio is switched again to the lean air-fuel ratio, updates the learning value so as to reduce a difference between the cumulative oxygen excess amount and cumulative oxygen deficiency amount, and the control device is further configured to reduce a ratio of an amount of change of the learning value with respect to the difference of the cumulative oxygen excess amount and the cumulative oxygen deficiency amount in a case of that the cumulative oxygen excess amount is less than the cumulative oxygen deficiency amount, when the downstream side air-fuel ratio sensor is judged to be suffering from an abnormality, compared to when the downstream side air-fuel ratio sensor is not judged to be suffering from an abnormality.

7. The exhaust purification system of an internal combustion engine according to claim 2 wherein the control device is further configured to perform feedback control so that the air-fuel ratio of the exhaust gas flowing into the exhaust purification catalyst becomes a target air-fuel ratio and the control device is further configured to switch the target air-fuel ratio from the rich air-fuel ratio to a lean air-fuel ratio when the output air-fuel ratio of the downstream side air-fuel ratio sensor becomes less than or equal to a predetermined rich judged air-fuel ratio richer than the stoichiometric air-fuel ratio, and switches the target air-fuel ratio from the lean air-fuel ratio to the rich air-fuel ratio when an oxygen storage amount of the exhaust purification catalyst becomes at least a predetermined switching reference storage amount less than a maximum storable amount.

8. The exhaust purification system of an internal combustion engine according to claim 1 wherein the control device is further configured to perform feedback control so that the air-fuel ratio of the exhaust gas flowing into the exhaust purification catalyst becomes a target air-fuel ratio and the control device is further configured to switch the target air-fuel ratio from the rich air-fuel ratio to a lean air-fuel ratio when the output air-fuel ratio of the downstream side air-fuel ratio sensor becomes less than or equal to a predetermined rich judged air-fuel ratio richer than the stoichiometric air-fuel ratio, and switches the target air-fuel ratio from the lean air-fuel ratio to the rich air-fuel ratio when an oxygen storage amount of the exhaust purification catalyst becomes at least a predetermined switching reference storage amount less than a maximum storable amount.

9. An exhaust purification system of an internal combustion engine, the exhaust purification system comprising:
an exhaust purification catalyst provided at an exhaust passage of the internal combustion engine, a downstream side air-fuel ratio sensor provided in the exhaust passage at a downstream side in a direction of flow of exhaust gas from the exhaust purification catalyst, and a control device controlling an air-fuel ratio of the exhaust gas flowing into the exhaust purification catalyst and diagnosing abnormality of the downstream side air-fuel ratio sensor, wherein
the control device is configured to
make the air-fuel ratio of the exhaust gas flowing into the exhaust purification catalyst change to an air-fuel ratio at a rich side from the prior air-fuel ratio as air-fuel ratio rich increasing control when the air-fuel ratio of the exhaust gas flowing into the exhaust purification catalyst is a rich air-fuel ratio richer than a stoichiometric air-fuel ratio and an output air-fuel ratio of the downstream side air-fuel ratio sensor is maintained greater than or equal to a lean judged air-fuel ratio leaner than the stoichiometric air-fuel ratio,
make the air-fuel ratio of the exhaust gas flowing into the exhaust purification catalyst change to an air-fuel ratio richer than the stoichiometric air-fuel ratio and at a lean side from the prior air-fuel ratio as air-fuel ratio lean increasing control when, due to the air-fuel ratio rich increasing control, the air-fuel ratio of the exhaust gas flowing into the exhaust purification catalyst is made to change to an air-fuel ratio at the rich side and the output air-fuel ratio of the downstream side air-fuel ratio sensor changes to the lean side, and
judge that the downstream side air-fuel ratio sensor suffers from an abnormality, when, due to the air-fuel ratio lean increasing control, the air-fuel ratio of the exhaust gas flowing into the exhaust purification catalyst is made to change to the lean side air-fuel ratio and the output air-fuel ratio of the downstream side air-fuel ratio sensor changes to the rich side.

10. The exhaust purification system of an internal combustion engine according to claim 9 wherein
the control device is further configured to update a learning value based on the output of the downstream side air-fuel ratio sensor and is to control a parameter relating to the air-fuel ratio so as to make the air-fuel ratio of the exhaust gas flowing into the exhaust purification catalyst change in accordance with the learning value as learning control, and
the air-fuel ratio rich increasing control is lean stuck learning control wherein the learning value is updated so as to make the air-fuel ratio of the exhaust gas flowing into the exhaust purification catalyst change to an air-fuel ratio at the rich side from the prior air-fuel ratio.

11. The exhaust purification system of an internal combustion engine according to claim 10 wherein the control device is further configured to return the learning value updated by the lean stuck learning control to a value before the updating when it is judged that the downstream side air-fuel ratio sensor suffers from an abnormality.

12. The exhaust purification system of an internal combustion engine according to claim 10 wherein
the control device is further configured to control the air-fuel ratio of the exhaust gas flowing into the exhaust purification catalyst so that the air-fuel ratio of the exhaust gas flowing into the exhaust purification catalyst changes to the rich side in proportion to a rich side absolute value of the learning value with respect to the air-fuel ratio of the exhaust gas flowing into the exhaust purification catalyst when the learning value is zero,
the learning value is set so that the rich side absolute value becomes less than or equal to an absolute value of a predetermined rich side guard value, and
the control device is further configured to reduce the absolute value of the predetermined rich side guard value as guard value restriction control when the downstream side air-fuel ratio sensor suffers from an abnormality.

13. The exhaust purification system of an internal combustion engine according to claim 12, wherein
the control device is further configured to periodically make the rich side absolute value of the learning value increase beyond the absolute value of the predetermined rich side guard value as abnormal confirmation control so that even if, due to the guard value restriction control, the absolute value of the predetermined rich side guard value is reduced, the air-fuel ratio of the exhaust gas flowing into the exhaust purification catalyst changes to the rich side beyond an air-fuel ratio corresponding to the predetermined rich side guard value with the reduced absolute value.

14. The exhaust purification system of an internal combustion engine according to claim 10 wherein
the control device is to perform feedback control so that the air-fuel ratio of the exhaust gas flowing into the exhaust purification catalyst becomes a target air-fuel ratio, and alternately switches the target air-fuel ratio between the rich air-fuel ratio and lean air-fuel ratio, the target air-fuel ratio being switched from the rich air-fuel ratio to the lean air-fuel ratio when the output air-fuel ratio of the downstream side air-fuel ratio sensor becomes less than or equal to a predetermined rich judged air-fuel ratio richer than the stoichiometric air-fuel ratio,
the control device, in the learning control, based on a cumulative oxygen excess amount being a cumulative value of an amount of oxygen which becomes an excess when the control device makes the air-fuel ratio of the exhaust gas flowing into the exhaust purification catalyst the stoichiometric air-fuel ratio in an oxygen increasing period from when the target air-fuel ratio is switched to the lean air-fuel ratio to when the target air-fuel ratio is switched again to the rich air-fuel ratio, and a cumulative oxygen deficiency amount being the cumulative value of an amount of oxygen which becomes deficient when making the air-fuel ratio of the exhaust gas flowing into the exhaust purification catalyst the stoichiometric air-fuel ratio in an oxygen decreasing period from when the target air-fuel ratio is switched to the rich air-fuel ratio to when the target air-fuel ratio is switched again to the lean air-fuel ratio, updates the learning value so as to reduce a difference between the cumulative oxygen excess amount and cumulative oxygen deficiency amount, and the control device is further configured to reduce a ratio of an amount of change of the learning value with respect to the difference of the cumulative oxygen excess amount and the cumulative oxygen deficiency amount in a case of that the cumulative oxygen excess amount is less than the cumulative oxygen deficiency amount, when the downstream side air-fuel ratio sensor is judged to be suffering from an abnormality, compared to when the downstream side air-fuel ratio sensor is not judged to be suffering from an abnormality.

15. The exhaust purification system of an internal combustion engine according to claim 10 wherein
the control device is further configured to perform feedback control so that the air-fuel ratio of the exhaust gas flowing into the exhaust purification catalyst becomes a target air-fuel ratio and
the control device is further configured to switch the target air-fuel ratio from the rich air-fuel ratio to the lean air-fuel ratio when the output air-fuel ratio of the downstream side air-fuel ratio sensor becomes less than or equal to a predetermined rich judged air-fuel ratio richer than the stoichiometric air-fuel ratio, and switches the target air-fuel ratio from the lean air-fuel ratio to the rich air-fuel ratio when an oxygen storage amount of the exhaust purification catalyst becomes at least a predetermined switching reference storage amount less than a maximum storable amount.

16. The exhaust purification system of an internal combustion engine according to claim 9 wherein
the control device is further configured to update a learning value based on the output of the downstream side air-fuel ratio sensor and is to control a parameter relating to the air-fuel ratio so as to make the air-fuel ratio of the exhaust gas flowing into the exhaust purification catalyst change in accordance with the learning value as learning control,
the air-fuel ratio rich increasing control is lean stuck learning control wherein the learning value is updated so as to make the air-fuel ratio of the exhaust gas flowing into the exhaust purification catalyst change to an air-fuel ratio at the rich side from the prior air-fuel ratio, and
the air-fuel ratio lean increasing control is learning value return control wherein the learning value is updated so as to make the air-fuel ratio of the exhaust gas flowing into the exhaust purification catalyst change to an air-fuel ratio richer than the stoichiometric air-fuel ratio and at the lean side from the prior air-fuel ratio.

17. The exhaust purification system of an internal combustion engine according to claim 16 wherein the control device is further configured to return the learning value updated by the lean stuck learning control to a value before the updating when it is judged that the downstream side air-fuel ratio sensor suffers from an abnormality.

18. The exhaust purification system of an internal combustion engine according to claim 9 wherein
the control device is further configured to perform feedback control so that the air-fuel ratio of the exhaust gas flowing into the exhaust purification catalyst becomes a target air-fuel ratio and
the control device is further configured to switch the target air-fuel ratio from a rich air-fuel ratio to the lean air-fuel ratio when the output air-fuel ratio of the downstream side air-fuel ratio sensor becomes less than or equal to a predetermined rich judged air-fuel ratio richer than the stoichiometric air-fuel ratio, and switches the target air-fuel ratio from the lean air-fuel ratio to the rich air-fuel ratio when an oxygen storage amount of the exhaust purification catalyst becomes at least a predetermined switching reference storage amount less than a maximum storable amount.

19. An exhaust purification method for an internal combustion engine, where an exhaust purification catalyst is provided at an exhaust passage of the internal combustion engine, a downstream side air-fuel ratio sensor is provided in the exhaust passage at a downstream side in a direction of flow of exhaust gas from the exhaust purification catalyst, and a control device controls an air-fuel ratio of the exhaust gas flowing into the exhaust purification catalyst and diagnosing abnormality of the downstream side air-fuel ratio sensor,
wherein the method comprising:
either
a) making, by the control device, the air-fuel ratio of the exhaust gas flowing into the exhaust purification catalyst change to an air-fuel ratio at a rich side from a prior air-fuel ratio as air-fuel ratio rich increasing control when the air-fuel ratio of the exhaust gas flowing into the exhaust purification catalyst is a rich air-fuel ratio richer than a stoichiometric air-fuel ratio and an output air-fuel ratio of the downstream side air-fuel ratio sensor is maintained greater than or equal to a lean judged air-fuel ratio leaner than the stoichiometric air-fuel ratio, and
b) judging, by the control device, that the downstream side air-fuel ratio sensor suffers from an abnormality, when, due to the air-fuel ratio rich increasing control, the air-fuel ratio of the exhaust gas flowing into the exhaust purification catalyst is made to change to the rich side air-fuel ratio and the output air-fuel ratio of the downstream side air-fuel ratio sensor changes to a lean side;
or
a) making, by the control device, the air-fuel ratio of the exhaust gas flowing into the exhaust purification catalyst change to an air-fuel ratio at a rich side from the prior air-fuel ratio as air-fuel ratio rich increasing control when the air-fuel ratio of the exhaust gas flowing into the exhaust purification catalyst is a rich air-fuel ratio richer than the stoichiometric air-fuel ratio and the output air-fuel ratio of the downstream side air-fuel ratio sensor is maintained greater than or equal to a lean judged air-fuel ratio leaner than the stoichiometric air-fuel ratio,
b) making, by the control device, the air-fuel ratio of the exhaust gas flowing into the exhaust purification catalyst change to an air-fuel ratio richer than the stoichiometric air-fuel ratio and at the lean side from the prior air-fuel ratio as air-fuel ratio lean increasing control when, due to the air-fuel ratio rich increasing control, the air-fuel ratio of the exhaust gas flowing into the exhaust purification catalyst is made to change to an air-fuel ratio at the rich side and the output air-fuel ratio of the downstream side air-fuel ratio sensor changes to the lean side, and
c) judging, by the control device, that the downstream side air-fuel ratio sensor suffers from an abnormality, when, due to the air-fuel ratio lean increasing control, the air-fuel ratio of the exhaust gas flowing into the exhaust purification catalyst is made to change to the lean side air-fuel ratio and the output air-fuel ratio of the downstream side air-fuel ratio sensor changes to the rich side.

* * * * *